United States Patent
de Graaff et al.

(10) Patent No.: US 9,414,710 B2
(45) Date of Patent: Aug. 16, 2016

(54) SYSTEM FOR PREPARING A COFFEE BEVERAGE, GROUND COFFEE PACKAGING CARTRIDGE FOR USE WITH SUCH A SYSTEM, METHOD OF PREPARING A BEVERAGE BY MEANS OF SAID SYSTEM, AND METHOD OF SUPPLYING GROUND COFFEE FROM SAID GROUND COFFEE PACKAGING CARTRIDGE

(75) Inventors: Gerbrand Kristiaan de Graaff, Hillegom (NL); Ivo Van Os, Utrecht (NL); Christiaan Johannes Maria Moorman, Moergestel (NL); Joseph Theodoor Knitel, De Meern (NL)

(73) Assignee: Koniklijke Douwe Egberts B.V., Utrecht (NL)

( * ) Notice: Subject to any disclaimer, the term of this patent is extended or adjusted under 35 U.S.C. 154(b) by 0 days.

(21) Appl. No.: 13/587,652

(22) Filed: Aug. 16, 2012

(65) Prior Publication Data

US 2013/0101717 A1 Apr. 25, 2013

(30) Foreign Application Priority Data

Feb. 17, 2010 (NL) ................. PCT/NL2010/050077
Feb. 22, 2010 (NL) ..................................... 2004274
Aug. 17, 2010 (NL) ..................................... 2005238
Aug. 26, 2010 (NL) ..................................... 2005278
Aug. 26, 2010 (NL) ..................................... 2005280

(51) Int. Cl.
*A47J 31/42* (2006.01)
*B65B 1/04* (2006.01)
(Continued)

(52) U.S. Cl.
CPC . *A47J 31/42* (2013.01); *A23F 5/26* (2013.01); *A23F 5/262* (2013.01); *A47J 31/404* (2013.01);
(Continued)

(58) Field of Classification Search
CPC .............. A23F 5/26; A47J 31/42; A47J 42/50; B65B 1/12

USPC ............ 99/286, 280, 285; 141/386, 108, 344, 141/67, 311 R, 1; 426/433, 518
See application file for complete search history.

(56) References Cited

U.S. PATENT DOCUMENTS 1,604,058 A 10/1926 Mager
3,981,234 A 9/1976 Nelson et al.
(Continued)

FOREIGN PATENT DOCUMENTS

CN 1413340 4/2003
CN 2684712 3/2005
(Continued)

OTHER PUBLICATIONS

International Search Report for PCT/NL2011/050108, mailing date Dec. 23, 2011, 5 pages.
(Continued)

*Primary Examiner* — Dana Ross
*Assistant Examiner* — Ket D Dang
(74) *Attorney, Agent, or Firm* — Foley & Lardner LLP

(57) ABSTRACT

A coffee beverage system is described, including a coffee bean packaging cartridge and a coffee brewing apparatus comprising a grinder wherein the coffee bean packaging cartridge is removably connectable to the coffee grinder apparatus. The coffee bean packaging cartridge is arranged for holding and supplying of coffee beans and includes a transportation component adapted for enabling transportation of the coffee beans. The coffee brewing apparatus comprises a motor for driving the transportation component of the first coffee bean packaging cartridge. The system further comprises a ground coffee packaging cartridge, preferably having a transportation component for enabling transportation of ground coffee which transportation component is also removably connectable to the coffee grinder apparatus.

47 Claims, 66 Drawing Sheets

(51) Int. Cl.
  *A23L 1/28* (2006.01)
  *A47J 42/50* (2006.01)
  *A23F 5/26* (2006.01)
  *A47J 31/40* (2006.01)
  *B65B 1/12* (2006.01)
  *A47J 31/36* (2006.01)
  *A47J 31/52* (2006.01)
  *B65D 85/804* (2006.01)

(52) U.S. Cl.
  CPC . *A47J 42/50* (2013.01); *B65B 1/12* (2013.01); *A47J 31/3614* (2013.01); *A47J 31/52* (2013.01); *B65D 85/8043* (2013.01)

(56) References Cited

U.S. PATENT DOCUMENTS

| | | | |
|---|---|---|---|
| 4,326,114 A | | 4/1982 | Gerling et al. |
| 4,555,984 A | * | 12/1985 | Yamashita ............. 99/286 |
| 4,644,856 A | | 2/1987 | Borgmann |
| 4,843,956 A | * | 7/1989 | Lashlee ............. 99/468 |
| 4,876,953 A | * | 10/1989 | Imamura et al. ............. 99/280 |
| 4,936,515 A | | 6/1990 | Poag et al. |
| 5,094,153 A | * | 3/1992 | Helbling ............. 99/280 |
| 5,217,108 A | | 6/1993 | Newnan |
| 5,241,898 A | | 9/1993 | Newnan |
| 5,267,507 A | * | 12/1993 | Enomoto ............. 99/286 |
| 5,338,409 A | | 8/1994 | Heierli |
| 5,386,944 A | | 2/1995 | Knepler et al. |
| 5,463,934 A | | 11/1995 | Locati |
| 5,632,449 A | | 5/1997 | Sandolo |
| 5,632,499 A | | 5/1997 | Hutcherson et al. |
| 6,067,894 A | | 5/2000 | Eugster |
| 6,339,985 B1 | * | 1/2002 | Whitney ............. 99/286 |
| 7,013,796 B2 | | 3/2006 | Smit |
| 7,051,646 B2 | * | 5/2006 | Della Pietra et al. ............. 99/280 |
| 8,047,124 B2 | | 11/2011 | Lin |
| 8,382,017 B2 | * | 2/2013 | Bich ............. 241/30 |
| 8,383,180 B2 | | 2/2013 | Vastardis |
| 8,439,235 B2 | | 5/2013 | Mih et al. |
| 8,776,671 B2 | * | 7/2014 | Van Os et al. ............. 99/286 |
| 2002/0092941 A1 | | 7/2002 | Henderson et al. |
| 2002/0129712 A1 | | 9/2002 | Westbrook et al. |
| 2002/0153438 A1 | | 10/2002 | Glucksman et al. |
| 2003/0025012 A1 | | 2/2003 | Lassota |
| 2004/0025703 A1 | | 2/2004 | Ming |
| 2004/0173101 A1 | | 9/2004 | Steckhan |
| 2005/0017107 A1 | | 1/2005 | Steckhan |
| 2005/0258287 A1 | * | 11/2005 | Rohde ............. 241/100 |
| 2007/0062378 A1 | | 3/2007 | Glucksman et al. |
| 2007/0137495 A1 | | 6/2007 | Talbert |
| 2007/0295752 A1 | | 12/2007 | Morin et al. |
| 2008/0098901 A1 | | 5/2008 | Lee |
| 2009/0127363 A1 | | 5/2009 | Malykke |
| 2009/0145302 A1 | * | 6/2009 | Dutertre et al. ............. 99/289 R |
| 2009/0165655 A1 | | 7/2009 | Aonuma |
| 2010/0080886 A1 | | 4/2010 | Hourizadeh |
| 2010/0308141 A1 | | 12/2010 | Bich |
| 2013/0095218 A1 | * | 4/2013 | de Graaff et al. ............. 426/433 |
| 2013/0095219 A1 | * | 4/2013 | de Graaff et al. ............. 426/433 |
| 2013/0101717 A1 | | 4/2013 | De Graaff et al. |
| 2013/0115351 A1 | * | 5/2013 | Van Os et al. ............. 426/433 |

FOREIGN PATENT DOCUMENTS

| | | |
|---|---|---|
| CN | 2684713 | 3/2005 |
| CN | 1830369 | 9/2006 |
| CN | 201005518 | 1/2008 |
| DE | 29 26 389 | 1/1981 |
| DE | 203 00 928 | 5/2004 |
| DE | 203 00 933 | 5/2004 |
| DE | 20300 93 3 | 5/2004 |
| DE | 10 2007 008898 | 8/2008 |
| DE | 102007008 90 0 | 10/2008 |
| EP | 0 182 137 | 5/1986 |
| EP | 0 452 214 | 10/1991 |
| EP | 0 543 591 | 5/1993 |
| EP | 0 605 750 A1 | 7/1994 |
| EP | 0 766 943 A1 | 4/1997 |
| EP | 0 804 894 | 11/1997 |
| EP | 1 700 549 | 9/2006 |
| EP | 2 067 421 | 6/2009 |
| EP | 2 403 386 | 1/2012 |
| FR | 2565088 | 12/1985 |
| GB | 2 447 678 | 9/2008 |
| JP | 06-046437 | 11/1994 |
| JP | 07-505328 | 6/1995 |
| JP | H07-505323 | 6/1995 |
| JP | 2003-518676 | 6/2003 |
| WO | WO-94/07401 | 4/1994 |
| WO | WO-00/27262 | 10/2000 |
| WO | WO-01/48711 | 7/2001 |
| WO | WO-2004/023956 | 3/2004 |
| WO | WO 2009046771 A1 * | 4/2009 |
| WO | WO-2010/095937 | 8/2010 |

OTHER PUBLICATIONS

International Search Report for PCT/NL2010/050077, mailing date Aug. 5, 2010, 6 pages.
European Search Report for European Application No. 11154887.1, dated Jan. 2, 2012, 8 pages.
English-language machine translation of JP 06-046437, Osaki Electric Co. Ltd. (Nov. 30, 1994).

* cited by examiner

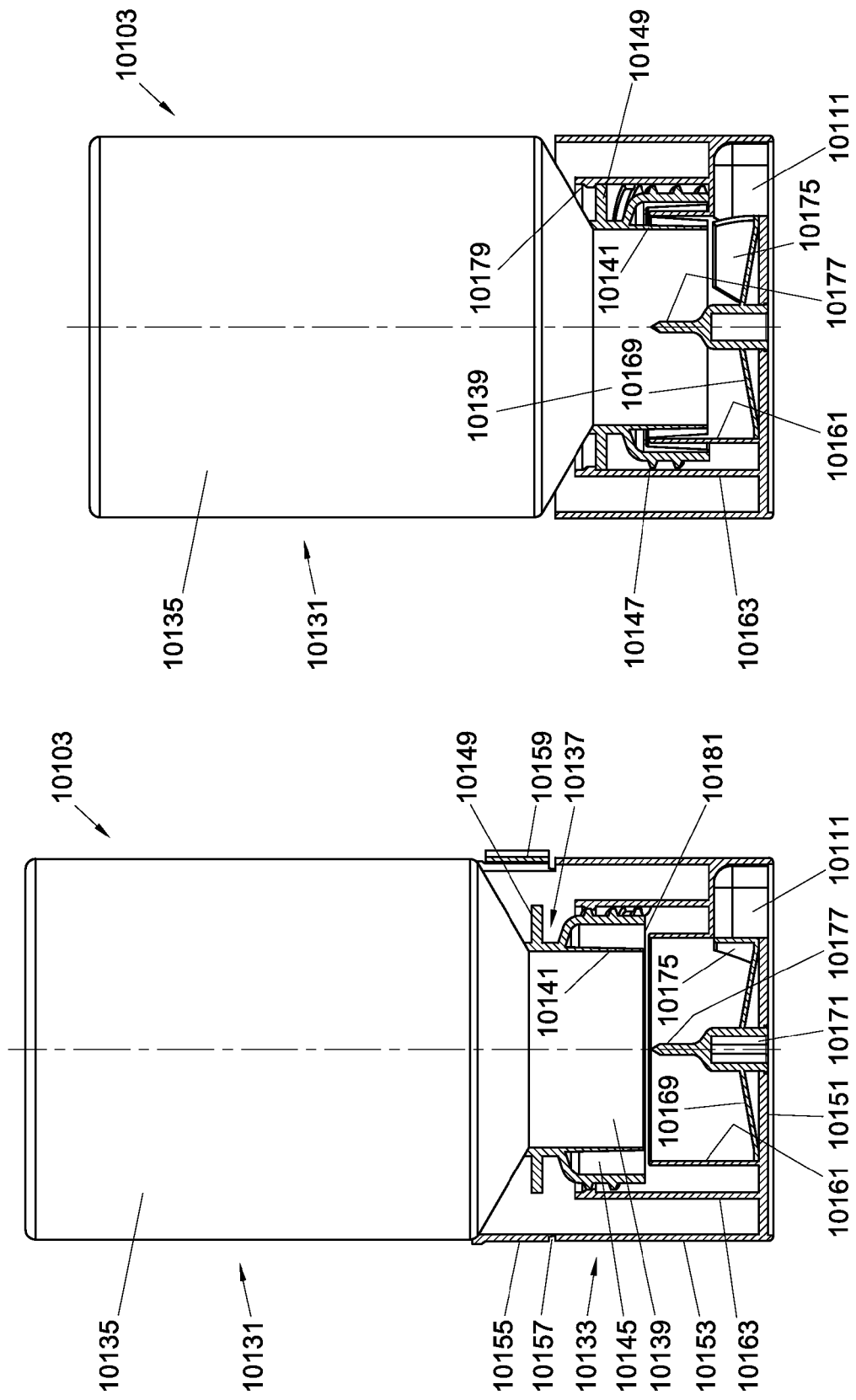

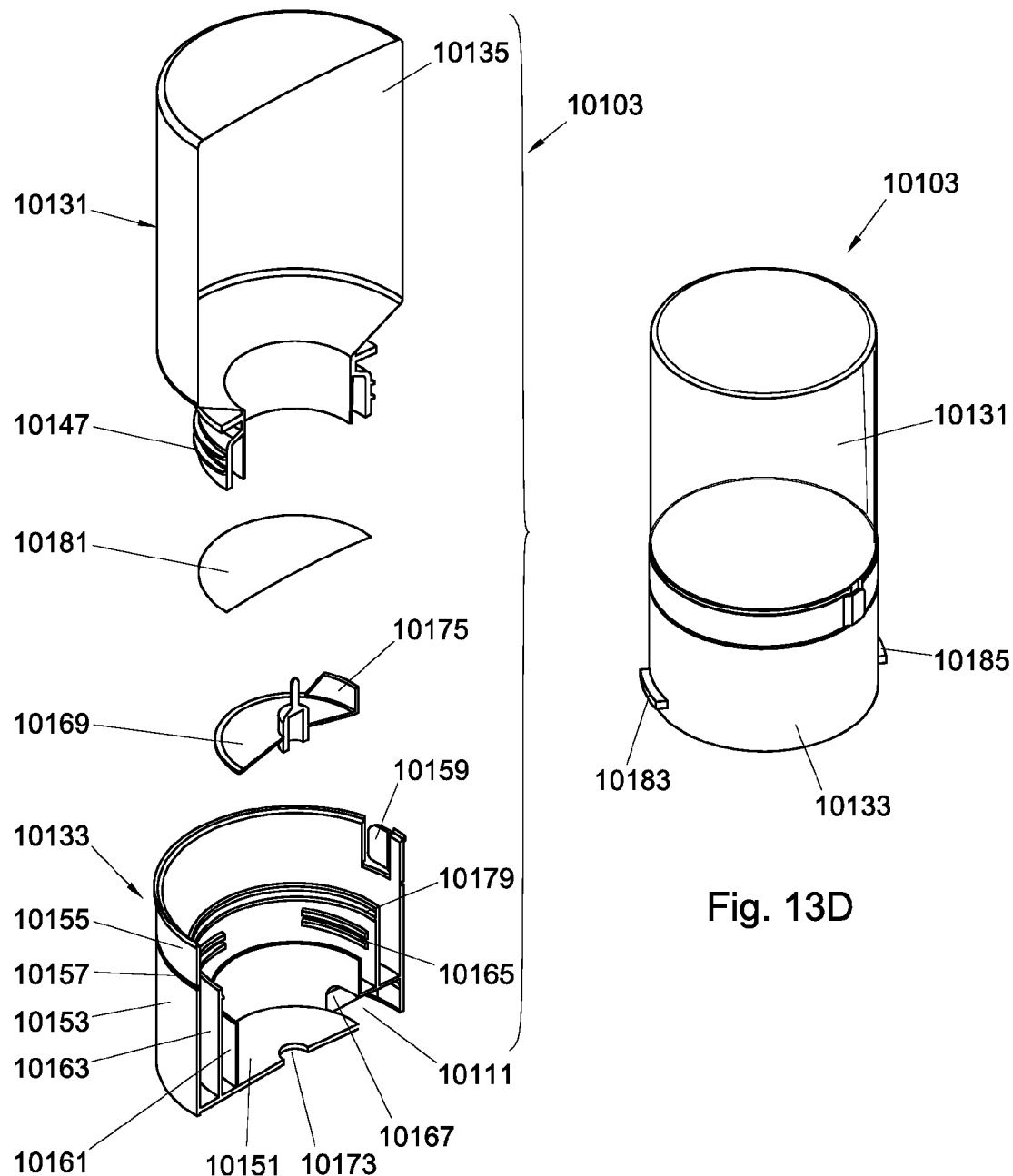

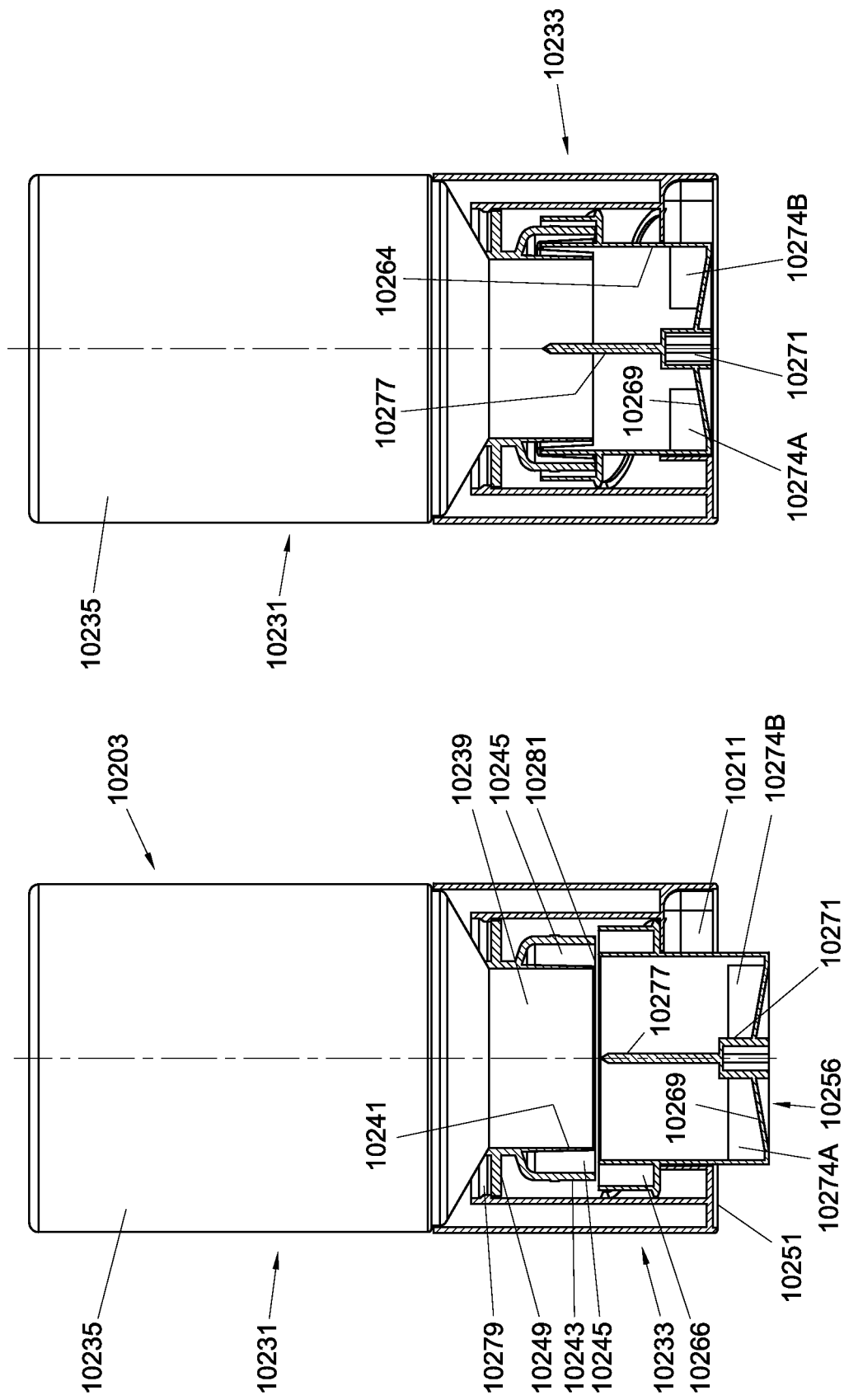

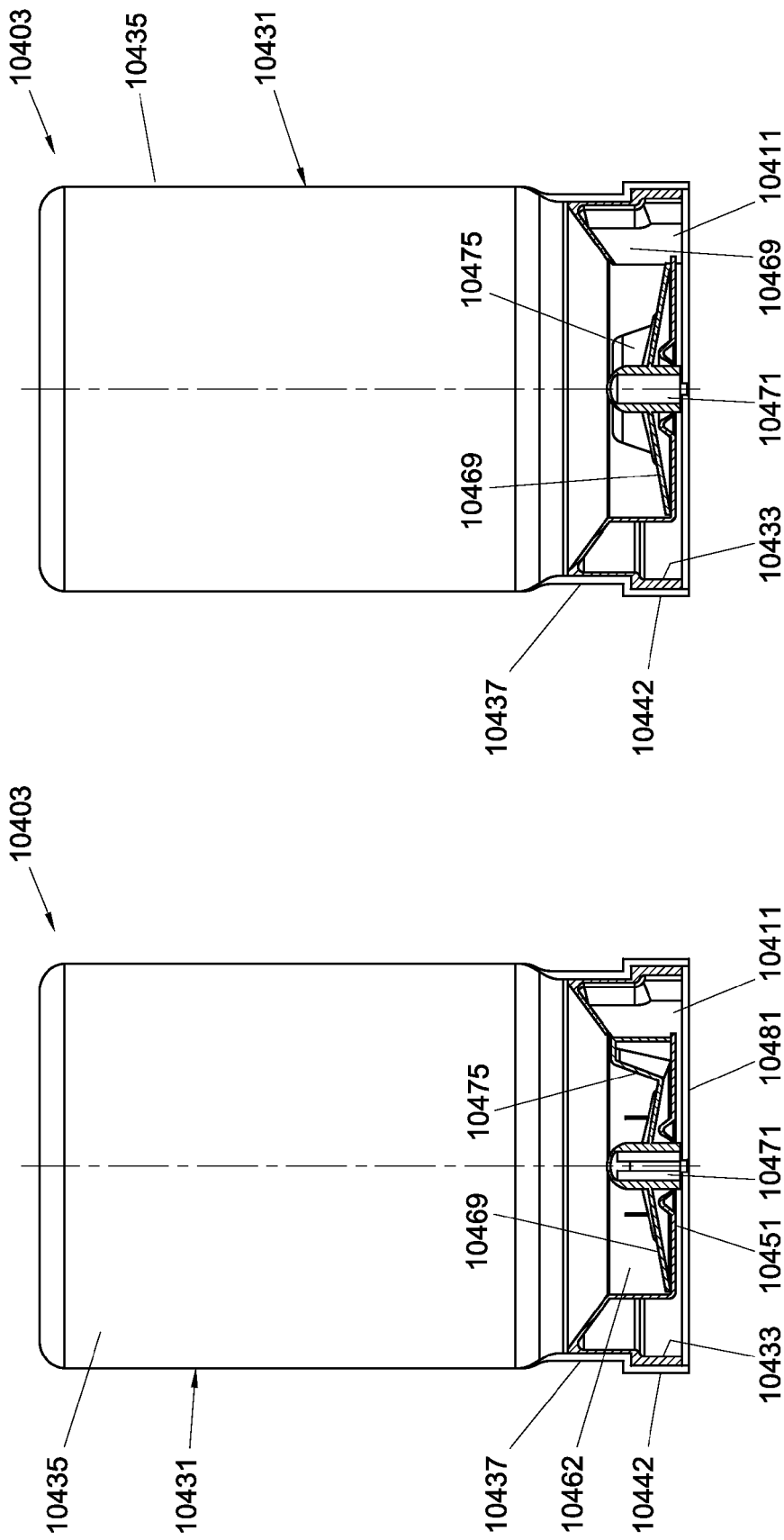

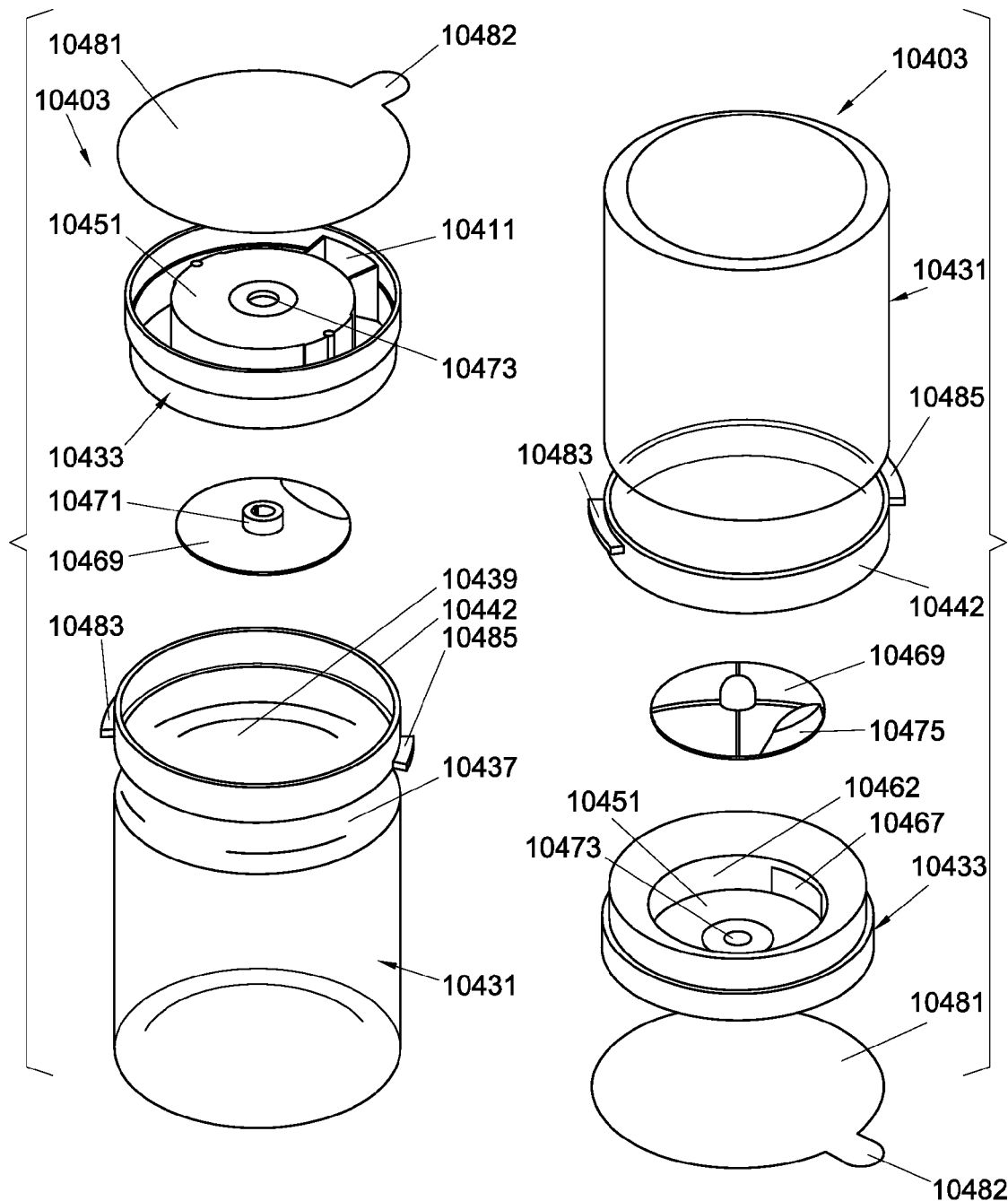

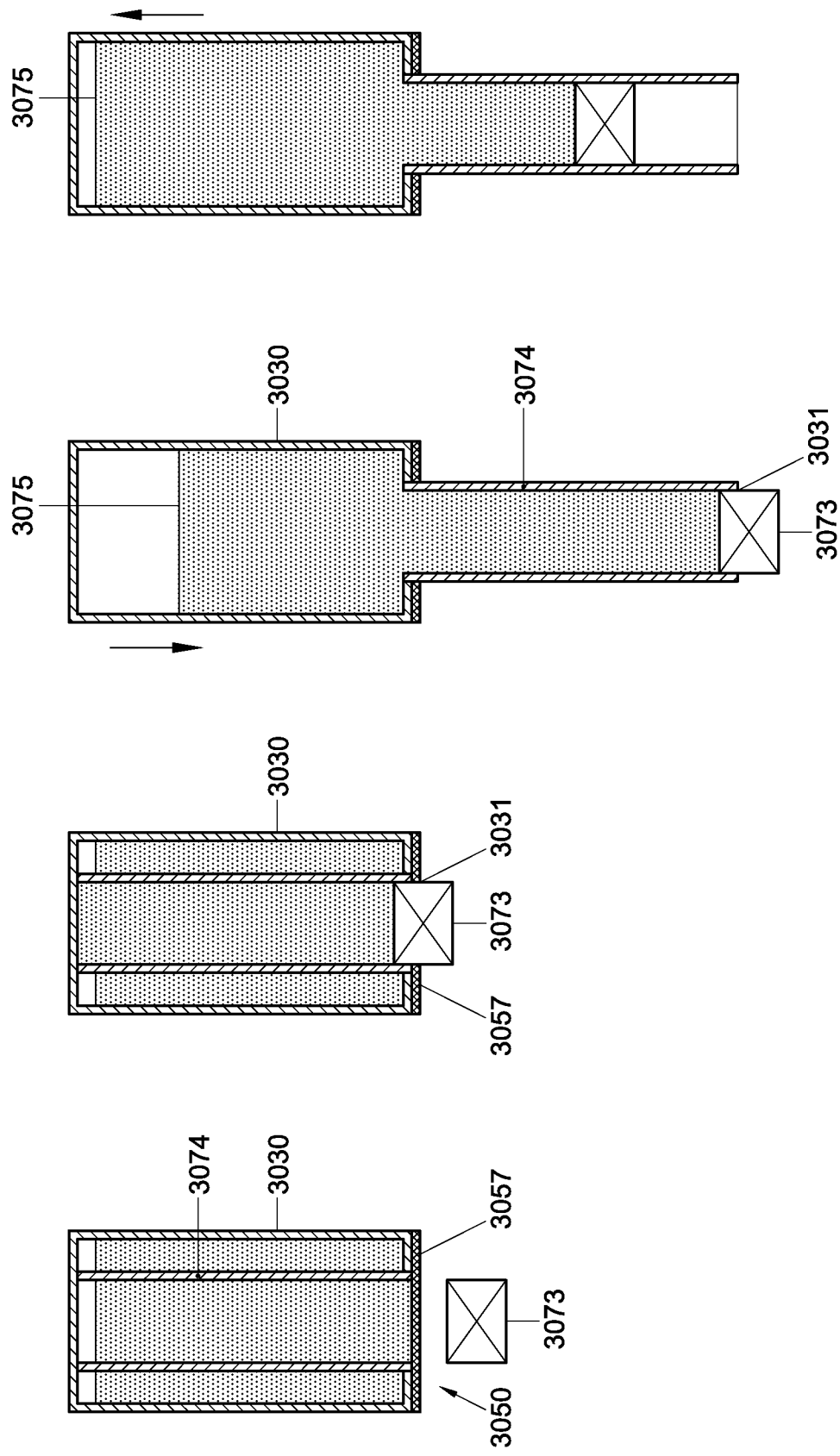

SYSTEM FOR PREPARING A COFFEE BEVERAGE, GROUND COFFEE PACKAGING CARTRIDGE FOR USE WITH SUCH A SYSTEM, METHOD OF PREPARING A BEVERAGE BY MEANS OF SAID SYSTEM, AND METHOD OF SUPPLYING GROUND COFFEE FROM SAID GROUND COFFEE PACKAGING CARTRIDGE

CROSS-REFERENCE TO RELATED APPLICATIONS

The present application is a continuation of International Patent Application Serial No. PCT/NL2011/050108 filed on Feb. 17, 2011 which claims priority to International Patent Application Serial No. PCT/NL2010/050077 filed on Feb. 17, 2010 and Netherlands Application Nos. NL2004274 filed on Feb. 22, 2010, NL2005238 filed on Aug. 17, 2010, NL2005278 filed on Aug. 26, 2010, and NL2005280 filed on Aug. 26, 2010—the full disclosures of all applications listed above are hereby incorporated herein by reference in their entireties.

BACKGROUND

The present invention relates to a coffee beverage system. Roasted coffee beans in packaging cartridges can be connected to the coffee brewing apparatus that includes a grinding mechanism.

The present invention is concerned with a system for in a versatile way preparing a coffee beverage that allows for the use of not only coffee beans but also already ground coffee as a starting point. It is a further object of the present invention to propose a system for preparing coffee beverages of the above referred to kind, which may be more compact. It is also an object of the present invention to provide alternative structures which may be less cumbersome in assembly and operation and which moreover can be made relatively inexpensively. A further object of the invention is to provide a system as described above with which the size of ground coffee particles can be adjusted to the tastes of the or a particular consumer.

Unless stated otherwise, in the description and claims coffee beans are understood to be burnt/roasted coffee beans. Coffee beans in the description and claims may be understood to cover also fragmented coffee beans, that is, coffee bean fragments, which coffee bean fragments are still to be ground for extracting desired coffee beverage. The coffee beans are for instance broken, before they are packaged. In an embodiment, at least a part of the coffee beans in the coffee bean package is divided into about thirty or less, in particular about fifteen or less, more particularly about ten fragments or less. One coffee bean fragment then comprises for instance one-thirtieth part, in particular one-fifteenth part, more particularly one-tenth part or more of a coffee bean. For instance, the coffee bean fragments comprise a half or a quarter of a coffee bean. An advantage of the use of coffee bean fragments compared with whole coffee beans can be that coffee bean fragments can be supplied to the grinder relatively simply and/or that the package can be closed off relatively simply. This is because the coffee bean fragments are relatively small and hence can slide relatively easily through openings in the package and the apparatus and/or will block the coffee bean outlet and/or closing means less easily. As the coffee beans may beforehand have been divided into fragments, though not ground, in the meantime comparatively more bean surface can come into contact with any ambient air than would be the case with whole coffee beans. On the other hand, less bean surface will come into contact with air than would be the case with ground coffee, so that coffee bean fragments can be preserved better than ground coffee beans. Only just before preparation of the coffee beverage are the coffee bean fragments ground for obtaining coffee beverage. In this description, therefore, coffee bean may also be understood to include a fragmented coffee bean, that is, which is still to be ground for preparing the desired coffee beverage.

To this end according to one preferred aspect of the invention there is provided a coffee beverage system, including a coffee bean packaging cartridge and a coffee brewing apparatus. The coffee been packaging cartridge is removable connected to the coffee brewing apparatus and it is arranged for holding and supplying multiple servings of coffee beans. It includes a container comprising an interior volume and at least one exit opening defining a coffee bean outlet, the interior volume holding coffee beans and transportation means adapted for enabling transportation of the coffee beans from the interior volume towards the exit opening of the cartridge. The coffee apparatus comprises an entrance opening for receiving coffee beans which are transported with the aid of the transportation means towards the exit opening, a grinder for grinding coffee beans which have entered the coffee apparatus via the entrance opening and a brewing device for brewing coffee on the basis of ground coffee obtained by means of the grinder. The system is further provided with a metering chamber for receiving coffee beans which are transported with the aid of the transportation means into the metering chamber. Preferably after being filled the metering chamber will hold a dosed amount of coffee beans. The metering chamber comprises a bottom portion which forms a part of the grinder. The bottom portion is arranged in the coffee apparatus for rotating around an axis extending in a vertical direction. The system is arranged such that upon activation of the grinder the bottom portion is rotating around the vertical axis for transporting the coffee beans from the metering chamber into the grinder and for grinding the coffee beans. The use of a bottom portion of the metering chamber, which is part of the grinder and which rotates for emptying the metering chamber also results in a decreased height of the system compared to the alternative option of providing a separate bottom plate of the metering chamber and a separate grinder. The inventive system is further provided with a ground coffee packaging cartridge which is also removably connectable to the coffee brewing apparatus. The ground coffee packaging cartridge is arranged for being filled with and holding and supplying ground coffee. Preferably, the ground coffee packaging cartridge includes a container comprising an interior volume and at least one exit opening defining a ground coffee outlet, the interior volume being arranged for holding ground coffee, and transportation means adapted for enabling transportation of ground coffee from the interior volume towards the exit opening of the ground coffee packaging cartridge. Advantageously, the coffee beverage system is arranged such that ground coffee is transported from the ground coffee packaging cartridge to the coffee brewing apparatus by gravity.

The metering chamber may be divided in a first chamber portion which is part of the respective cartridge and a second chamber portion which is part of the coffee brewing apparatus. The division of the metering chamber over the respective cartridge and the brewing apparatus enables to provide an even more compact coffee beverage system.

In this regard it can be advantageous for emptying the metering chamber that the bottom portion has a conical shape such that the bottom portion extends downwardly in a direction extending perpendicular to and away from the vertical axis.

It is further advantageous for the coffee beverage system according to the invention that the first chamber portion comprises the exit opening and the second chamber portion comprises the entrance opening and that the exit opening extends above the entrance opening. This provides a metering chamber which can be made relatively inexpensive.

The metering chamber may be arranged for receiving a portion of coffee beans or ground coffee corresponding to a dosed amount of coffee beans or ground coffee which is preferably necessary for preparing a single serving of coffee beverage. The transportation means may comprise a part which is movable relative to the metering chamber for effectively transporting the coffee beans or ground coffee towards the metering chamber upon driving of said transportation means. The coffee brewing apparatus may be provided with a motor and a vertically extending drive shaft wherein said drive shaft may be releasable connected with the transportation means of the respective cartridge for driving and thereby moving the transportation means upon rotation of the drive shaft by means of the motor. The movable part may comprise a bottom and/or a plurality of vanes, which rotates around a further vertical axis upon driving the transportation means.

Furthermore, the transportation means may comprise a downwardly extending bottom wall for transporting the coffee beans or ground coffee towards the metering chamber under the influence of gravity. Alternatively, the transportation means may comprise a downwardly extending bottom wall for transporting the coffee beans or ground coffee towards the metering chamber under the influence of gravity only.

The first chamber portion may be provided with a top wall which limits the volume of the metering chamber in an upwardly vertical direction wherein the bottom portion of the second chamber portion limits the volume of the metering chamber in a downwardly vertical direction.

Alternatively or additionally, the first chamber portion may be provided with an upstanding side wall comprising an inlet opening for entering the coffee beans or ground coffee by means of the transportation means into the metering chamber.

It is further advantageous for the coffee beverage system according to the invention, when the transportation means are arranged for transporting the coffee beans or ground coffee at least in a horizontal direction for transporting the coffee beans or ground coffee into the metering chamber and/or towards the inlet opening of the metering chamber.

The grinder may be positioned centrically with respect to the second chamber portion. It may comprise a conical part lying in the direction of the vertical axis, wherein the conical part rotates around the vertical axis upon driving the grinder. The grinder may be driven by a motor. The drive shaft and the grinder may be driven by different motors.

The coffee brewing apparatus may comprise connection means for the removable connection to the respective packaging cartridge. The connection means may comprise a recess at an upper side of the coffee brewing apparatus, the recess being surrounded by a side wall and being configured for receiving a corresponding part protruding from a lower side of the respective packaging cartridge. The side wall may protrude from the upper side of the coffee brewing apparatus and be covered by a housing.

According to an embodiment of the present invention, the side wall comprises openings for receiving bayonet elements of the respective packaging cartridge. The respective packaging cartridge should be inserted into the recess such that the bayonet elements are inserted in the openings and then rotated in order to be connected to the coffee brewing apparatus. The side wall may comprise blocking elements for impeding a further rotation of the respective packaging cartridge, when it has reached its final position. In this way, the user can easily and reliably mount the cartridge on the coffee brewing apparatus. Preferably, the respective packaging cartridge should be rotated approximately 50 degrees in order to reach its final position. The connection between the cartridge and the coffee brewing apparatus may be a snap connection.

Furthermore, the recess may comprise rotatable protruding edges at its center, which are fixed at the end of the driving shaft.

The vertical axis around which the bottom portion of the second chamber portion is rotatable may run centrally through the bottom portion of the second chamber portion. The bottom portion may extend downwardly in a direction extending perpendicular to and away from the vertical axis all around the vertical axis.

The respective packaging cartridge may comprise closing means for closing the outlet when the respective packaging cartridge is not connected to the coffee brewing apparatus. In this way it is avoided that coffee beans or ground coffee fall/falls out of the respective packaging cartridge when it is not connected to the coffee brewing apparatus.

The closing means may be configured for opening the outlet when the respective packaging cartridge is connected to the coffee brewing apparatus.

The closing means comprises a closure member at the bottom side of the container comprising the outlet and a rotatable closing disk having an opening. In order to connect the respective packaging cartridge to the coffee brewing apparatus the opening of the rotatable closing disk may be brought in a position aligned with the outlet.

The closure member may comprise a pair of fletching arms and the closure disk comprises a detent, which in the closed position is caught behind the fletching arms.

The exit opening may be associated with a removable sealing element sealing the interior volume prior to activation of the respective cartridge wherein preferably said sealing element prevents gasses to escape from the cartridge. The beverage system may comprise means for disrupting and displacing the sealing element, preferably when the respective cartridge is connected to the brewing apparatus for the first time. The sealing element may be a sealing membrane.

The system may be arranged such that, in use, the grinding device is activated for emptying the metering chamber and for grinding the coffee beans or ground coffee collected and/or held in the metering chamber. The grinding device may be activated longer than is required for emptying or at least substantially completely emptying the metering chamber and for grinding all the coffee beans or for further grinding all the ground coffee collected in the metering chamber. In this way, the emptying of the metering chamber is reliably performed. Previous to the emptying of the metering chamber and the grinding of the coffee beans or further grinding of all the ground coffee, in a first step the transportation means may be driven for filling the metering chamber. The transportation means may be driven longer than is required for completely filling or at least substantially completely filling the metering chamber. In this way, the dosing of the metering chamber with coffee beans or ground coffee is reliably performed.

The coffee brewing apparatus may be provided with a control device for controlling the first motor and/or the grinder for performing these steps. The control device may control the brewing device wherein the control device may be arranged such that, in use, in a step which follows after that the emptying and grinding step is completed the brewing device is brewing coffee based on the ground coffee and heated water heated by a heating device of the coffee brewing apparatus. The volume of the metering chamber may be such that if it is completely filled with coffee beans the amount of beans corresponds with one dose of coffee beans for preparing a cup of coffee. The one dose of coffee beans or ground coffee may comprise 5-11, preferably 6-8 grams of coffee beans.

According to the invention the respective packaging cartridge can also be designed to be (re)fillable with coffee beans or ground coffee by the consumer. Preferably the respective packaging cartridge is filled with coffee beans or ground coffee and is not designed to be refillable with coffee beans or ground coffee. In that case the respective cartridge is a packaging for the coffee beans or ground coffee to be sold in a shop.

According to a further embodiment, the system further comprises a sensor arranged for detecting if the respective packaging cartridge is connected to the coffee brewing apparatus. The sensor is configured to signal a result of the detection to the controller. The sensor may be a switch, for example a micro switch. The respective packaging cartridge comprises a protruding part for activating the switch when it is connected to the coffee brewing apparatus. The protruding part may be located below or above one of the bayonet elements and may activate the switch when the respective packaging cartridge reaches its final position. The switch may be located in an opening in the sidewall surrounding the recess at the upper side of the coffee brewing apparatus, the protruding part activating the switch through the opening. The switch may be hidden behind horizontal wall segments in the side wall and the opening may be a slit between the horizontal wall segments, the protruding part fitting in the slit. The control device may be arranged for controlling the first motor and the grinder so that they can be activated only if it has been detected that the respective packaging cartridge is present. In this way, it is ensured that the system works with packaging cartridges especially designed thereto. These cartridges may be sold by the manufacturer of the system filled with coffee beans or ground coffee of an elevated quality, thereby guaranteeing the end consumer a good flavor coffee beverage.

The system may further comprise an insert piece that is removable connectable to the coffee brewing apparatus in lieu of a respective packaging cartridge, preferably in a same or similar way as a respective packaging cartridge by using means for connecting the insert piece to the coffee brewing apparatus, which are the same or similar as the means used for connecting a packaging cartridge to the coffee brewing apparatus. In this case, the insert piece comprises bayonet elements and a protruding part, preferably located below or above one of the bayonet elements, for activating the switch when the insert piece is connected to the coffee brewing apparatus. Since the detection of the connected coffee bean or ground coffee packaging cartridge and the insert piece is executed in the same way, the control device of the coffee brewing apparatus does not see any difference between these two situations. This means that the functionality of the coffee brewing apparatus is also the same.

The purpose of connecting an insert piece to the coffee brewing apparatus may be twofold. It is usable for unlocking the coffee brewing apparatus, so that the motor(s) and the grinder(s) may be activated, also if no coffee bean packaging cartridge or ground coffee packaging cartridge is connected thereto. This is useful for service and maintenance.

Alternatively, the insert piece may be used for supplying the coffee brewing apparatus with coffee beans or ground coffee, because the respective packaging cartridges are designed not to be refillable. A favorable embodiment of an insert device for this purpose comprises a cavity having an interior volume and at least one exit opening defining a coffee bean or ground coffee outlet, the interior volume being arranged for receiving coffee beans or ground coffee. The insert piece further comprises closing means for closing the outlet when the insert piece is not connected to the coffee brewing apparatus or not connected to the coffee brewing apparatus in its final position. The closing means are configured for opening the outlet when the insert piece is connected to the coffee brewing apparatus in its final position. A user fills the cavity with coffee beans or ground coffee when the insert piece is connected to the coffee brewing apparatus in an entry position and then rotates the insert piece to its final position, resulting in the coffee beans or ground coffee to enter the coffee brewing apparatus to be ground.

Advantageously, the system may be arranged such that upon activation of the grinder the bottom portion is rotating around the vertical axis for transporting the dose of coffee beans or ground coffee from the metering chamber into the grinder and for grinding the coffee beans or further grinding the ground coffee. The bottom part with the conical shape may lie in the direction of the first vertical axis, wherein the conical part rotates around the first vertical axis upon driving the grinder. The grinder may comprise a lower grinding disk extending around the bottom portion and an upper grinding disk extending above the lower grinding disk. The grinder may be rotationally driven by a second motor, resulting in the rotation of the bottom part with the conical shape and the lower grinding disk. Upon driving the bottom portion and lower grinding disk coffee beans or ground coffee are moved in an outwardly extending radial direction between the lower grinding disk and the upper grinding disk and in that the coffee beans are crunched and cut into ground coffee or ground coffee is further crunched, because a vertical distance between the lower grinding disk and the upper grinding disk decreases in the outwardly extending radial direction.

The grinder may be a no contamination grinder, wherein after grinding the coffee beans or ground coffee and supplying the ground coffee to the coffee brewing device, substantially no ground coffee remains. As a result, when the cartridge is replaced by one with a different blend, the coffee of the new blend is not contaminated by the previously used blend.

The second chamber portion may comprise about 100-X % of the volume of the metering chamber and the first chamber portion may comprise about X % of the volume of the metering chamber wherein X is in the range of 2-50, preferably in the range of 5-40, more preferably in the range of 15-30. By placing a larger part of the metering chamber in the brewing apparatus a further decrease in the height of the beverage system may be obtained. This may be an issue, for example in case that the beverage system is to be placed on a kitchen sink under a cupboard.

In an embodiment the system is arranged such that, in use, the grinding device is activated for emptying the metering chamber and for grinding the coffee beans or ground coffee collected in the metering chamber. Preferably the system is arranged such that in use the grinding device is activated longer than is required for emptying or at least substantially completely emptying the metering chamber and for grinding all the coffee beans or further grinding all the ground coffee collected in the metering chamber. In an embodiment previous to the emptying of the metering chamber and the grinding of the coffee beans or further grinding of the ground coffee, in a first step the transportation means is driven for filling the metering chamber with coffee beans or ground coffee. In particular the transportation means is driven longer than is required for completely filling or at least substantially completely filling the metering chamber.

The coffee bean packaging cartridge is preferably filled with coffee beans and/or the ground coffee packaging cartridge is preferably filled with ground coffee. The packaging cartridge may be filled with one dose, or alternatively, may be filled with multiple servings.

Since the inventive coffee beverage system includes a ground coffee packaging cartridge which is also removably connectable to the coffee brewing apparatus, the user is enabled to connect a ground coffee packaging cartridge to the coffee brewing apparatus. Then the grinder subjects ground coffee from the ground coffee packaging cartridge to a further grinding operation before brewing commences. In this way, the user is able to re-calibrate the grind size distribution of ground coffee to meet his or her taste.

Preferably the ground coffee packaging cartridge is not only arranged for being filled with and holding ground coffee but also for supplying ground coffee, in particular to the coffee brewing apparatus. In this way no additional means are necessary to transport ground coffee from the package to the brewing apparatus. A particular compact system is obtained when the ground coffee packaging cartridge includes a container comprising an interior volume and at least one exit opening defining a ground coffee outlet, the interior volume being arranged for holding ground coffee; and transportation means adapted for enabling transportation of ground coffee from the interior volume towards the exit opening of the ground coffee packaging cartridge.

Preferably the coffee beverage system is arranged such that ground coffee is transported from the ground coffee packaging cartridge to the coffee brewing apparatus by gravity.

For ease of use it is advantageous when the ground coffee packaging cartridge is adapted to the coffee brewing apparatus so that, if the ground coffee packaging cartridge is connected to the coffee brewing apparatus, ground coffee which is transported with the aid of the transportation means of the ground coffee packaging cartridge towards the exit opening of the ground coffee packaging cartridge can be received by the coffee brewing apparatus via the entrance opening for preparing coffee. Preferably the transportation means of the ground coffee packaging cartridge then can be configured to be actuated by the coffee brewing apparatus. Alternatively the transportation means of the ground coffee packaging cartridge can be configured to be actuated independently from the coffee brewing apparatus.

According to an embodiment of the invention the transportation means are configured to be actuated manually. This enables the user to control the amount of ground coffee that is supplied in an easy way, by manually actuating the transportation means until the desired amount is reached.

In an embodiment the transportation means of the ground coffee bean package include a moveable structure that is, at least partly, present in the interior volume for contacting the ground coffee, and wherein the transportation means further include manually operable actuation means that are, at least partly, provided outside of the interior volume for manually actuating the moveable structure. By means of the manually operable actuation means, the moveable structure can be moved from outside the interior volume. In this way a force can be applied to the ground coffee, e.g. for forcing the ground coffee to the outlet. Alternatively a blockage for movement of the ground coffee by another force, such as gravity, to the outlet can be removed by moving the moveable structure. In these ways, a user can control the supply of ground coffee to the coffee brewing apparatus.

Unless stated otherwise, in the description and claims ground coffee is understood to be burnt/roasted ground coffee.

In an embodiment the transportation means of the ground coffee packaging cartridge include a rotatable element, such as a rotatable axle, that is at least partly located inside the interior volume. Such a rotatable element offers the possibility to provide a compact structure inside the housing, thus substantially preventing an unnecessary increase of a volume occupied by the ground coffee packaging cartridge.

In an embodiment the actuation means are arranged for rotating the rotatable element. Preferably the actuation means include a crank handle connected to the rotatable element.

In an embodiment the rotatable element is at least partly formed as a conveyor screw. Preferably the moveable structure includes a threaded bore through which the conveyor screw is engaged. Such a structure may be compact while at the same time providing the possibility for rather accurate control of the supply of ground coffee to the outlet.

In an embodiment the moveable structure is rigidly connected to the rotatable element, and wherein the moveable structure is provided with at least one first aperture for letting the ground coffee pass there through, wherein the ground coffee packaging cartridge is provided with at least one second aperture that is positioned, in use, above or below the at least one first aperture and that offers entrance to the outlet, wherein, as a result of rotating the rotatable element, the at least one aperture can be aligned with the at least one second aperture. Preferably the second aperture is formed by the outlet. As a result, the moveable element in use rotates together with the rotatable element. As a result of aligning the at least one aperture with the at least one second aperture, a certain amount of ground coffee may move, e.g. fall, towards the outlet and out of the interior volume. Thus, by repeatedly aligning the at least one aperture with the at least one second outlet, the supply of ground coffee can be controlled. It may thus be clear that, in this or other embodiments, the outlet may comprise a plurality of apertures, e.g. comprising the at least one second aperture. The plurality of apertures that may form the outlet may or may not be mutually interconnected.

In an embodiment the moveable structure includes a plunger.

Preferably the ground coffee packaging cartridge is further provided with a barrier in the interior volume arranged for hindering passage of ground coffee towards the outlet. Such a barrier may substantially prevent uncontrolled movement of ground coffee towards the outlet.

Preferably the barrier includes a valve for hindering passage of the ground coffee towards the outlet. Such a valve may substantially prevent uncontrolled movement of ground coffee towards the outlet. Preferably, the valve includes a flexible element that is deformed when the valve is opened.

In an embodiment the barrier includes an internal wall spaced apart from, in use, a top part of the housing, wherein the transportation means are arranged for moving the ground coffee through a space between the, in use, top part of the housing and the internal wall. The internal wall may, in use, form a barrier for ground coffee to reach the outlet. By moving the ground coffee upwards by means of the moveable structure, the ground coffee may be transported over the internal wall. In this way, the ground coffee may reach the outlet.

Preferably the internal wall separates a first part of the interior volume from a second part of the interior volume, wherein the moveable structure is arranged in the first part of the interior volume, and wherein the outlet can be reached via the second part of the interior volume.

In an embodiment the moveable structure of the ground coffee packaging cartridge is resiliently attached to the ground coffee packaging cartridge by means of a resilient member, so that the moveable structure is moveable by means of the manually operable actuation means repeatably between a first position and a second position while deforming the resilient member, e.g. from the first position to the second position while deforming the resilient member and vice versa. In use, deformation of the resilient member may e.g. occur during movement from the first position to the second position. During movement back from the second position to the first position, i.e. "vice versa", the deformation of the resilient member may be decreased or may even be completely cancelled. As a result, the resilient member promotes movement of the moveable structure from the second position back to the first position. As a result, it is sufficient to apply a force on the actuation means substantially in only one direction. This facilitates relatively easy operation of the actuation means.

Preferably the second coffee bean packaging cartridge is provided in the interior volume with a passage for ground coffee towards the outlet, wherein in the second position the passage is at least partly obstructed by the moveable structure and in the first position the passage is obstructed less by the moveable structure than in the second position and optionally is not obstructed by the moveable structure. However, alternatively, in the first position the passage is at least partly obstructed by the moveable structure and in the second position the passage is obstructed less by the moveable structure than in the first position and optionally is not obstructed by the moveable structure.

Preferably, the first position is located, in use, above or below the second position. Preferably, at least part of the ground coffee is located, in use, above the moveable structure of the ground coffee packaging cartridge. If the first position is located above the second position, and at least part of the ground coffee is located above the moveable structure, moving the moveable structure repeatedly between the first position to the second position, may result in a shaking motion of the ground coffee. During movement from the second position to the first position, the ground coffee may move, in use, upwards, driven by the resiliently deformable member. During movement from the first position to the second position, the ground coffee may move, in use, downwards, driven by gravity. Such a shaking motion is considered advantageous, as it may promote movement of the ground coffee through the interior volume towards the first position.

In an embodiment, the container of the ground coffee packaging cartridge is provided with a recess for receiving the drive shaft of the coffee brewing apparatus. In this way, the ground coffee packaging cartridge, although being manually operable, can be used in combination with a coffee brewing apparatus provided with a drive member, such as a motor. Such a drive shaft may be arranged for driving transportation means of an alternative coffee bean packaging cartridge. Preferably the container is closed in the recess.

Alternatively the recess may e.g. be arranged for preventing mechanical contact between the drive shaft and the package. In this way it is enabled that the package may be used in combination with the brewing apparatus or in addition another external apparatus that is provided with a drive member, while the package can also be used in combination with another external apparatus that is not provided with an external drive member.

Preferably, the transportation means are positioned for preventing, in use, driving of the transportation means by means of the drive shaft of the coffee brewing apparatus.

In an embodiment the ground coffee packaging cartridge comprises a scooper for holding and supplying the ground coffee, the scooper, when connected to the coffee brewing apparatus, being aligned with the entrance opening thereof, the scooper being configured to work also as transportation means by turning around its axis, thereby emptying the ground coffee into the entrance opening. The dosing of the amount of ground coffee to be supplied to the coffee brewing apparatus is very simple here, it is done by filling the scooper.

Preferably the ground coffee packaging cartridge comprises a handle for manually turning the scooper.

According to an alternative embodiment the ground coffee packaging cartridge comprises a hopper for holding the ground coffee. The hopper preferably has an outlet, which is aligned with the entrance opening of the coffee brewing apparatus, when the ground coffee packaging cartridge is connected thereto. The transportation means advantageously comprise a closure plate, which in a first position at least to a large extent and preferably entirely closes the outlet, thereby hindering passage of the ground coffee towards the entrance opening and in a second position does not obstruct or not substantially obstruct the outlet and wherein the transportation means further include manually operable actuation means for actuating the closure plate from the first to the second position and vice versa. The amount of ground coffee supplied to the coffee brewing apparatus may be dosed by moving the closure plate of the transportation means between the first position, wherein ground coffee is supplied to the coffee brewing apparatus and the second position, wherein this is not the case.

Preferably the closure plate in the second position at least substantially delimits a first part of the interior volume of the hopper from a second part of the interior volume of the hopper, thereby hindering the passage of ground coffee from the first part to the second part. The amount in the second part corresponds to a single dose, which when the closure plate is in the first position, is provided to the coffee brewing apparatus.

Preferably the closure plate forms the first part of a virtual cylinder, the other part of the cylinder being open, wherein the manually operable actuation means are configured for rotating the closure plate to the first and second position, respectively. With each rotation, a dose of ground coffee corresponding to the second part of the interior volume of the hopper is supplied to the coffee brewing apparatus.

The ground coffee packaging cartridge may comprise a funnel shaped holder for holding the ground coffee and an outlet for releasing the ground coffee from the holder. The outlet is positioned at an upper end of the funnel shaped holder and, when the ground coffee packaging cartridge is connected to the coffee brewing apparatus is aligned with the entrance opening thereof, wherein the transportation means are spiral shaped transportation means and, in use, rotatably actuated for driving the ground coffee out of the funnel shaped holder towards the outlet The amount of ground coffee supplied to the coffee brewing apparatus is in this case dependent on the time period that the spiral shaped conveyor means are rotated with ground coffee in the funnel shaped holder.

Preferably the spiral shaped conveyor means are formed by a spiral shaped trajectory for the ground coffee on the inner wall of the funnel, obtained by a spiral shaped protruding edge on the inner wall. The spiral shaped conveyor means may comprise a non-moving block element, impeding the ground coffee to continue rotating on the inner wall, thereby driving the ground coffee to follow the spiral shaped trajectory upwards towards the outlet. As a result, the ground coffee in the funnel shaped holder is driven steadily and reliably towards the outlet thereof.

According to a still further embodiment, the ground coffee packaging cartridge is configured for shaking or vibrating the ground coffee to encourage flow thereof towards an outlet of the ground coffee packaging cartridge for releasing the ground coffee. In this way, an alternative manner of providing the ground coffee to the coffee brewing apparatus is obtained. Preferably the ground coffee packaging cartridge comprises a first module, which is a ground coffee container and a second module, which comprises a motor, the first module being removably connectable to the coffee brewing apparatus and the second module being removably connectable to the first module, when the first module is connected to the coffee brewing apparatus. As a result of this modular structure, the ground coffee of the first module may either be supplied to the coffee brewing apparatus due to the operation of the motor in the second module or, in case that the second module is not connected to the first module, due to operation of the transportation means present in the coffee brewing apparatus.

Still further, the outlet of the ground coffee packaging cartridge is open when it is connected to the coffee brewing apparatus and closed when it is disconnected, and wherein the second module, preferably in a ground coffee refill mode, is connectable to the first module in lieu of the coffee brewing apparatus. Preferably, in the ground coffee refill mode, the second module is connected in a same or similar way to the first module as the coffee brewing apparatus, resulting in the outlet of the first module being open. As a result, the first module, i.e. the coffee bean container, may be refilled with ground coffee in a user friendly way.

In a further embodiment the coffee brewing apparatus comprises connection means for the removable connection to the coffee bean packaging cartridge as well as the ground coffee packaging cartridge, the connection means comprising a recess at an upper side of the coffee brewing apparatus, the recess being surrounded by a side wall and being configured for receiving a corresponding part protruding from a lower side of the coffee bean packaging cartridge and the ground coffee packaging cartridge, respectively.

Preferably, the side wall protrudes from the upper side of the coffee brewing apparatus.

A user can easily and reliably mount the packaging cartridge and the package on the coffee brewing apparatus when the side wall comprises openings for receiving bayonet elements of the coffee bean packaging cartridge and the package, respectively, in particular when the coffee bean packaging cartridge and the ground coffee packaging cartridge comprise the bayonet elements. Especially advantageous is then that the coffee bean packaging cartridge and the ground coffee packaging cartridge should be inserted into the recess such that the bayonet elements are inserted in the openings and then rotated in order to be connected to the coffee brewing apparatus, wherein the side wall comprises blocking elements for impeding a further rotation of the coffee bean packaging cartridge and the ground coffee packaging cartridge, when they have reached their final position. For ease of manual mounting the cartridge and the package the coffee bean packaging cartridge and the ground coffee packaging cartridge should be rotated approximately 50 degrees in order to reach their final position.

In order to be able to consistently provide uniform doses of ground coffee in an easy and reproducible manner the coffee brewing apparatus is further provided with a metering chamber for receiving ground coffee which is transported with the aid of the transportation means into the metering chamber. In particular the metering chamber is dimensioned to hold a predetermined amount of coffee beans and ground coffee, respectively.

In an embodiment, the coffee beverage system comprises a dosing device for supplying a predetermined dose of ground coffee to the coffee brewing apparatus. The dosing device can contribute to the purpose that not more and not less than approximately a predetermined dose of ground coffee is supplied to the brewing device. In a further embodiment the dosing device forms part of the ground coffee packaging cartridge. For instance, the ground coffee packaging cartridge is provided with the predetermined dose of ground coffee so that the package can in principle be emptied into the brewing apparatus.

In an alternative embodiment of the coffee beverage system according to the invention the dosing device forms part of coffee brewing apparatus. In this way, a predetermined dose of ground coffee can be taken from the package, while for instance a residual part remains behind in the package.

Preferably the dosing device comprises a displaceable dosing element.

A predetermined dose of ground coffee comprises for instance a weight of ground coffee of approximately equal to 50 grams or less, in particular 20 grams of less, more particularly 15 grams or less.

In an embodiment the coffee brewing apparatus comprises a ground coffee transport path that extends from the entrance opening of the coffee brewing apparatus to the brewing device, wherein the coffee beverage system is arranged such that prior to preparing the coffee beverage substantially any remnant ground coffee remaining behind in ground coffee transport path is removed. This prevents ground coffee of a previous preparation of a coffee beverage remaining behind and being entrained in the coffee beverage to be prepared next.

A versatile coffee beverage system is provided when it comprises a first ground coffee packaging cartridge in which a first kind of coffee is contained and a second ground coffee packaging cartridge in which a second kind of coffee is contained, the first and second kinds being different, wherein the coffee beverage system is arranged such that after coffee beverage has been prepared with the coffee brewing apparatus with ground coffee from the first ground coffee packaging cartridge, the first ground coffee packaging cartridge can be disconnected from the coffee brewing apparatus and the second ground coffee packaging cartridge can be connected to the coffee brewing apparatus after which coffee beverage can be prepared with the coffee brewing apparatus with coffee grounds from the second ground coffee packaging cartridge substantially without contamination from ground coffee from the first ground coffee packaging cartridge.

To allow a user to easily replace or refill a package an embodiment of the coffee beverage system according to the invention comprises a check device for checking if any ground coffee is present in the ground coffee outlet of the ground coffee packaging cartridge. Preferably the coffee beverage system further comprises means to detect that a ground coffee packaging cartridge no longer contains sufficient ground coffee for preparing a serving of coffee beverage, such as a cup of coffee beverage. Preferably said means to detect that a ground coffee packaging cartridge no longer contains sufficient ground coffee for preparing a serving of coffee beverage operates by detecting the emptiness of the ground coffee packaging cartridge.

To maintain the quality of ground coffee as much as possible an embodiment of the coffee beverage system is arranged such that the amount of air that comes into the ground coffee packaging cartridge is at most equal to the volume of the ground coffee that has been supplied from the ground coffee packaging cartridge to the coffee brewing apparatus and/or that the interior of the coffee beverage system where ground coffee is permitted to be present is designed to be substantially air-tight with respect to an environment of the coffee beverage system, while preferably said interior of the coffee beverage system is formed by the inner space of the ground coffee packaging cartridge, a ground coffee transport path from the ground coffee packaging cartridge to the brewing device, and the brewing device itself.

A reproducible way of brewing a coffee beverage is obtained when the coffee brewing device comprises a horizontal brew sleeve for holding a ground coffee puck across the diameter of the brew sleeve and for performing brewing of the ground coffee puck. Preferably, moving parts of the brewing device are driven by a single drive mechanism. In an advantageous way of making a tasteful coffee beverage the coffee brewing apparatus is arranged to prepare coffee beverage under high pressure which is conventional for preparing espresso coffee, under atmospheric pressure which is conventional in pour-on drip extraction systems, or under slightly elevated pressure in the order of 1.1-2, in particular 1.1-1.5 bar.

The grinder is in particular operable to grind already ground coffee, and is preferably switchable to a configuration in which it allows ground coffee to pass there through without undergoing a further grinding operation.

The present invention further relates to a ground coffee packaging cartridge for use with the coffee beverage system according to the invention, the ground coffee packaging cartridge being arranged for holding and supplying ground coffee and including transportation means adapted for enabling transportation of ground coffee towards an outlet of the ground coffee packaging cartridge, in particular towards entrance opening of a coffee brewing apparatus when it is connected thereto; the ground coffee packaging cartridge comprising bayonet elements to be inserted into the openings of the side wall, which protrudes from the upper side of the coffee brewing apparatus, in particular for connecting the ground coffee packaging cartridge to a coffee brewing apparatus, wherein the transportation means are configured to be actuated independently from the coffee brewing apparatus.

According to a further aspect of the invention a method is provided for preparing a beverage by means of a coffee brewing apparatus as described herein above. The method comprises the following steps: In a filling step the metering chamber may be filled with coffee beans or ground coffee for collecting coffee beans or ground coffee in the metering chamber. The metering chamber may be completely filled with coffee beans or ground coffee or at least substantially completely filled with coffee beans or ground coffee. In an emptying and grinding step the grinding device is activated for emptying the metering chamber and for grinding coffee beans or further grinding ground coffee collected in the metering chamber. The grinding device may be activated longer than is required for emptying or at least substantially completely emptying the metering chamber and for grinding all the coffee beans or all the ground coffee collected in the metering chamber.

The invention also relates to a method of preparing a beverage by means of a coffee beverage system according to the invention, the method comprising the following steps:

connecting the coffee bean packaging cartridge to the coffee brewing apparatus, rotating the vertically extending drive shaft with the motor means thereby driving and moving the transportation means of the coffee bean packaging cartridge for transporting coffee beans towards the exit opening of the coffee bean packaging cartridge;

grinding coffee beans which have entered the coffee brewing apparatus via the entrance opening thereof to produce ground coffee;

brewing coffee on the basis of ground coffee;

connecting the ground coffee packaging cartridge to the coffee brewing apparatus thereof, actuating the transportation means of the ground coffee packaging cartridge for transporting ground coffee towards the exit opening of the ground coffee packaging cartridge independently from the coffee brewing apparatus;

brewing coffee on the basis of ground coffee from the ground coffee packaging cartridge.

The invention still further relates to a method of supplying ground coffee from a ground coffee packaging cartridge according to the invention to an external apparatus, the method comprising the following steps:

holding ground coffee in a housing that encloses an interior volume of the ground coffee packaging cartridge, releasing ground coffee from the interior volume through the outlet of the housing, transporting ground coffee by means of the transportation means towards the outlet, wherein transporting ground coffee includes contacting ground coffee by means of the moveable structure of the transportation means, actuating the moveable structure by means of manually operable actuation means of the transportation means.

Further subsidiary features of preferred embodiments of the present invention are described in the following description and defined in the appended claims.

BRIEF DESCRIPTION OF THE DRAWINGS

Exemplary embodiments of the present invention are hereinafter described with reference to the accompanying drawings, in which:

FIG. 13A shows in cross-section a first embodiment of a ground coffee packaging cartridge in its not yet activated position;

FIG. 13B shows the ground coffee packaging cartridge of FIG. 13A in its activated position;

FIG. 13C shows the component of the ground coffee packaging cartridge of FIGS. 13A and 13B in half and in an exploded arrangement, FIG. 13D is a perspective view of the ground coffee packaging cartridge of the first embodiment in a condition prior to use;

FIG. 14A is a cross-section of a second embodiment of the ground coffee packaging cartridge in its condition prior to use;

FIG. 14B is a cross-section similar to FIG. 14A, but with the ground coffee packaging cartridge having been activated for use;

FIG. 16A is a cross-section showing a fourth embodiment of the ground coffee packaging cartridge in its closed position prior to use;

FIG. 16B is a cross-section similar to FIG. 16A but with the ground coffee packaging cartridge in an opened condition ready for use;

FIG. 16C is a first perspective exploded view of the fourth embodiment of the ground coffee packaging cartridge showing the parts in an inversed arrangement;

FIG. 16D is a second perspective exploded view of the fourth embodiment in an arrangement normal to the position of use;

DESCRIPTION OF EXEMPLARY EMBODIMENTS

Figure 1:
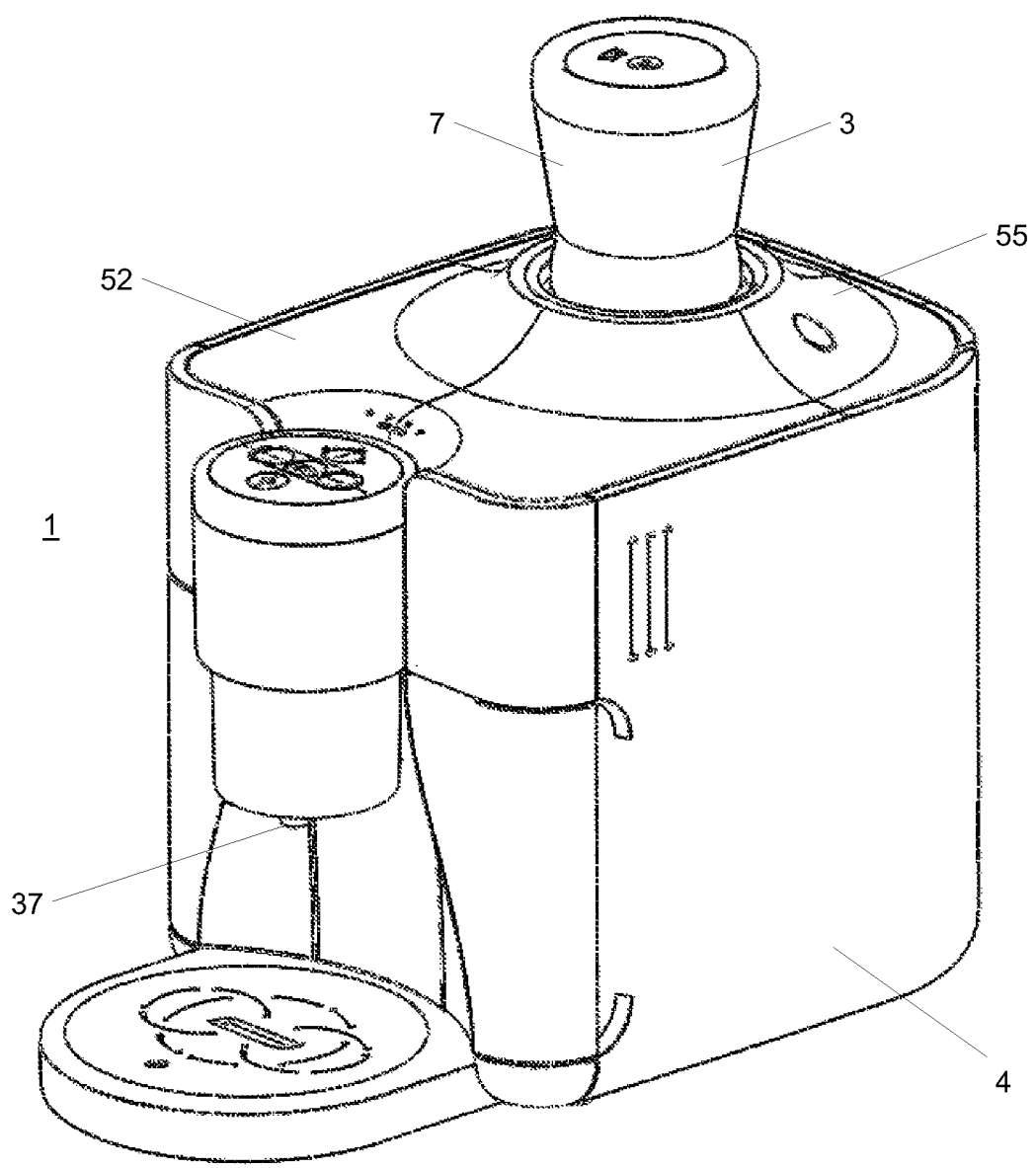
FIG. 1 shows a perspective view of an embodiment of the coffee beverage system according to the present invention with the coffee bean packaging cartridge mounted to the coffee brewing apparatus.
Figure 2:
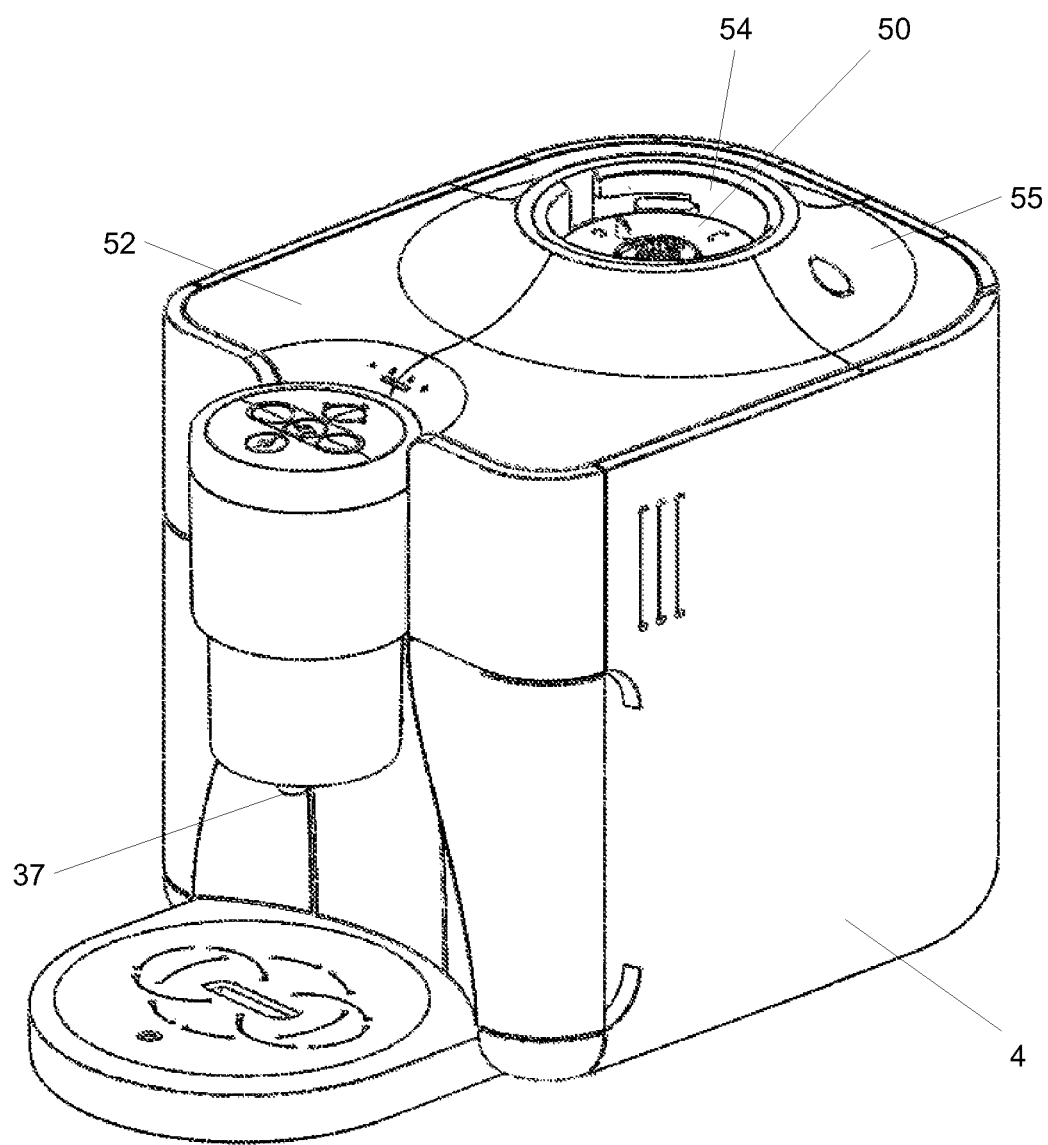
FIG. 2 shows a perspective view of an embodiment of the coffee beverage system according to the present invention without the coffee bean packaging cartridge mounted to the coffee brewing apparatus.

In FIG. 1 a system 1 for preparing coffee beverages is shown. The system 1 includes a coffee bean packaging cartridge 3 and a coffee brewing apparatus 4. The coffee bean packaging cartridge 3 is removably connected to the coffee brewing apparatus 4. FIG. 2 shows the coffee brewing apparatus without the coffee bean packaging cartridge 3 mounted thereon. The coffee bean packaging cartridge 3 comprises a container 7 comprising an interior volume for containing coffee beans and an exit opening. These coffee beans are roasted and include generally roasted half beans. Preferably the coffee beans packaging cartridge 3 is closed airtight and/or under vacuum before it is placed on the coffee brewing apparatus 4. Also the coffee bean packaging cartridge 3 can be in the form of a disposable packaging, so that it can be thrown away after it has been emptied.

Figure 3A:
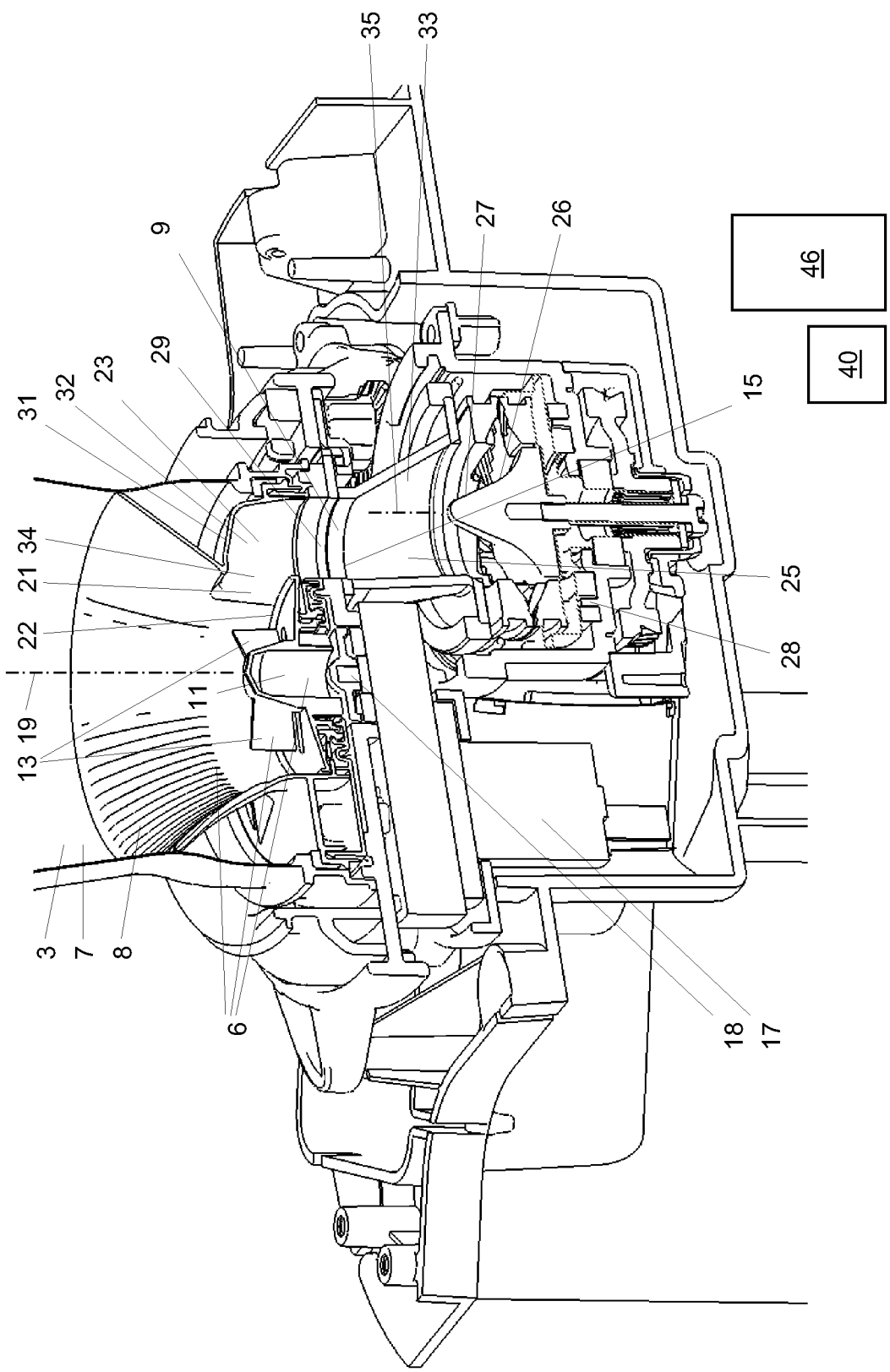
FIG. 3A shows a cross sectional view of a part of the coffee brewing apparatus according to FIG. 1 in perspective.

Referring now to FIG. 3A, the coffee beverage system 1 will be described in more detail. The cartridge comprises transportation means 6 for enabling transportation of the coffee beans from the interior volume of the container 7 (only partially visible in FIG. 3A) towards the exit opening 29 of the cartridge 3. The coffee brewing apparatus is provided with an entrance opening 9 for receiving coffee beans which are transported by means of the transportation means towards the exit opening 29. The exit opening 29 extends above the coffee bean entrance opening 9 of the coffee brewing apparatus 4.

A lower part of the container 7 comprises a funnel 8 which forms part of the transportation means 6. The beans of the coffee bean packaging cartridge 3 are guided by means of the funnel 8 towards the exit opening 29 of the cartridge. The transportation means further comprise an impellor 11 having several flexible vanes 13. Upon driving the transportation means, in this example by rotating the impellor around a second axes 19 extending in a vertical direction the coffee beans are transported towards the exit opening 29.

The system further comprises a metering chamber 15. The metering chamber is divided in a first chamber portion 23 which is part of the cartridge and a second chamber portion 25 which is part of the coffee brewing apparatus. The first chamber portion is located above the second chamber portion. The first chamber portion comprises the exit opening 29 of the cartridge and the second chamber portion comprises the entrance opening of the coffee apparatus. The first chamber portion is provided with an upstanding side wall 32 comprising an inlet opening 21 for letting pass coffee beans into the metering chamber which coffee beans are transported by means of the transportations means towards the exit opening of the cartridge. The transportation means are thus configured for transporting the coffee beans towards and into the metering chamber 15 of the coffee brewing apparatus 4 upon driving of the transportation means. This driving is performed by means of a first motor 17 of the coffee brewing apparatus, driving a drive shaft 18 of the coffee brewing apparatus extending along a second vertical axis 19. Due to the driving, the impellor 11 and the vanes 13 rotate around the second vertical axis 19. In this way, the coffee beans are driven in a horizontal direction to the inlet opening 21 of the metering chamber 15. The cartridge comprises a small trickle through edge 22 to avoid the uncontrolled entering of coffee beans in the metering chamber 15 when the impeller 11 is not rotating. The metering chamber 15 comprises the first chamber portion 23 in the cartridge 3 and the second chamber portion 25 in the brewing apparatus 4. The bottom 26 of the metering chamber at least comprises a bottom portion 27 which is part of a grinder 28 for grinding coffee beans. The coffee beans leave the first chamber portion 23 and thereby the cartridge 3 via the exit opening 29 of the cartridge 3 and enter the second chamber portion 25 and thereby the coffee brewing apparatus via the entrance opening 9. The size of the metering chamber is limited by a top wall 31, the bottom 26 and an upstanding side wall 32. The upstanding side wall 32 comprises the upstanding side wall 34 of the first chamber portion and an upstanding side wall 33 of the second chamber portion. The second chamber portion comprises about 100-X % of the volume of the metering chamber and the first chamber portion comprises about X % of the volume of the metering chamber wherein X is in the range of 2-50, preferably in the range of 5-40, more preferably in the range of 15-30.

Figure 3B:
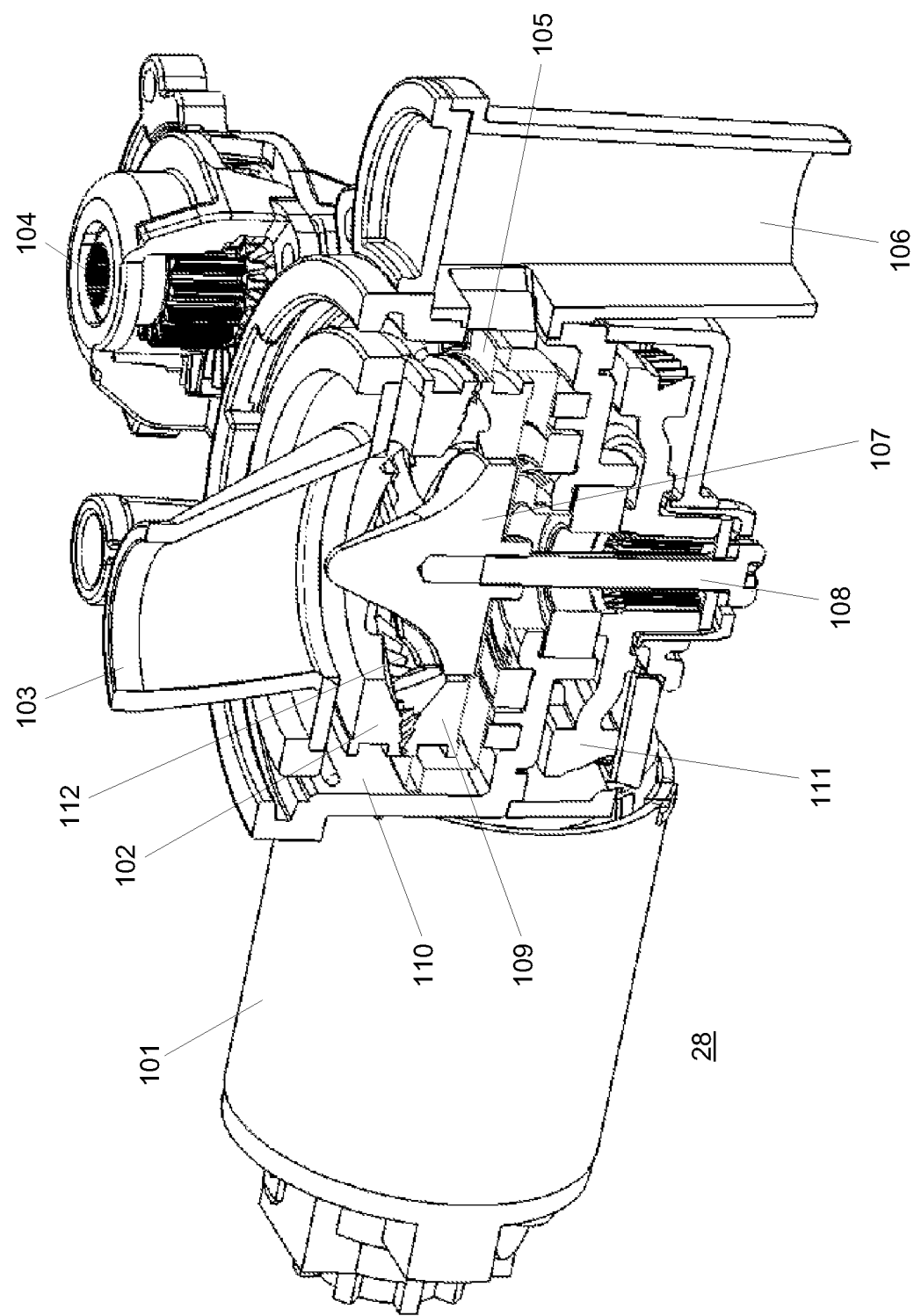
FIG. 3B shows a cross sectional view of the grinder used in the coffee brewing apparatus according to FIG. 1 in perspective.
Figure 3C:
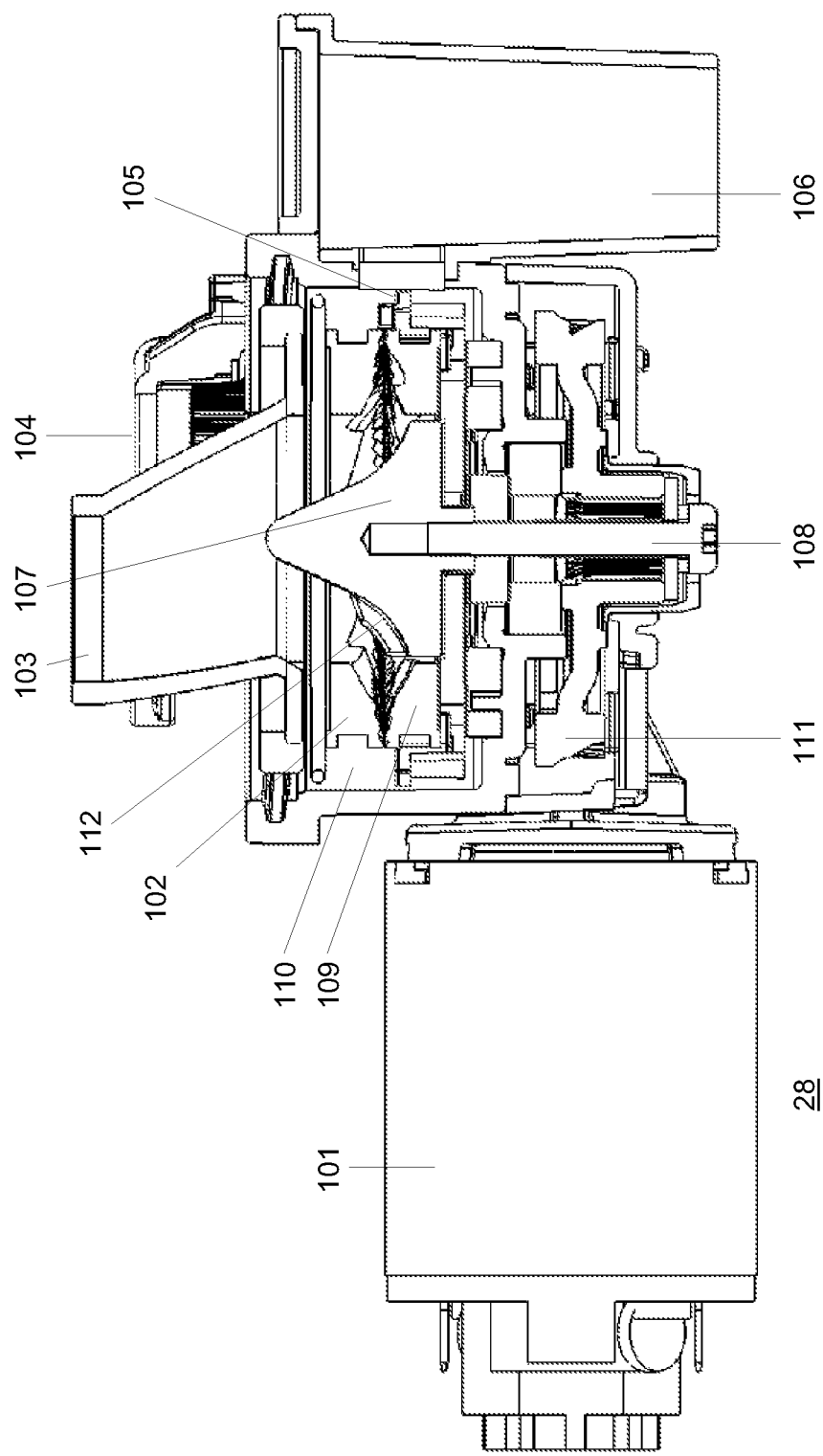
FIG. 3C shows a cross sectional view of the grinder used in the coffee brewing apparatus according to FIG. 1.

The bottom part 27 of the metering chamber has a conical shape such that the bottom portion extends downwardly in a direction extending perpendicular to and away from a first vertical axis 35. The grinder 28 in this embodiment is positioned centrically with respect to the second chamber portion 25. Referring now to FIGS. 3B and 3C, the grinder will be described in more detail. The grinder comprises a second motor (grinder drive motor) 101 and an upper grinding disk/wheel 102, which may be ceramic or steel. The upper grinding disk/wheel is rotationally fixed in its position. Furthermore, the second chamber 103 of the metering chamber is shown (referred to by reference 25 in FIG. 3), which works as dosing funnel. The grinder furthermore comprises a manual adjustment lock 104 to adjust the grind fineness setting by the consumer. The upper grinding disk 102 is moved up or down in respect to the lower grinding disk/wheel 109 when this key is turned. When the adjustment lock is operated the upper grinding disk moves up and down and the lower grinding disk stays in place. In this way the size of the grind at the exit of the grinding disks, i.e. where they almost touch the outside of the grinder, is determined. The grinder furthermore comprises an exit location 105 for ground coffee out of the circular transport channel 110 into the ground coffee chute 106. The ground coffee chute is a funnel pointing downwards into the brewing device 46 of the coffee brewing apparatus, which is open on the top and placed exactly below this chute when grinding. A rotating drive cone 107 (referred to as bottom part with conical shape 27 of the metering chamber in FIG. 3) is fixed on the main drive shaft 108. This cone ensures the movement and guidance of the beans out of the metering chamber into the grinding section consisting of the upper grinding disk 102 and the lower grinding disk 109, which may be ceramic or steel. The upper grinding disk 102 and the lower grinding disk 109 have a suitable milled shape for grinding the coffee beans, as is well known in the art. The main drive shaft drives the lower grinding disk 109 and the rotating drive cone 107. There is formed a circular transport channel 110, which transports the ground coffee exiting out of the slit between upper and lower grinding disk to the exit location 105. The shape of the channel results in a "no contamination" grinder, wherein virtually no coffee beans/ground coffee remains after finishing the grinding. Furthermore, the grinder comprises a motor transmission/gear 111 and a cone protrusion 112 to force the beans between the grinder disks.

The lower grinding disk 109 extends around rotating drive cone 107 and the upper grinding disk 102 extends above the lower grinder disk 109. The grinder is rotationally driven by motor 101 resulting in the rotation of the drive cone 107 and the lower grinding disk 109. Due to the shape of the cone protrusion 112 upon driving the drive cone 107 and the lower grinding disk coffee beans are moved in an outwardly extending radial direction between the lower grinding disk 109 and the upper grinding disk 102. Because a vertical distance between the lower grinding disk 109 and the upper grinding disk 102 decreases in the outwardly extending radial direction the beans are crunched and cut into ground coffee.

As explained, grinder 28 supplies ground coffee to a brewing device 46 (schematically shown in FIG. 3A) of the coffee brewing apparatus. The brewing device is arranged to receive a supply of water to extract a coffee beverage from the ground coffee. The coffee beverage is discharged from a coffee beverage exit 37 from the coffee brewing apparatus into a cup or like household receptacle. A water supply can be arranged to supply water to the coffee brewing device under pressure for espresso type coffee beverages or may provide a drip feed to the extraction system formed by coffee brewing device.

Before operating the coffee beverage system, the user has to connect the coffee bean package cartridge 3 to the coffee brewing apparatus 4. FIGS. 4-9 show an embodiment of the connection means of the coffee beverage system, which are used for this purpose.

Figure 4A:
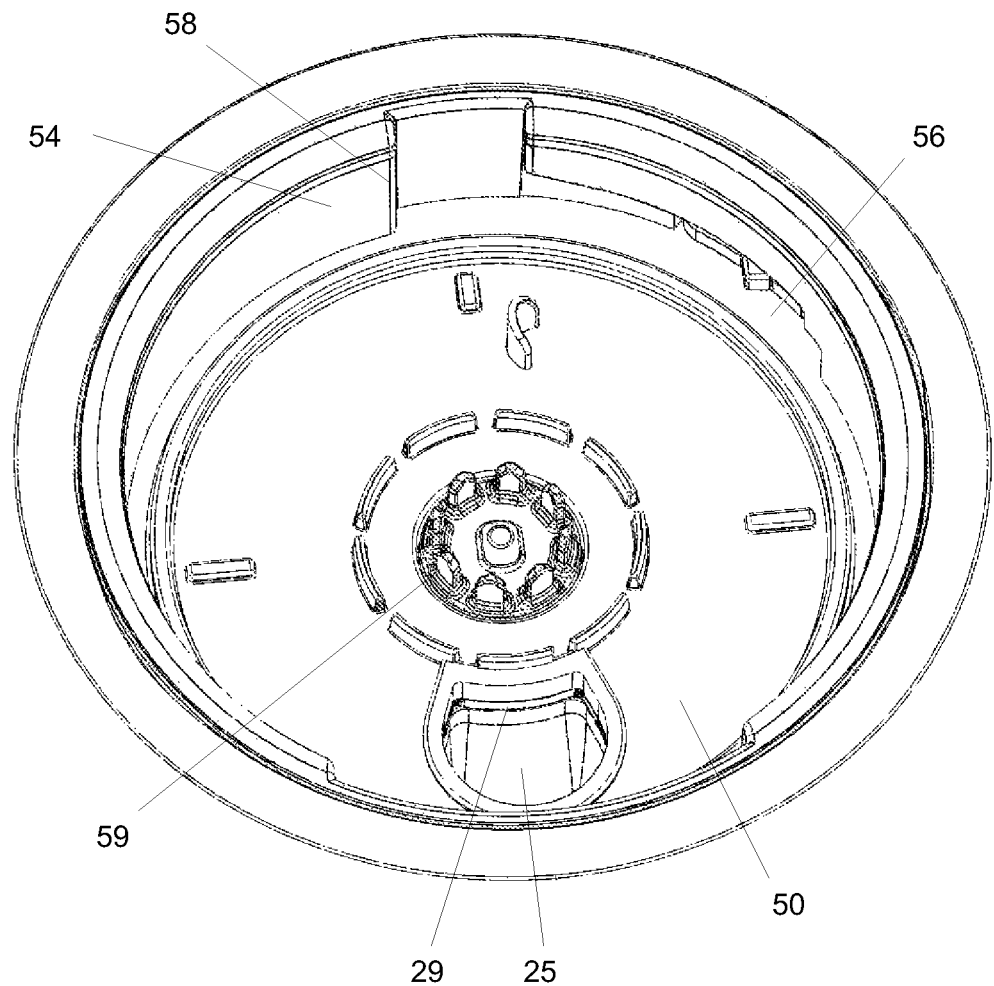
FIG. 4A shows a perspective detail view of the upper part of the coffee brewing apparatus of FIG. 2.
Figure 4B:
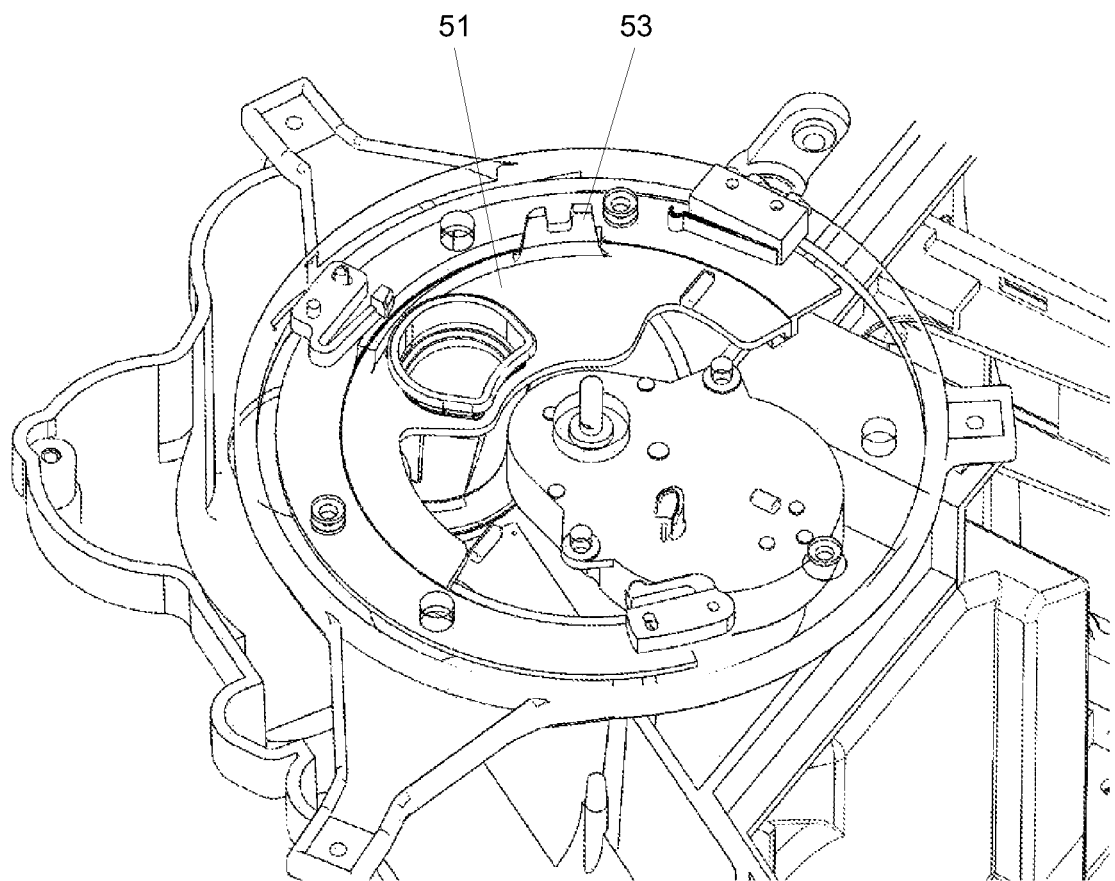
FIG. 4B shows a perspective detail view of the upper part of the coffee brewing apparatus of FIG. 2 with a closing plate in open position.

Referring now to FIG. 4A, the connection means comprise a recess 50 at an upper side 52 of the coffee brewing apparatus 4. The recess 50 is surrounded by a side wall 54 protruding from the upper side of the coffee brewing apparatus 4. The user should place the corresponding part, shown in FIGS. 5A, 5B, 6A, 6B, 6C, 7A, 7B, 7C, 8 and 9, at a lower side of the coffee bean packaging cartridge into the recess. The bayonet elements to be described later of the coffee bean packaging cartridge should be placed in the corresponding openings 58 in the side wall 54 of the recess 50. The user should then rotate the cartridge over 50 degrees until reaching the blocking elements 56 for impeding a further rotation of the coffee bean packaging cartridge. At this position the exit opening 29 of the first chamber portion 23 is aligned with the coffee inlet 9 of the second chamber portion 25. When the cartridge 3 is removed from the coffee brewing apparatus, the second chamber portion 25 in the appliance is closed by means of an appliance closing plate 51 (FIG. 4B). The appliance closing plate is being driven by a protrusion 1686 (FIG. 6C) on the neck of the cartridge which slots into a keyhole 53 on the appliance closing plate as the cartridge is being placed into the openings 58 in the side wall 54 of the recess 50. As the user rotates the cartridge over a 50 degrees angle during placement the closing disk in the consumable and the closing plate in the appliance are opened, simultaneously.

Figure 5A:
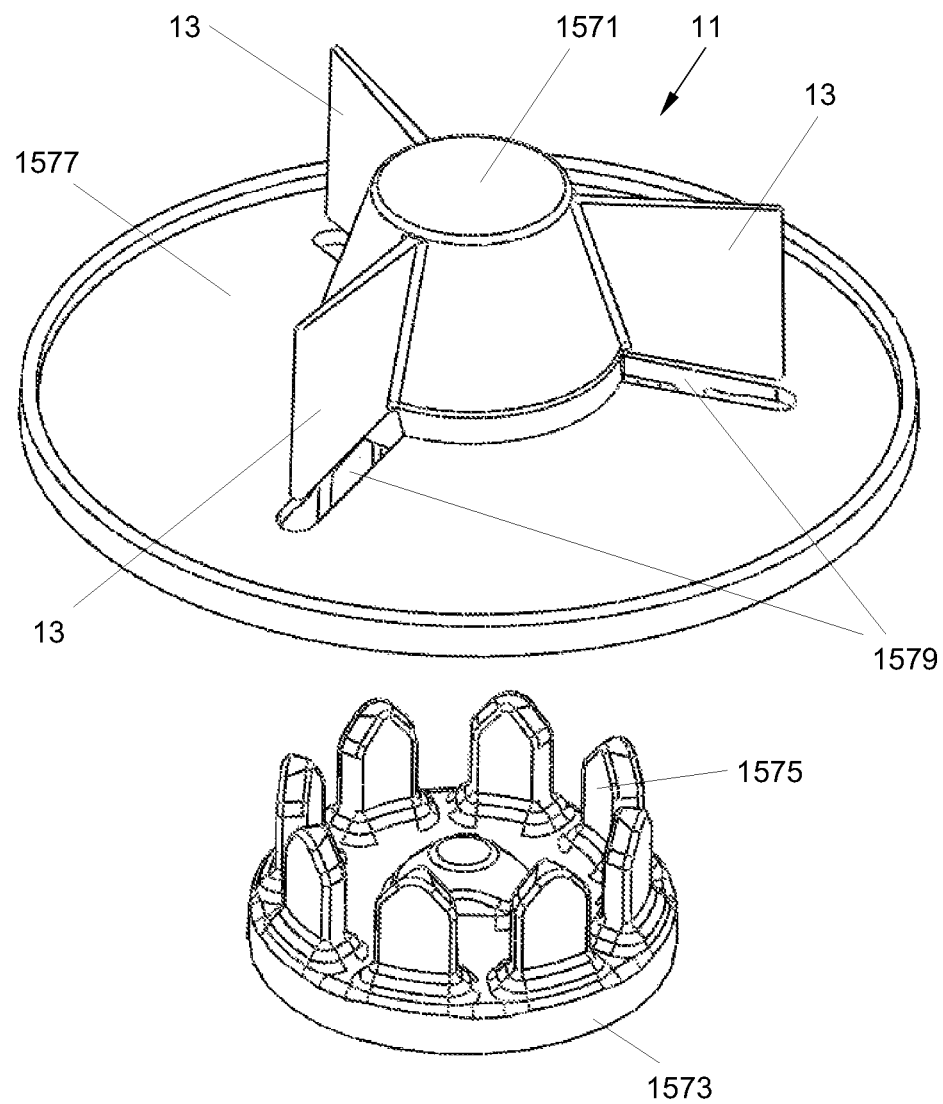
FIGS. 5A and 5B are two isometric exploded views of an impellor used in the coffee bean packaging cartridge together with a drive shaft coupling end.
Figure 5B:
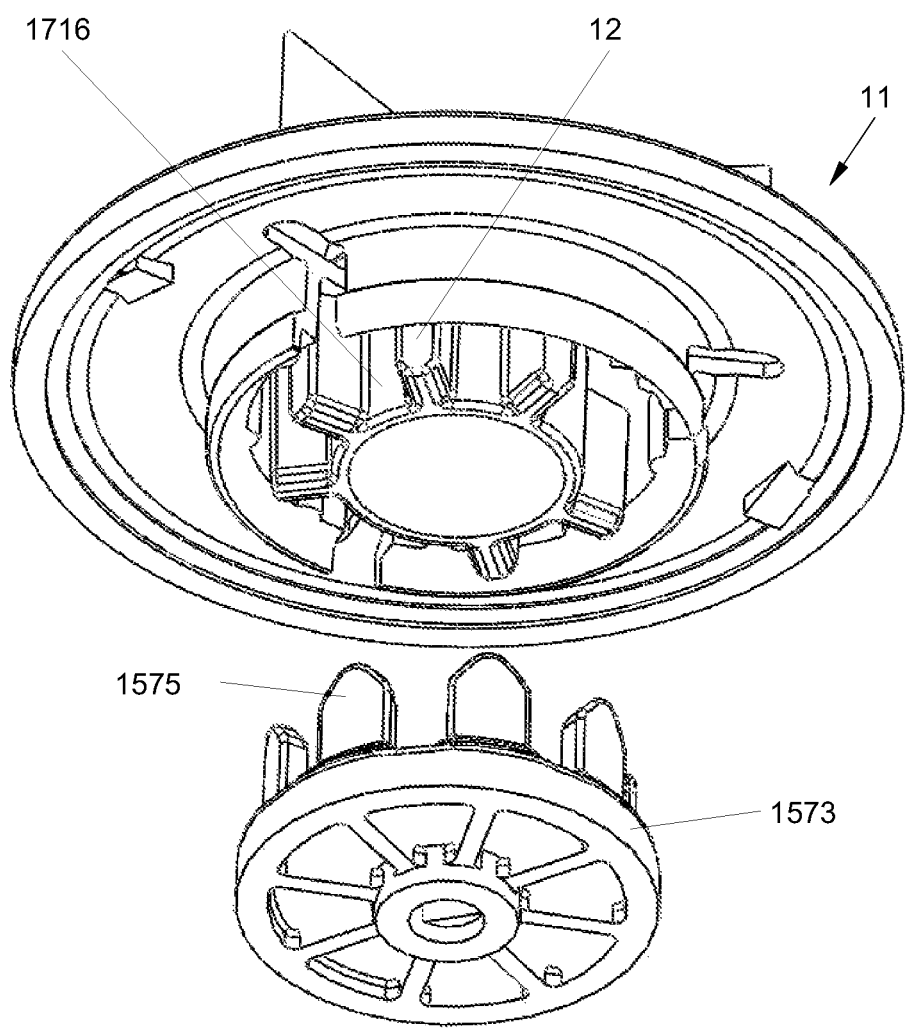

One suitable form of impellor 11 is shown in somewhat more detail in FIGS. 5A and 5B. To prevent the impellor 11 to get jammed by coffee beans that become locked between the perimeter aperture and radially extending vanes 13, such vanes 13 are preferably made from a resilient material. It is also possible to make the entire impellor 11 from a yieldable resilient material. The impellor 11 has a hollow hub portion engageable by a drive shaft end 1573 of a coffee preparing appliance. The drive shaft end 1573 may have a number of keys 1575 (preferably 4, 6 or 8) for engagement with corresponding protrusions, or keys in the interior of hollow hub 1571. To facilitate engagement of the impeller 11 and the drive shaft end upon placing of the cartridge on the appliance the number of keys may differ between the drive shaft end 1573 and the hollow hub 1571. As illustrated in FIG. 5A the vanes 13 do not extend to the perimeter edge of the impeller 11, which may prevent beans from becoming jammed between the vanes 13 and the perimeter aperture. As indicated hereinabove the vanes may also be of a flexible material and to provide more flexibility to the vanes the vanes are conveniently also unattached to the impellor base 1577, by leaving a gap 1579. To fill the metering chamber some fifteen revolutions of the impeller 11 will normally suffice. However, to ensure filling under even adverse conditions, it may be convenient to allow for some extra revolutions such as thirty or twenty-five in total. For filling of the dosing volume the conveying impeller 11 including both the impellor base 1577 (bottom) and the vanes 13 are rotated with a rotational speed in the range of 100 to 500 rpm, and preferably between 250 and 300 rpm. Due to the centrifugal force created by the rotation of the impellor base 1577 and the rotation of the vanes the coffee beans are driven in an outward direction towards the inlet opening 21 of the metering chamber. Once the filling of the dosing volume has been accomplished, the appliance will switch from driving the impeller 11 to driving its grinder. With the impeller 11 immobilised the metering chamber will gradually empty into the grinder. Because the impeller 11 is inactive, no beans will escape from container 7, also because of the presence of the trickle through edge 22.

Figure 6A:
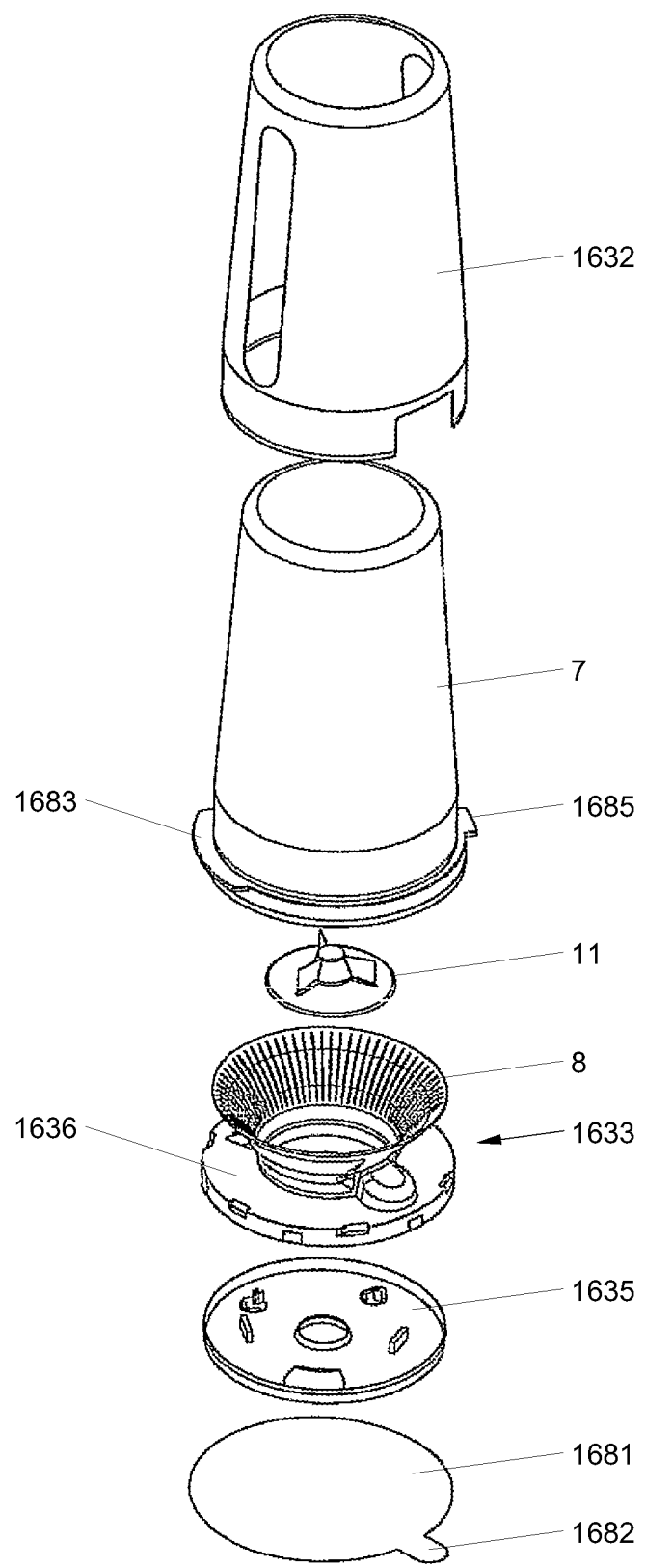
FIG. 6A is an exploded isometric view of a coffee bean packaging cartridge according to an embodiment of the invention.
Figure 6B:
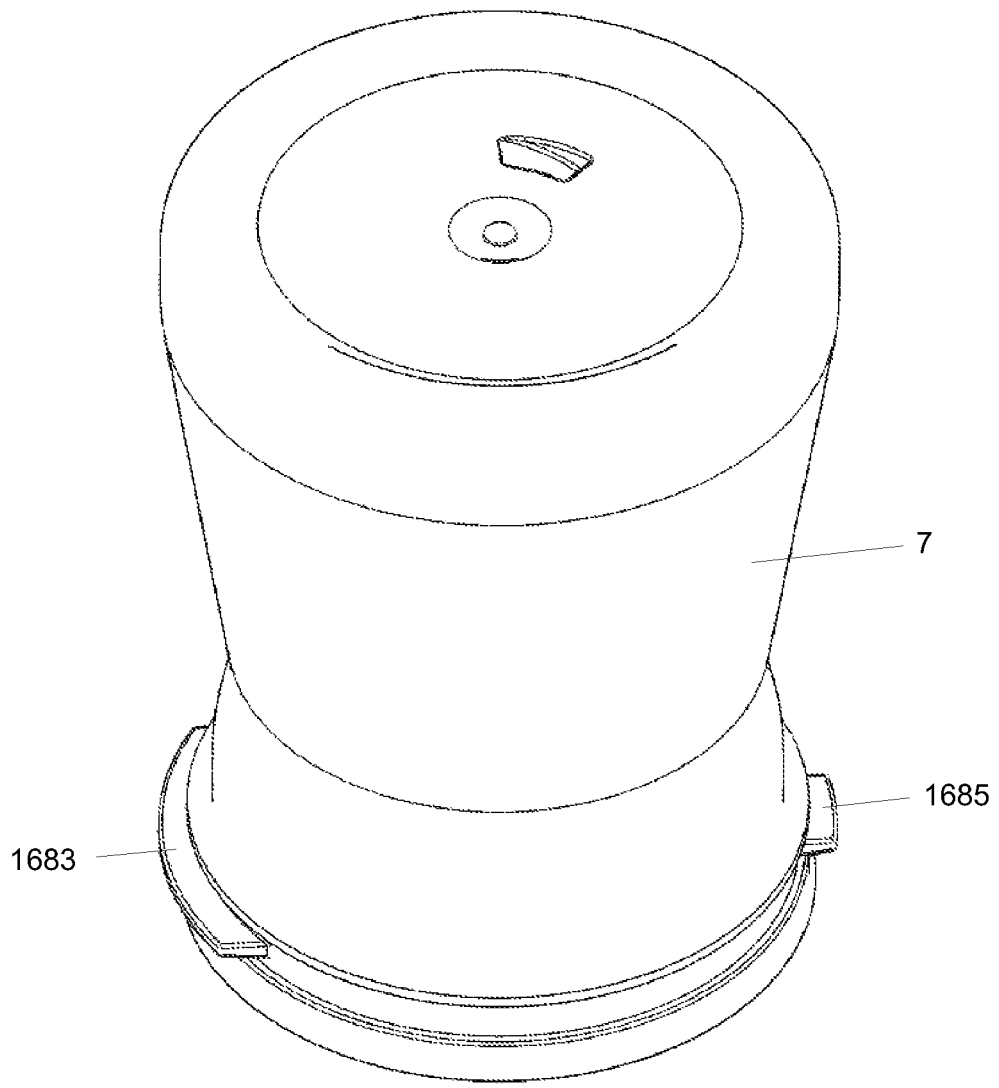
FIGS. 6B, 6C and 6D show different perspective views of the coffee bean packaging cartridge shown in FIG. 6A.
Figure 6C:
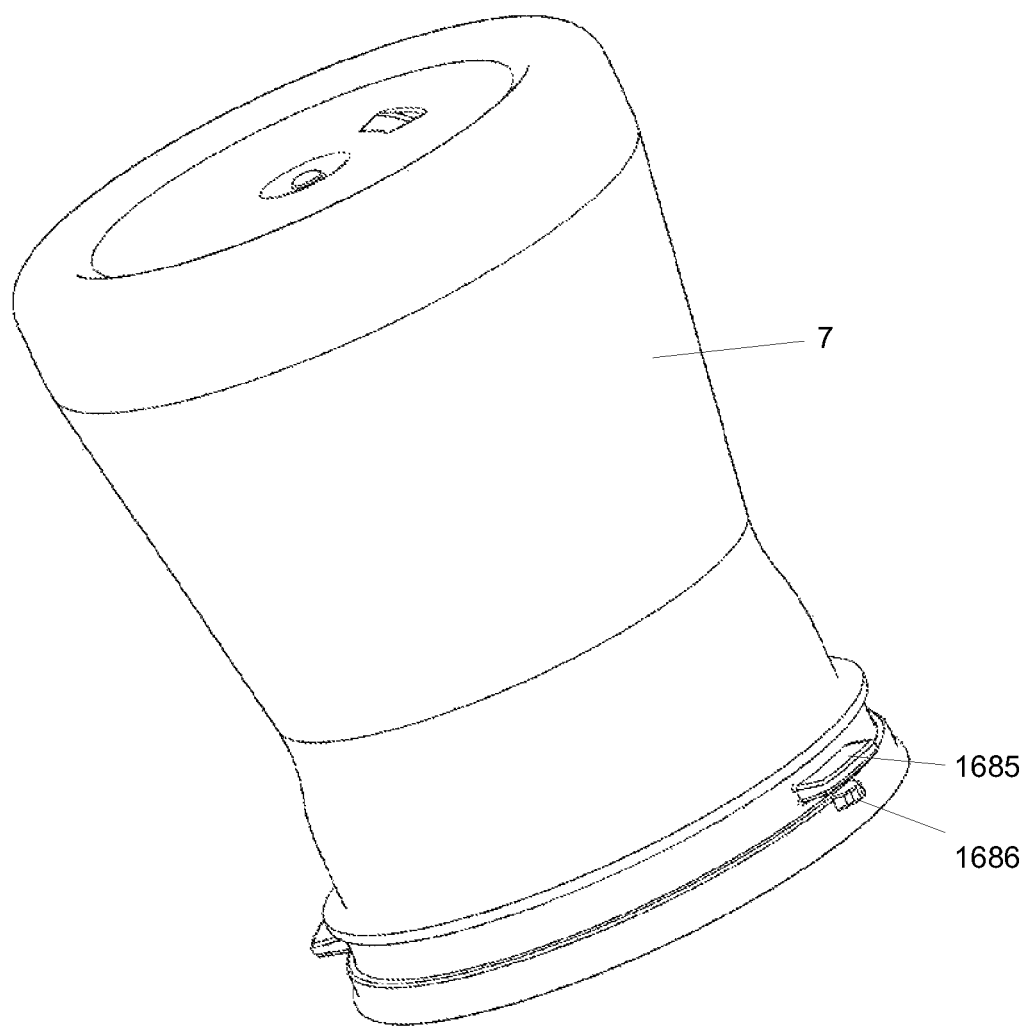

Referring to FIGS. 6A, 6B and 6C an embodiment of the coffee bean packaging cartridge 3 is shown in an exploded arrangement and perspective views. This packaging cartridge includes the container 7 defining an interior volume for coffee beans. The container 7 is preferably made from a transparent material so that its contents can be seen. Optionally, the container 7 may be partially covered by an outer sleeve 1632 which may be printed with a description of the kind of coffee beans inside and may also be provided with a window to reveal a translucent portion of the container 7. The container 7 is also provided at a lower end thereof with bayonet formation 1683, 1685 for coupling with the openings 56 in the side wall 54 of the recess 50 of the coffee brewing apparatus 4. Inserted into an open bottom end of container 7 is a closure member 1633. The closure member 1633 has the ribbed funnel 8 for guiding coffee beans towards the impellor 11 and a base flange 1636. A rotatable closure disk 1635 is rotatably connectable with respect to the base flange 1636 of the closure member 1633. The closure member 1633 and the rotatable closure disk together form an interface between the cartridge and a coffee brewing apparatus. The assemble cartridge can be sealed against deterioration from the ambient air by a sealing membrane 1681 that attaches to the perimeter edge of the container 7. The sealing membrane and barrier foil 1681 may again be equipped with a conventional one-way pressure relief valve for venting excess pressure from gases emanated from freshly roasted beans to the exterior of the packaging cartridge. Preferably such a venting valve should open at a pressure of between 0.1 bar and 0.5 bar to prevent deformation of the container by inflation. To facilitate removal of the sealing membrane 1681 before placing the cartridge on a brewing apparatus, a pulling tab 1682 may be provided.

Figure 7A:
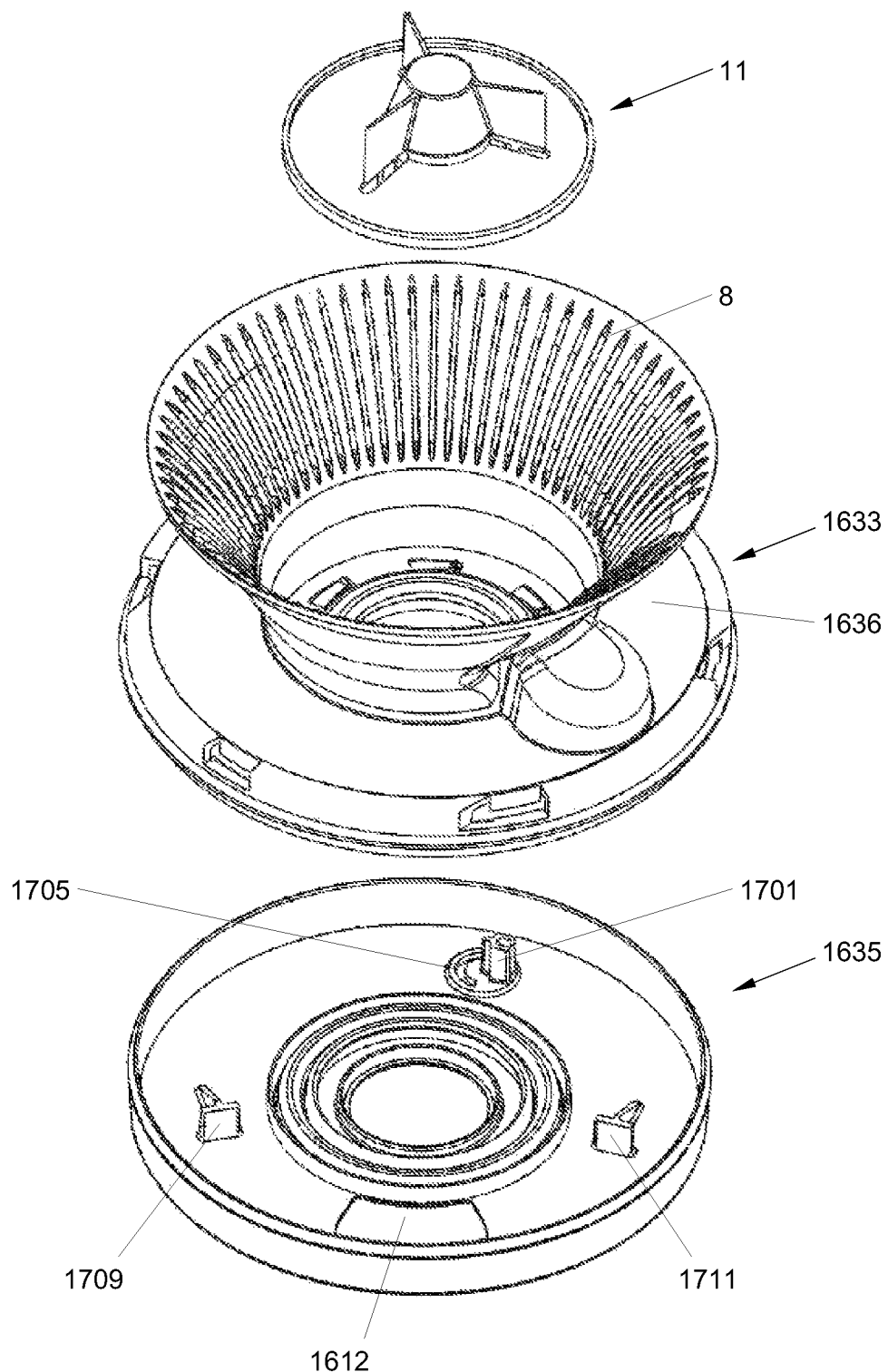
FIG. 7A is a detailed exploded isometric view of the bottom part of the coffee bean packaging cartridge of FIG. 6A.
Figure 7B:
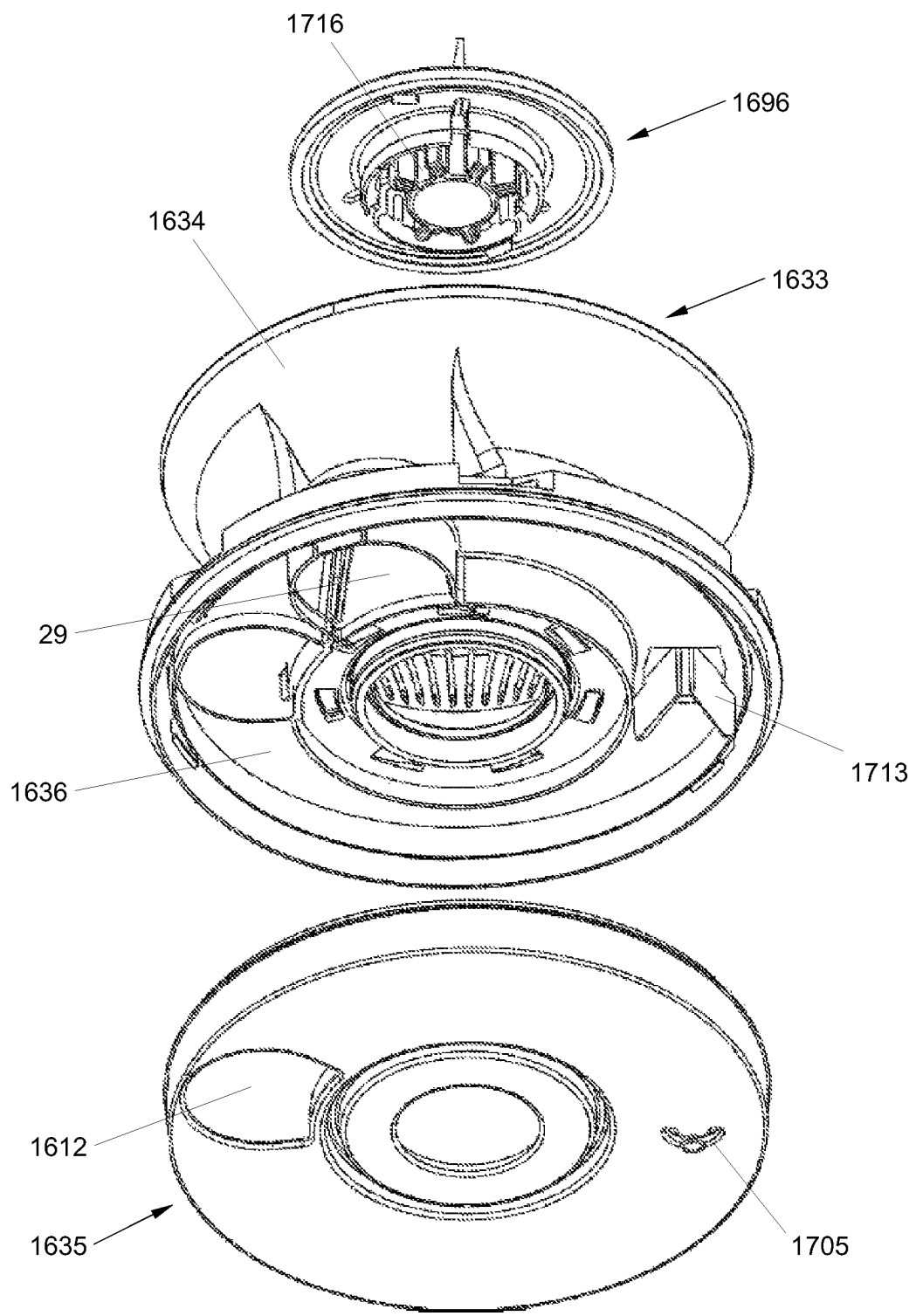
FIG. 7B is a detailed exploded view of the bottom part of FIG. 7A as seen in an opposite direction.
Figure 7C:
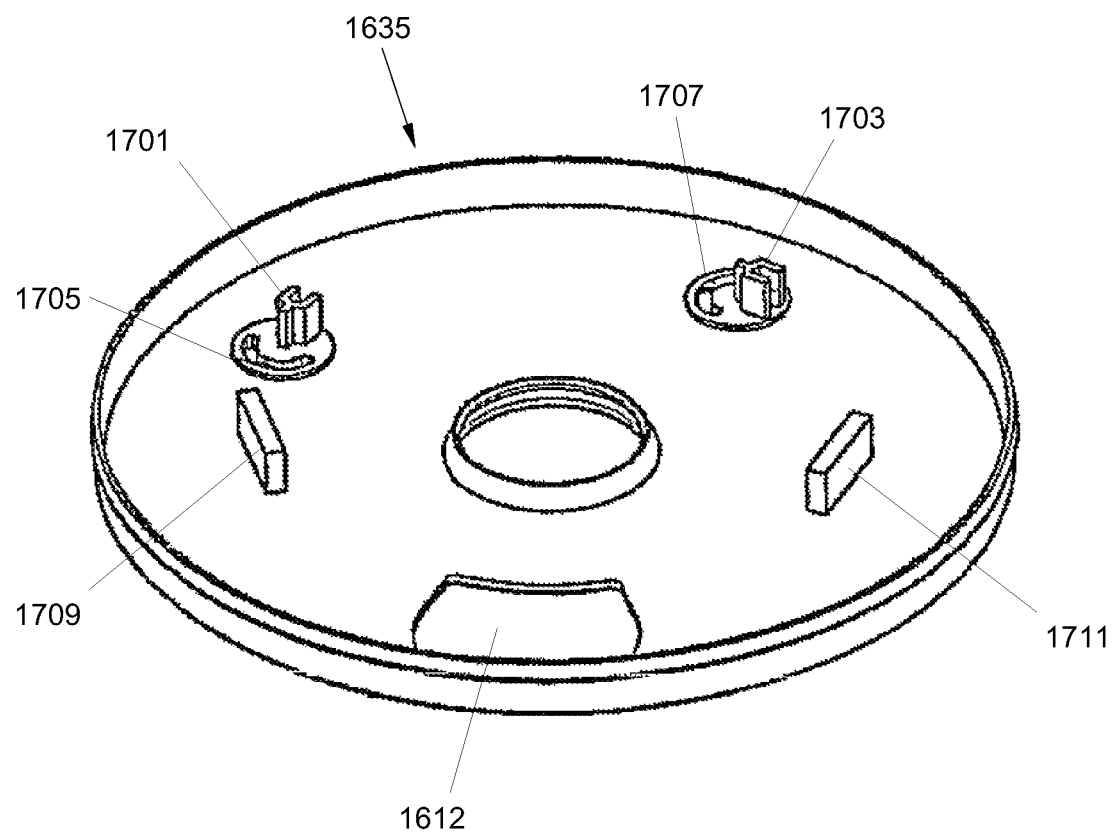
FIG. 7C is a perspective view of a closing plate of the bottom part shown in FIGS. 7A and 7B.

The interface forming bottom parts of the cartridge are separately shown in more detail in FIGS. 7A, 7B and 7C. The ribbing on funnel 8 as further seen in the exploded view of FIG. 7A is useful in preventing sticking of coffee beans to the surface of the funnel 8.

By appropriate spacing between the successive ribs on funnel 8 it is possible to minimize the contact surface between the beans and the funnel surface. As the skilled person will recognize, such ribbing is merely one of various ways to reduce the contact surface and protruding bulges may be equally effective. Also the inclination given to the funnel may be subject to variation, but an angle in excess of 30 degrees, up to 90 degrees has been found effective.

The rotatable closing disk 1635 has an aperture 1612, which upon appropriate rotation can register with exit opening 29 of the closure member 1633 (see FIG. 7B). The closing disk 1635 on its upper surface has protruding there from a first detent 1701 and a second detent 1703 (see FIG. 7C). The first abutment is bordered by semi-circular slots 1705 and 1707, respectively. Additionally, protruding from the upper surface of the rotatable closing disk 1635 is a first abutment 1709 and a second abutment 1711 for limiting rotational movement in respect of the exit opening 29. Further provided on a bottom face of the base flange 1636 of the closure member 1633 is a first pair of latching arms 1713 and a second pair of latching arms (not shown). The first pair of flexible latching arms 1713 is positioned to cooperate with the first detent 1701 in the closed position of the rotatable closure disk 1635. The second detent 1703 and the second pair of flexible latching arms also cooperate together in the closed position of the closure disk 1635 and are optional.

Figure 8:
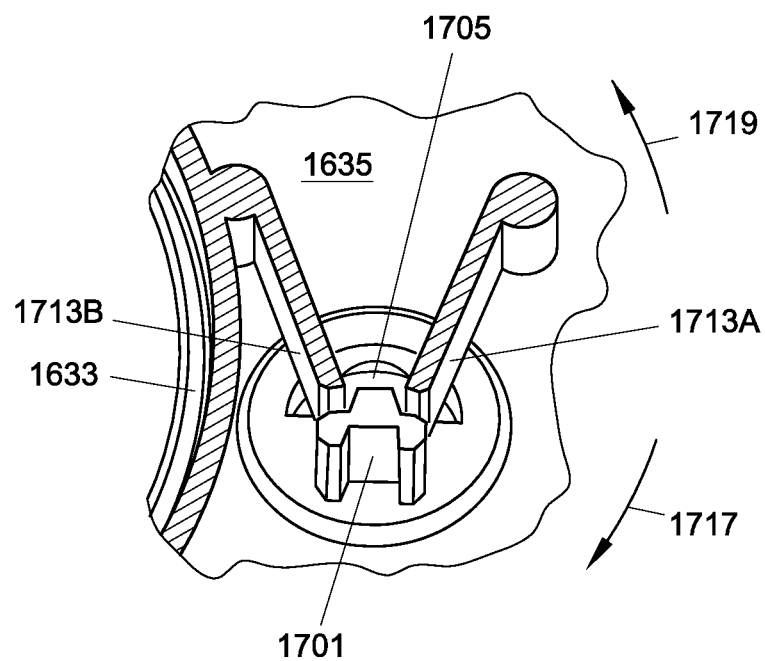
FIG. 8 is a cross-sectional detail of the assembled bottom part.

In reference to FIG. 8 it is shown how the first detent 1701 has been caught behind the converging flexible arms 1713A and 1713B of the first part of flexible arms. The position of the detent 1701, as shown in FIG. 8, has resulted from rotation of the closure disk 1635 in respect of the closure member 1633 in the direction of arrow 1717. Rotation in the opposite direction of arrow 1719 is effectively prevented by the flexible arms 1713A and 1713B engaging the first detent 1701. Accordingly when the cartridge is in the closed position as determined in the partial cross-section of FIG. 8 it may be removed from the apparatus without any risk of spilling beans. Also this latching arrangement ensures that the cartridge is not accidentally opened by rotation of the closure disk 1635.

Figure 9:
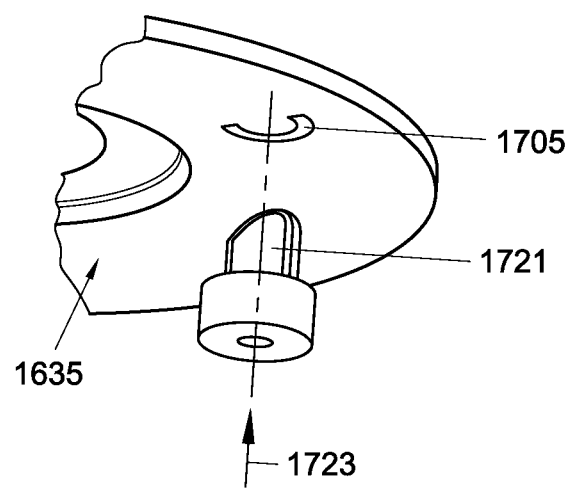
FIG. 9 is a bottom perspective detail of the bottom part of FIG. 7B with a delatching protrusion of the coffee brewing apparatus.

As shown in FIG. 9 an unlocking element 1721, which is part of a coffee brewing appliance, can engage through the semi-circular slot 1705 in the direction of arrow 1723 when the cartridge is placed on the appliance. The unlocking element 1721 has a V-shaped upper contour that forces apart the flexible arms 1713A and 1713B of the first pair of flexible arms 1713. This will then allow rotation of the closure disk 1635 in the direction of arrow 1719 by allowing the first detent 1701 to pass between the spread apart flexible arms 1713A and 1713B. This rotating movement is obtained by manually rotating the cartridge with respect to the appliance to engage the bayonet means 1683, 1685 on the container 7 with the counter bayonet formations 56 on the brewing apparatus.

The operation of the second detent 1703 in respect of the second pair of flexible latching arms is identical and when optionally provided will give additional protection against accidental opening, when not engaged on a coffee brewing apparatus.

Referring to FIG. 4A again, the recess 52 comprises rotatable protruding edges 59 at its center, which are positioned at the end of the driving shaft 18 which is driven by the first motor 17. On these edges the corresponding openings 1716 at the bottom side of the cartridge 3 should be placed. These openings 1716 are formed by a series of protrusions 12 on the bottom side of the impeller 11 (see FIG. 5B). The openings 1716 receive the edges 59 if the cartridge is connected with the coffee brewing apparatus. Thus by rotating the edges 59 the impellor 11 is rotating too.

The upstanding side wall 54 of the recess 52 may be surrounded by a housing 55, as shown in FIGS. 1-2.

The coffee brewing apparatus comprises a control device unit 40 schematically shown in FIG. 3A, preferably a microprocessor for controlling the dosing, grinding and brewing process. Thereto, the controller may be connected to a sensor acting as a detection means for detecting an identification element such as a barcode or a RFID label of the coffee bean packaging cartridge 3. Thereby the control device unit cannot only detect the presence or removal of the coffee bean cartridge 3, but also receive information about its contents and/or an identifier which identifies the cartridge 3. Preferably the control unit controls the dosing, the grinding and the brewing (including water supply) in dependence on the identifier that was is read by means of the sensor. It thus becomes possible for the control device unit to adjust the dosing, grinding and brewing process in accordance with the particular coffee bean product offered by the cartridge 3. Such information can be supplied to the control unit by the identification element on the cartridge.

Figure 4C:
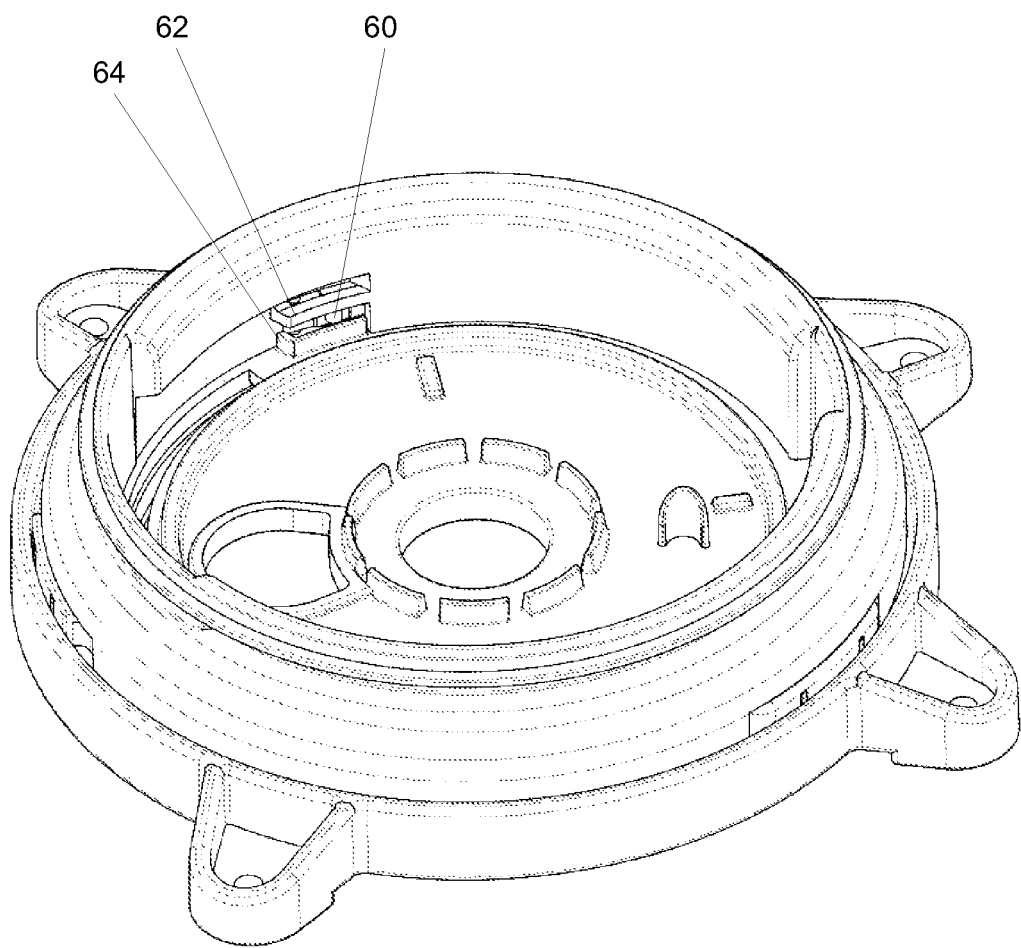
FIG. 4C shows a further perspective detail view of the upper part of the coffee brewing apparatus of FIG. 2.
Figure 6D:
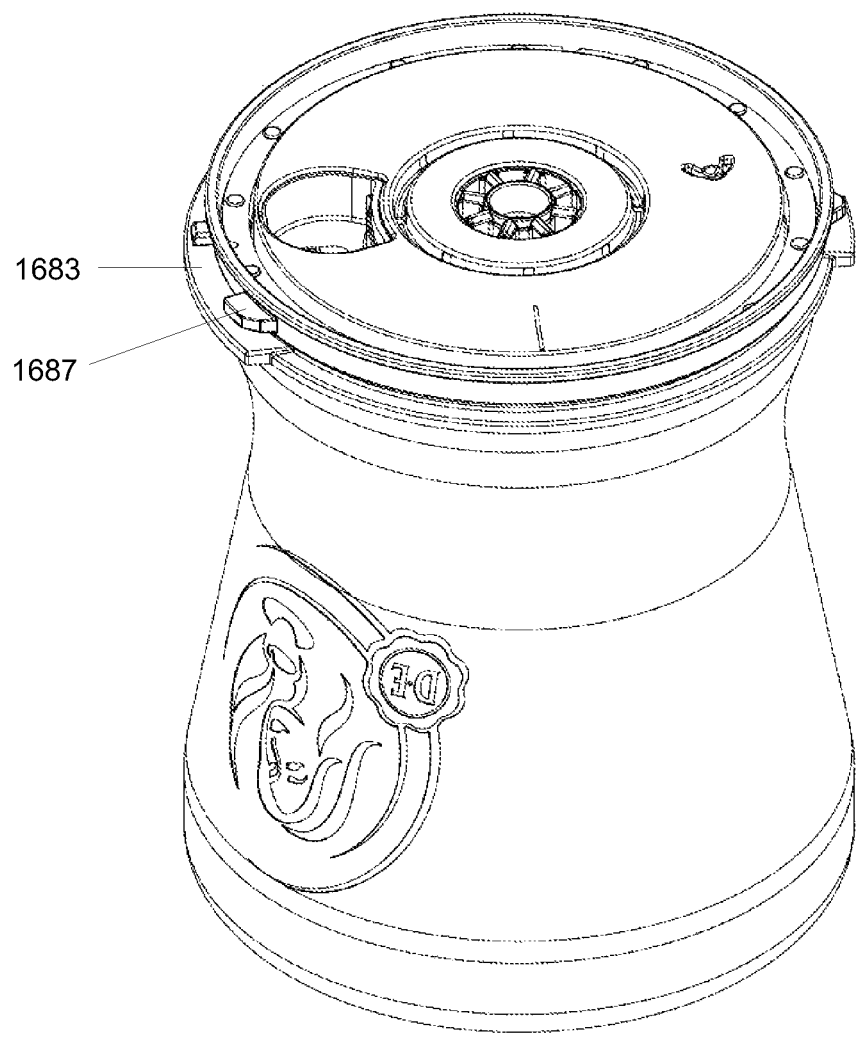
Figure 10:
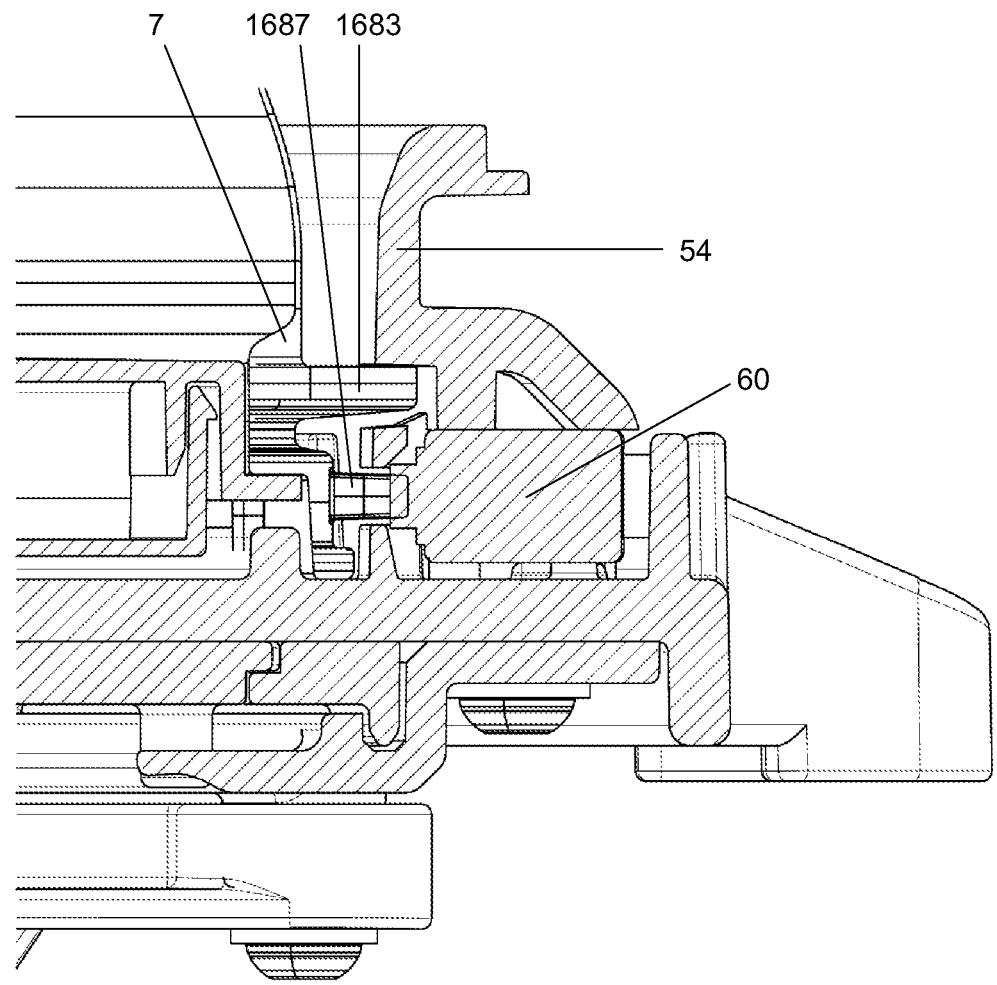
FIG. 10 shows a cross sectional view of the coffee bean packaging cartridge connected to the coffee brewing apparatus.

Alternatively, as shown in FIGS. 4C, 6D and 10, the sensor is arranged to merely detect the presence and removal of a coffee bean packaging cartridge to the coffee brewing apparatus. The sensor used for this purpose may be a micro switch 60 hidden behind a first horizontal segment 62 and a second horizontal segment 64 in the side wall 54 protruding from the upper side of the coffee brewing apparatus 4. This is to prevent the activation of the micro switch with finger or other object. A protruding part 1687 (see FIG. 4C) below the large bayonet element 1683 of the cartridge 3 activates the micro switch, when the cartridge is connected to the coffee brewing apparatus by rotating it to its final position. The protruding part 1687 exactly fits in the slit between the horizontal wall segments 62, 64. This signals the controller that a cartridge is correctly connected to the coffee brewing apparatus. The controller may activate the dosing, grinding and brewing processes only when it has been detected that the cartridge 3 has correctly been connected to the coffee brewing apparatus 4.

According to an embodiment, the controller controls these processes as follows. In a first step the metering chamber is completely filled with coffee beans. Thereto, the controller controls the first motor 17 to drive the transportation means. The transportation means is driven longer than is required for filling the metering chamber with coffee beans. In this example in the first step the transportation means is driven longer than is required for completely filling or at least substantially completely filling the metering chamber (at least substantially means for example for more than 90%). This is possible, because of the use of the flexible vanes 13. The metering chamber is arranged for receiving a portion of coffee beans corresponding to a dosed amount of coffee beans which is preferably necessary for preparing a single serving of coffee beverage, such as a single cup coffee comprising 80-160 ml of coffee. A filled metering chamber comprises in this example one dose of coffee beans. One dose of coffee beans comprises 5-11, preferably 6-8 grams of coffee beans.

Then, in a second step which follows after the completion of the first step, the controller activates the grinder by activating the second motor 101. The grinder is activated longer than is required for emptying the metering chamber and for grinding all the coffee beans which were collected in the metering chamber during the first step. In this example in the second step the grinder is activated longer than required for completely emptying or at least substantially completely emptying the metering chamber (at least substantially completely emptying means for example for more than 90%).

Finally, in a third step which follows after that the second step is completed the controller controls the brewing device to brew coffee based on the grinded coffee and on heated water.

Figure 11A:
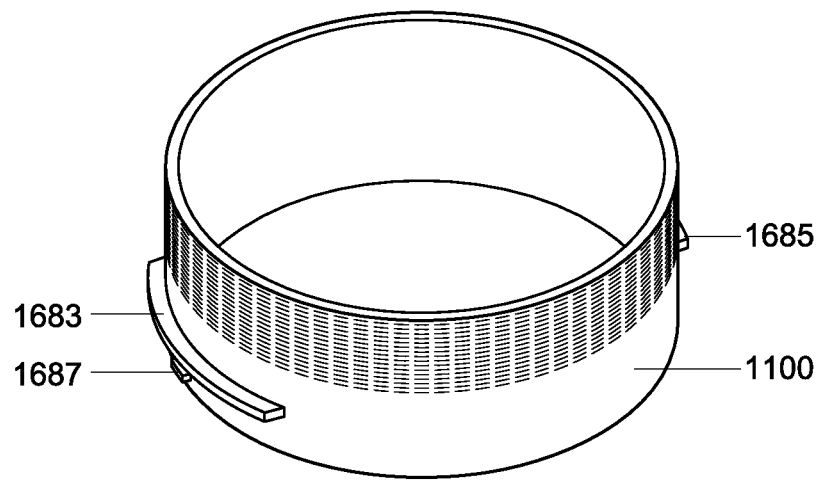
FIG. 11A shows an insert piece of a first type.
Figure 11B:
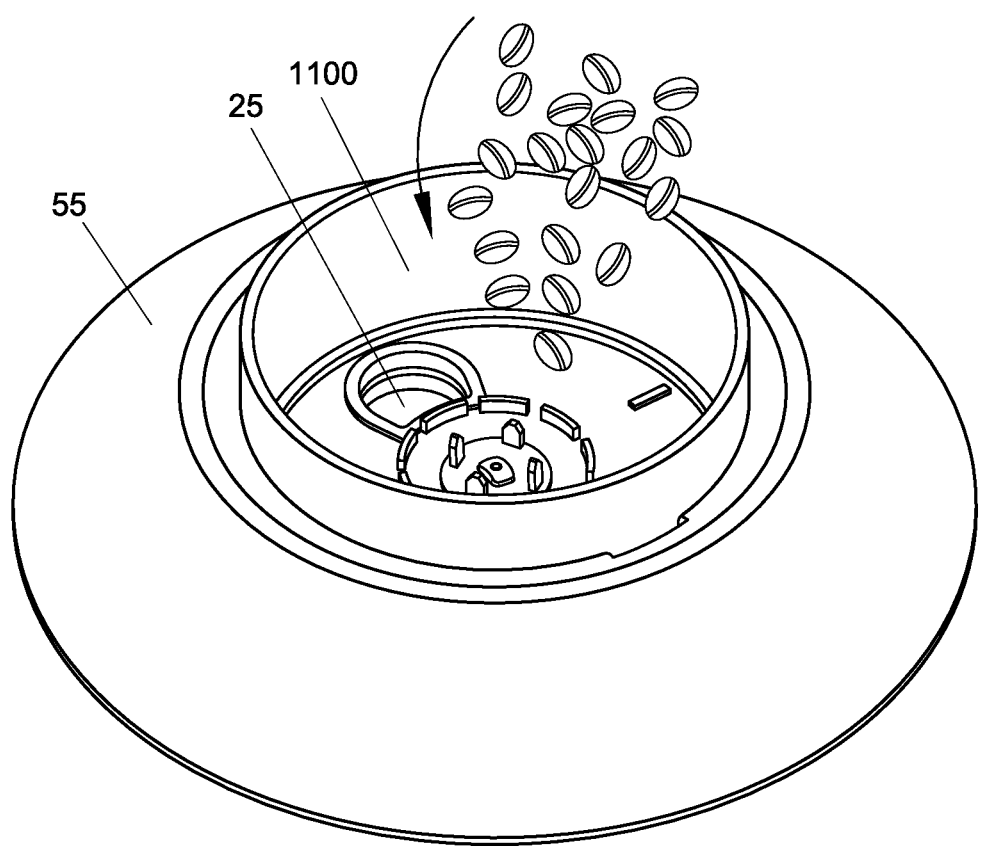
FIG. 11B shows the insert piece of FIG. 11A connected to the coffee brewing apparatus.

The system may further be provided with one or more insert pieces that can be connected to the coffee brewing apparatus in lieu of a coffee bean packaging cartridge. A first type of insert piece 1100 is depicted in FIG. 11A. It is a ring shaped element with at its outer surface the bayonet elements 1683, 1685 as well as the protruding part 1687 for activating the micro switch. It may be connected to the coffee brewing apparatus in the same way as a coffee bean packaging cartridge, i.e. by placing the bayonet elements in the corresponding openings 58 in the side wall 54 of the recess 50 in a initial position and then rotate the insert piece over 50 degrees until reaching the final position. When the insert piece is connected to the coffee brewing apparatus, the corresponding activation of the micro switch by the protruding part 1687 signals to the controller that a device is connected to the coffee brewing apparatus. The controller does not know if the activation of the micro switch is caused by a cartridge or by an insert piece. Therefore, when the insert piece 1100 is connected to the coffee brewing apparatus in the final position, as shown in FIG. 11B, the controller will activate the dosing, grinding and brewing processes, as if there were a coffee bean packaging cartridge connected to the brewing apparatus. So, the insert piece of the first type 1100 may be used to 'unlock' the coffee brewing apparatus.

In an alternative embodiment the insert piece may be a ring shaped element as described above which is integrally provided with a funnel which, when the insert piece is connected to the brewing apparatus, allows a user to manually feed coffee beans or ground coffee into the funnel.

Figure 12A:
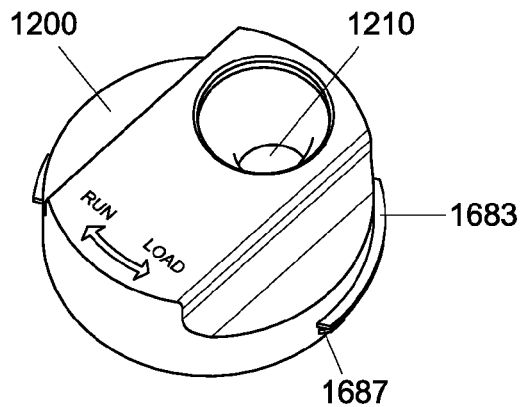
FIG. 12A shows an insert piece of a second type.
Figure 12B:
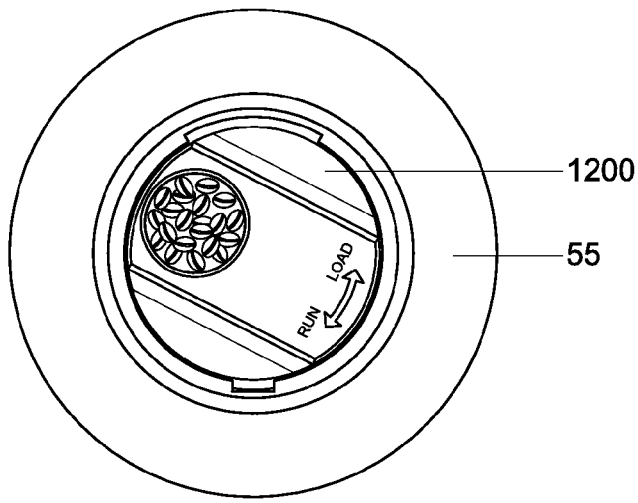
FIG. 12B shows the insert piece of FIG. 12A connected to the coffee brewing apparatus in an entry position.
Figure 12C:
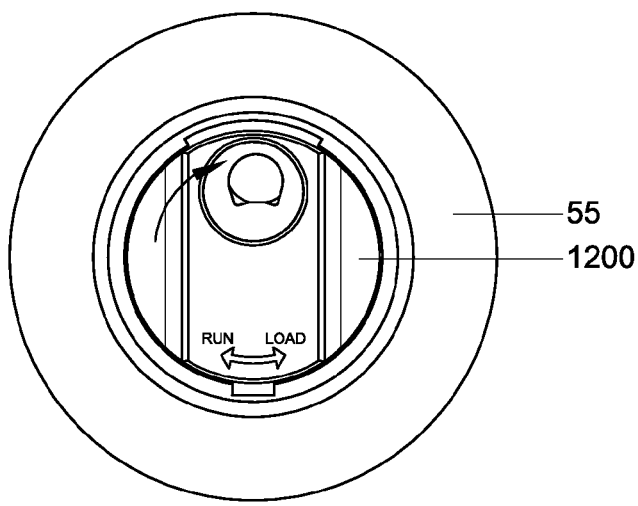
FIG. 12C shows the insert piece of FIG. 12A connected to the coffee brewing apparatus in a final position.
Figures 14C, 14D:
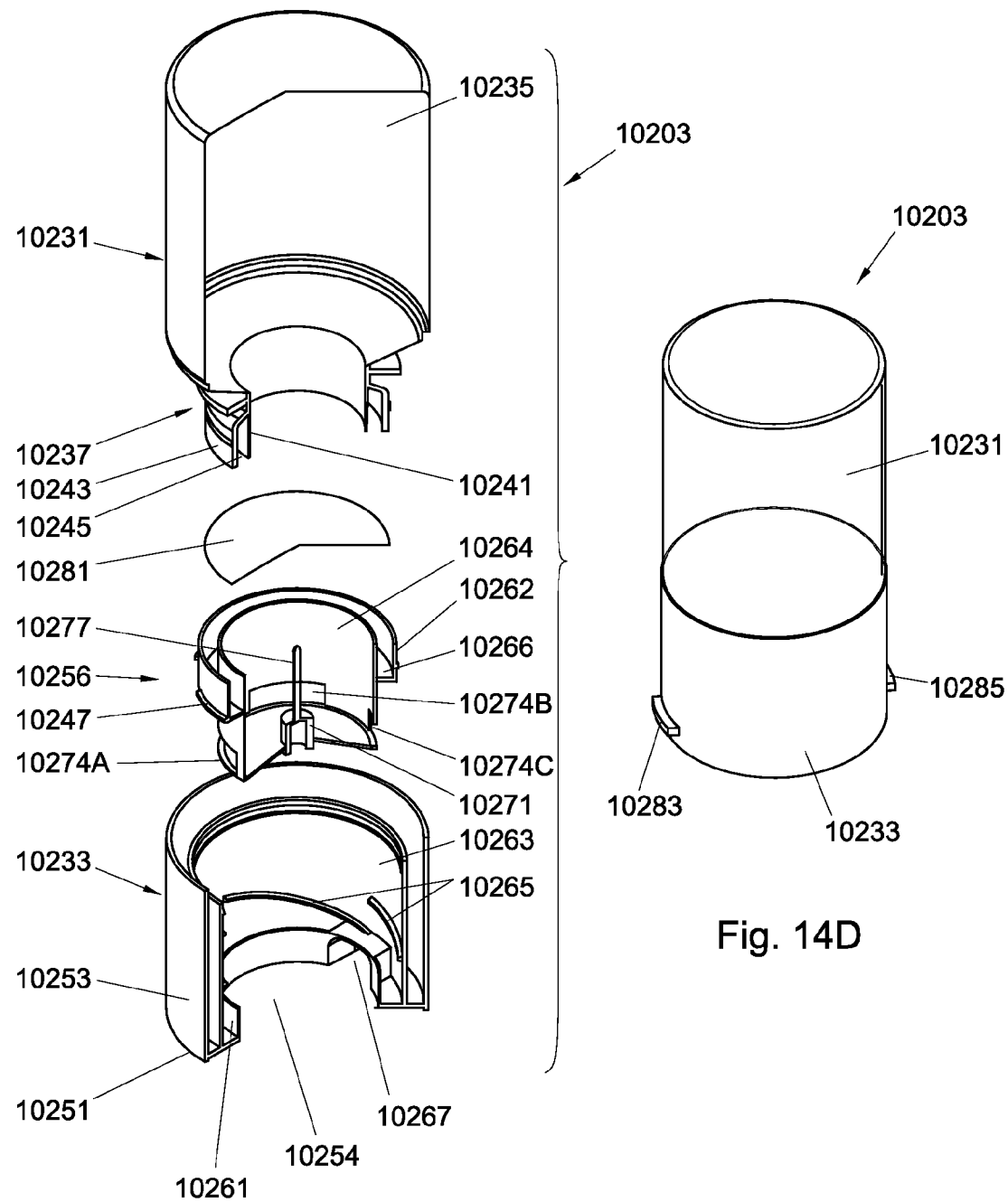
FIG. 14C shows the component of the ground coffee packaging cartridge of FIGS. 14A and 14B in half and in an exploded arrangement.
FIG. 14D is a perspective view of the second embodiment in a condition ready for use.

FIG. 12A shows a second type of insert piece 1200 that can be connected to the coffee brewing apparatus. It comprises a cavity 1210 with a size corresponding to a single dose of coffee beans. The insert piece comprises a closure member and closure disk arranged in the same way as in the coffee bean packaging cartridge, as described herein above with reference to FIGS. 7A-C, 8 and 9. When the insert piece is placed in the recess with the bayonet elements in the initial position as shown in FIG. 12B, the cavity 1220 is closed at its bottom. In this position the user fills the cavity with coffee beans, preferably with round compressed beans or coated compressed beans or bean fragments, because the flow easily. Then the insert piece 1200 is rotated by the user to its final position as shown in FIG. 12C, thereby opening the coffee bean outlet of the cavity and aligning it with the coffee bean entry of the coffee brewing apparatus. As a result, the single dose of coffee beans falls into the coffee brewing apparatus and can be ground.

The inventive coffee beverage system in addition to including the coffee bean packaging cartridge further comprises a ground coffee packaging cartridge which is also removably connectable to the coffee brewing apparatus. Such a ground coffee packaging cartridge has an inner space which at least before use is filled with ground coffee. The package may, at least before it is placed on the coffee brewing making apparatus, be closed off such that exposure of ground coffee to ambient air is prevented. To that end, the package is, preferably, closed off in an air-tight manner and/or vacuumized. The package can be a disposable package and is manufactured substantially from paper, and/or foil, and/or cellulose, and/or plastic, and/or tin. Below some embodiments of a ground coffee packaging cartridge will be described by way of example only.

Referring to FIGS. 13A to 13D there is shown a first embodiment of ground coffee packaging cartridge 10103. The ground coffee packaging cartridge 10103 includes a bottle-like container 10131 and a closure member 10133. The closure member 10133 is provided with an exit opening defining a ground coffee outlet 10111 for cooperation with the brewing apparatus of the beverage system, such as disclosed in reference to FIG. 1. The container 10131 defines an interior volume 10135 and a neck portion 10137 bounding a neck opening 10139 to the container 10131. The neck portion 10137 includes a cylindrical inner sleeve 10141 and a cylindrical outer sleeve 10143, defining an annular groove 10145 there between. The outer cylindrical sleeve 10143 is provided with an outer male screw thread 10147. Between the outer cylindrical sleeve 10143 and the major portion of the container 10131 there is provided a radially extending annular ridge 10149.

The closure member 10133 includes a substantially planar bottom 10151 and a circumferential outer wall 10153. The circumferential outer wall 10153 is provided with a circumferential tear strip 10155 that is connected to the outer wall 10153 by a circumferential line of weakening 10157. The tear strip 10155 is further provided with a pull tab 10159 that can be manually gripped.

The closure member 10133 further includes a first cylindrical inner wall 10161 and a second inner cylindrical wall 10163 concentrically between the inner cylindrical wall 10161 and the circumferential outer wall 10153. The second inner cylindrical wall 10163 is slightly lower than the circumferential outer wall 10153, but higher than the first inner cylindrical wall 10161. As best seen in FIG. 13C, the second inner cylindrical wall 10163 has a female screw thread 10165 on an inner surface thereof adapted to cooperate with the male screw thread 10147 of the container neck portion 10137. The first inner cylindrical wall 10161 is provided with a perimeter aperture 10167 in its inner surface that is in communication with the ground coffee outlet 10111. The perimeter aperture 10167 is in communication with the ground coffee outlet 10111 by a cavity that is radially outwardly offset with respect to column of ground coffee above the bottom 10151 of the package. This arrangement prevents the ground coffee from finding its way to the ground coffee outlet 111 in an uncontrolled manner.

Within a chamber defined by the bottom 10151 of the closure member 10133 and the first inner cylindrical wall 10161, a ground coffee transportation or conveyor means embodied as a conveyor disc 10169 is rotatably arranged. The package is provided with a coupling means 10171 adapted for drivingly coupling the conveyor means 10169 to the drive shaft of the coffee brewing apparatus. In this example the coupling means comprises a driving hub 10171 being attached to the ground coffee conveyor disc and extending through a central opening 10173 in the bottom 10151. The driving hub 10171 can be coupled to and rotated by the drive shaft extending from the coffee brewing apparatus 4 and which can be rotated by means of the motor of the coffee brewing apparatus. While such drive shafts and their connections are well known to the skilled person, no further explanation is deemed necessary. The conveyor disc 10169 is further provided with a closing flap 10175 on its outer periphery for closing the perimeter aperture 10167 in at least one rotational position. The closing flap 10175 embodies relatively movable closing means. The driving hub 10171 may further be provided with an axially and upwardly extending piercing pin 10177. Further the conveyor disc may be given an upwardly convex shape to assist in conveying the ground coffee towards the periphery of the conveyor disc. Such a shape, however, is optional and other suitable forms are conceivable as well. For the closing flap 10175 to close the perimeter aperture 10167 it is merely necessary to prevent the passage of ground coffee, which may already be achieved when the perimeter aperture 10167 is only partly blocked by the flap 10175. However to be able to take the ground coffee packaging cartridge from the apparatus for an interval of time, it is preferred that the closure of the aperture 10167 by the flap 10175, at least to some extent, delays deterioration of the remaining ground coffee contents. Hence the flap forms part of the closing member 10133 wherein the closure member has relatively movable closing means in the form of the flap for selectively opening and closing the exit opening by means of closing the aperture 10167, wherein in the closed condition it is prevented that the ground coffee escapes from the package and preferably it is counteracted that content of the ground coffee in the form of gasses escape to surrounding air.

Further, as best seen again in FIG. 13C, the second inner cylindrical wall 10163 is provided with an inner peripheral ridge 10179 on its free end. The open end 10139 of the neck portion 10137 of the container 10131 may be closed by a sealing means formed by sealing membrane 10181. Further, as best seen in FIG. 13D, the closure member 10133 may be provided with radially extending bayonet elements 10183, 10185 for connecting it to the coffee brewing apparatus 4 of FIG. 1. Hence the bayonet elements form part of connecting means for connecting the package to the coffee brewing apparatus. The skilled person will understand that any conceivable means, other than a bayonet type connection (such as 10183, 10185), may be suitable as connecting means for connecting the package 10103 to a coffee brewing apparatus.

Reverting now to FIGS. 13A and 13B there are shown two axial positions of the closure member 10133 with respect to the container 10131. In FIG. 13A the package 10103 is shown in a condition in which it is supplied to a user. In this condition of purchase the interior volume 10135 will be completely filled with ground coffee of a selected variety. The properties of such a contents may be communicated by an identification element 1022 attached to the exterior of package 10103. The neck opening 10139 will be hermetically closed by the sealing membrane 10181 to protect the contents of the container 10131 from deterioration by ambient air. The sealing membrane 10181 is attached, preferably only to the outer cylindrical sleeve 10143. When a user wants to bring the package 10103 into a condition of use, as shown in FIG. 13B, the tear strip 10155 should first be removed by gripping the pull tab 10159. Through the line of weakening 10157 the tear strip 10155 can be completely removed from the closing member 10133. This can be done with the package 10103 already connected to the coffee brewing apparatus 4. With the tear strip 10155 removed, the container 10131 can be rotated with respect to the closure member 10133. Such rotation, i.e. in a clock wise direction, has the effect that the male and female screw thread 10147, 10165 act together to move the container 10131 and closure member 10132 closer together in an axial direction. By this axial movement the piercing pin 10177 may penetrate the sealing membrane 10181 and allow it to tear across the opening 10139, while the first inner cylindrical wall 10161 pushes it into the annular groove 10145 of the neck portion 10137 as shown in FIG. 13B. This movement of the sealing membrane 10181 by the means for disrupting and displacing embodied by the first inner cylindrical wall 10161 is assisted by attachment of its perimeter to only the outer cylindrical sleeve 10143. It may further be beneficial to prepare the sealing membrane 10181 to tear open along predefined tear lines. Such predefined tear lines can be conveniently created by partial laser cutting of the sealing membrane foil. Removal of the sealing membrane 10181 allows the ground coffee to be gravity fed onto the conveyor disc 10169. With the package 10103 thus having been activated to the condition of use, as shown in FIG. 13B, and connected to the brewing apparatus of FIG. 1, the control unit may cause rotation of the conveyer disc 10169. During moments of rotation, when the closing flap 10175 does not cover the perimeter aperture 10167 (see FIG. 13C), ground coffee is conveyed radially outwardly to pass through the ground coffee outlet 10111 into the metering chamber of the coffee brewing apparatus, or directly into the grinder.

In case the coffee brewing apparatus is provided with a metering chamber, such metering chamber, conveyer disc and flap in combination form a dosing device. The dosing device includes the metering chamber for receiving a portion of ground coffee corresponding to an dosed amount of ground coffee which is preferably necessary for preparing a single serving of coffee beverage wherein the system is arranged for transporting the ground coffee from the package into the metering chamber. The dosing device may further comprise emptying means for emptying the metering chamber.

In case the ground coffee is transported from the package directly into the grinder the conveyor means and the flap of the package form the dosing device in combination with a timer of the control unit. In that case the control unit may comprise the timer for transporting during a predetermined length of time ground coffee into the coffee brewing apparatus. In case the amount of ground coffee which is transported per second, in use, is known the total amount of ground coffee which is transported can be predetermined. Hence in such an embodiment the dosing device comprises at least one of the transportation or conveyor means and the relatively movable closing means. The control means comprises timing means wherein the control unit is arranged such that, in use, the control unit operates the motor a predetermined length in time for transporting a predetermined amount of ground coffee from the package into the coffee brewing apparatus wherein preferably the predetermined amount of ground coffee corresponds with a dosed amount of ground coffee for preparing a drink.

The skilled person will readily understand that in variations of the brewing apparatus the metering chamber may alternatively be positioned downstream of the grinder. In the latter case, the ground coffee will directly enter the grinder from the package outlet 10111.

It is further seen that in the activated condition shown in FIG. 13B, the inner peripheral ridge 10179 has snap-fitted behind the radially extending annular ridge 10149 of the container neck portion 10137. In this position also the male and female screw threads 10147, 10165 have completely disengaged. It is thereby prevented that the container 10131 and closure member 10133 are accidentally moved back to the position of FIG. 13A. There is thereby also a clear distinction between packages that are still fresh and unused, as opposed to packages that have been activated for use on a coffee brewing apparatus. FIGS. 13A-13D thus show a first embodiment of ground coffee packaging cartridge, with a closure cap 10133, provided with a conveyor disc 10169, and a sealing membrane 10181 directly on the bottle-like container 10131. Upon removal of a tamper evident tear strip 10155, with the package 10103 already connected to the apparatus, the package can be manually activated by rotation (180 degrees). The seal, which can be a laser pre-cut foil, tears open in a controlled manner when activating and is pushed out of the way into a groove 10145 in a ring of the bottle. At the end of its movement an inner ring 10163 of the closure cap 10133 snaps over a thick edge, formed by annular ridge 10149, of the bottle, and can no longer be removed there from because the screw threads 10147, 10165 have disengaged. Reverse unscrewing is thereby inhibited.

FIGS. 14A to 14D show a second embodiment of a ground coffee packaging cartridge 10203 that again includes a container 10231 and a closure member 10233. The closure member 10233 has an annular bottom 10251, provided with a ground coffee outlet 10211. The annular bottom 10251 defines a central bore 10254 for the accommodation of a relatively movable auxiliary closure member 10256. The bottle-like container 10231 defines an interior volume 10235 and a neck portion 10237 defining an opening 10239 on one end of the container 10231. Similar to the first embodiment, the neck portion 10237 is composed of concentrically arranged inner and outer cylindrical sleeves 10241, 10243 to define annular groove 10245 there between. As the open end 10239 of the container 10231 is again sealed by a sealing membrane 10281, the annular groove 10245 is again serving to collect the sealing membrane 10281 upon its removal from the opening 10239. Again the sealing membrane 10281 is preferably attached with its outer periphery to only the outer cylindrical sleeve 10243.

The closure member 10233 is further provided with a first inner cylindrical wall 10261 and a second inner cylindrical wall 10263. The second inner cylindrical wall has an inner peripheral ridge 10279 at its upper free end. The closure member 10233 is connected to the container 10231 by the inner peripheral ridge 10279 snap-fitting onto a radially extending annular ridge 10249 on the neck portion 10237 of container 10231. The snap-fit connection is such that it cannot be easily disconnected and thereby prevents the closure member 10233 to be accidentally removed from the container 10231. Further, the closure member 10233 includes within its central bore 10254 a perimeter aperture 10267 in its first inner cylindrical wall 10261 giving radial access to a cavity in communication with the axially arranged ground coffee outlet 10211. Again the cavity between the radial perimeter aperture 10267 and the axial ground coffee outlet 10211 is offset with respect to the column of ground coffee, or coffee particles, within the package 10203 to allow control over the ground coffee, or particles, that find their way to the outlet 10211. On its inner cylindrical wall 10263 the closure member 10233 also is provided with female screw thread formations 10265 to cooperate with male screw thread formations 10247 on an annular outer wall 10262 on the auxiliary closure member 10256. The auxiliary closure member is generally formed as a cup-like element having a ground coffee transportation or conveyor means in the form of conveyor disc 10269 at its bottom and a cylindrical perimeter wall 10264. The cylindrical perimeter wall 10264 carries the annular outer wall 10262, so as to form an upwardly open perimeter groove 10266 for a purpose to be described later. The auxiliary closure member 10256 is further provided with a driving hub 10271 for coupling with the drive shaft of the brewing apparatus and forming coupling means (not shown, but conventional). The driving hub 10271 can also be provided with a piercing pin to engage and puncture the sealing membrane 10281. The cylindrical perimeter wall 10264 of the auxiliary closure member 10256 is further provided with a number, like three of four, perimeter windows 10274A, 10274B, 10274C, adapted to align with the perimeter aperture 10267. The perimeter windows 10274A, 10274B, 10274C are spaced from one another by interrupting wall sections, which thereby represent the movable closing means.

In use, the package 10203 will be provided to the end user in a condition illustrated in FIG. 14A, with the sealing membrane 10281 fully intact and protecting the contents in the interior volume 10235. The auxiliary closure member 10256 is partially projecting from the opening 10254 in bottom 10251. To activate the package 10203 for use it is simply connected to the coffee brewing apparatus by connecting means configured as bayonet elements 10283, 10285 projecting laterally from the closure member 10233. The driving hub 10271 will engage a resiliently mounted drive shaft in the apparatus and will push this resiliently into a retracted position. Upon operation of the brewing apparatus through an actuating element the drive shaft will rotate the auxiliary closure member 10256 which will thereby move upwardly by the male and female screw thread formations 10247, 10265 to the position shown in FIG. 14B. The drive shaft will be resiliently biased to follow the driving hub 10271 and remain in engagement therewith. When the auxiliary closure member 10256 has reached its uppermost position as shown in FIG. 14B the screw thread formations 10247, 10265 will have disengaged and not allow reverse movement of the auxiliary closure member 10256 to the position of FIG. 14A. During movement of the auxiliary closure member 10256 from the inactive position of FIG. 14A to the activated position of FIG. 14B, the piercing pin 10277 and the perimeter wall 10264 of the auxiliary member 10256 have pushed the sealing membrane 10281 aside into the annular groove 10254 provided in the neck portion 10237 of the container 10231. The piercing pin 10277 and the perimeter wall 10264 thereby form a means for disrupting and displacing the sealing element. By gravity the ground coffee can now be fed on to the conveyor disc 10269 and be conveyed to the perimeter aperture through any one of perimeter windows 10274 A, B or C, as these align during rotation. Once the dosing device and/or the control unit have determined that dosing is sufficient, the rotation of the auxiliary member 10256 and thereby its conveyor disc 10269 will be interrupted. Thereby a means to interrupt the supply of ground coffee is provided. The operating mechanism of the brewing apparatus ensures that rotation of the auxiliary member 10256 is always with a section of the perimeter wall 10264 between two adjacent ones of the perimeter windows 10274A, B, C in overlap with the perimeter aperture 10267. Not only does this prevent any further transport of ground coffee through the ground coffee outlet 10211, but it also protects the contents of the container 10231 from contact with the ambient environment. It is conceivable and preferred that the package 10203 in its activated condition of FIG. 14B can be safely removed from the brewing apparatus. This may be desirable to allow intermediate use of a package with a different quality of variety of ground coffee, to enable variation of the brewed beverage.

One noticeable difference of the ground coffee packaging cartridge according to the second embodiment, with that of the first embodiment, is that its conveyor disc is integral with a part of the closure member. Conceivably in another variation the entire ground coffee packaging cartridge could rotate together with the conveyor disc.

A third embodiment of a ground coffee packaging cartridge 10303 is shown in FIGS. 15A to 15D. The ground coffee packaging cartridge 10303 again includes a bottle-like container 10331 and a closure member 10333. The closure member 10333 at a bottom 10351 thereof is provided with a ground coffee outlet 10311, for cooperation with the brewing apparatus. The container defines an interior volume 10335 which will be filled with ground coffee (not shown but conventional). The container 10331 is further provided with a neck portion 10337 defining a neck opening 10339. The neck opening 10339 defines an open end of the 10 container 331 and is bounded by an inner cylindrical sleeve 10341 and a concentrically arranged outer cylindrical sleeve 10343. Formed between the inner and outer cylindrical sleeves 10341, 10343 is again an annular groove 10345. As such, the container 10331 of the third embodiment 10303 is substantially similar to the containers of the first and second embodiments, without being strictly identical.

The neck portion 10337 is provided with a radially extending annular ridge 10350 extending from the outer cylindrical sleeve 10143 at a location adjacent its free end.

The closure member 10333 includes a circumferential outer wall 10353 which projects axially from its bottom 10352. Also projecting axially from the bottom 10351 is a first inner cylindrical wall 10361 and a second inner cylindrical wall 10363 concentrically between the first inner cylindrical wall 10361 and the circumferential outer wall 10353. The second inner cylindrical wall 10363 is provided with an inwardly projecting peripheral ridge 10379 for snap-fittingly engaging the radially extending annular ridge 10350 to attach the closure member 10333 to the container 10331.

Figure 15B:
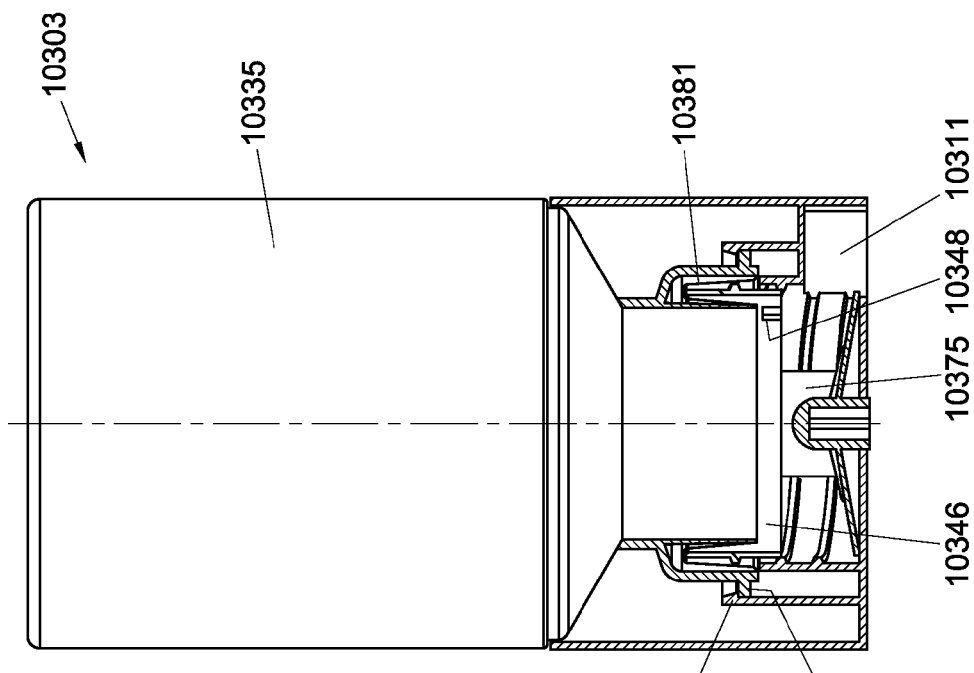
FIG. 15B is a cross-section similar to FIG. 15A but with the ground coffee packaging cartridge activated for use.
Figure 15A:
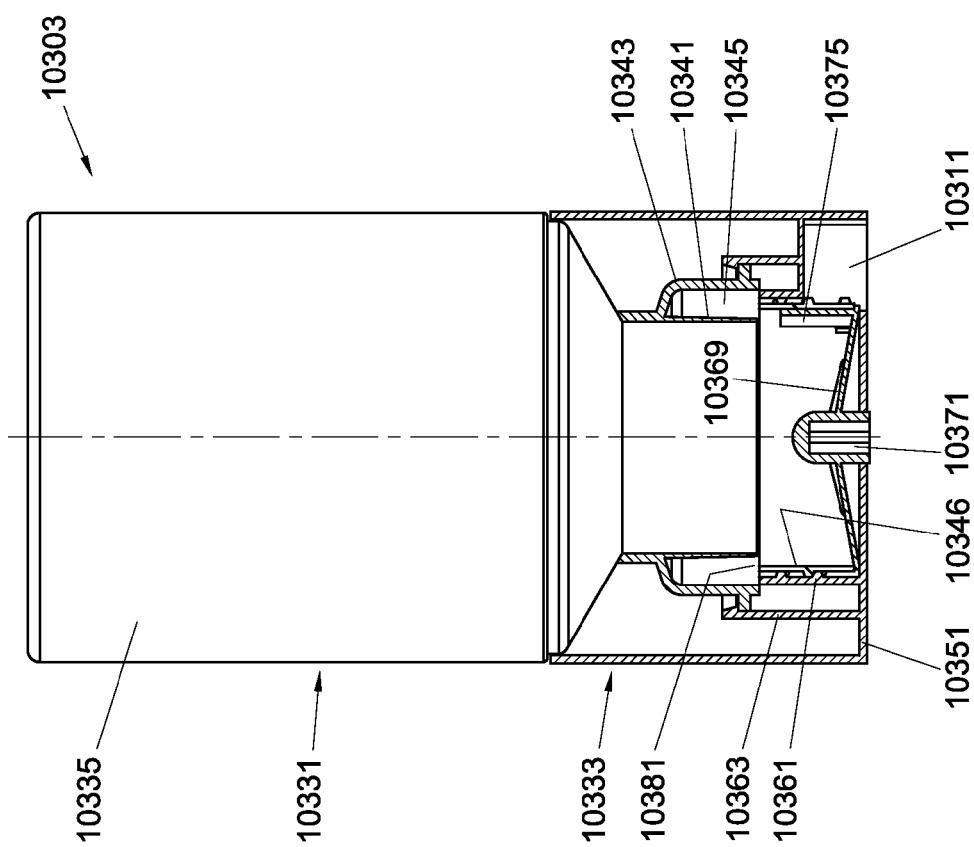
FIG. 15A is a cross-section through a third embodiment of ground coffee packaging cartridge in a condition prior to use.
Figures 15C, 15D:
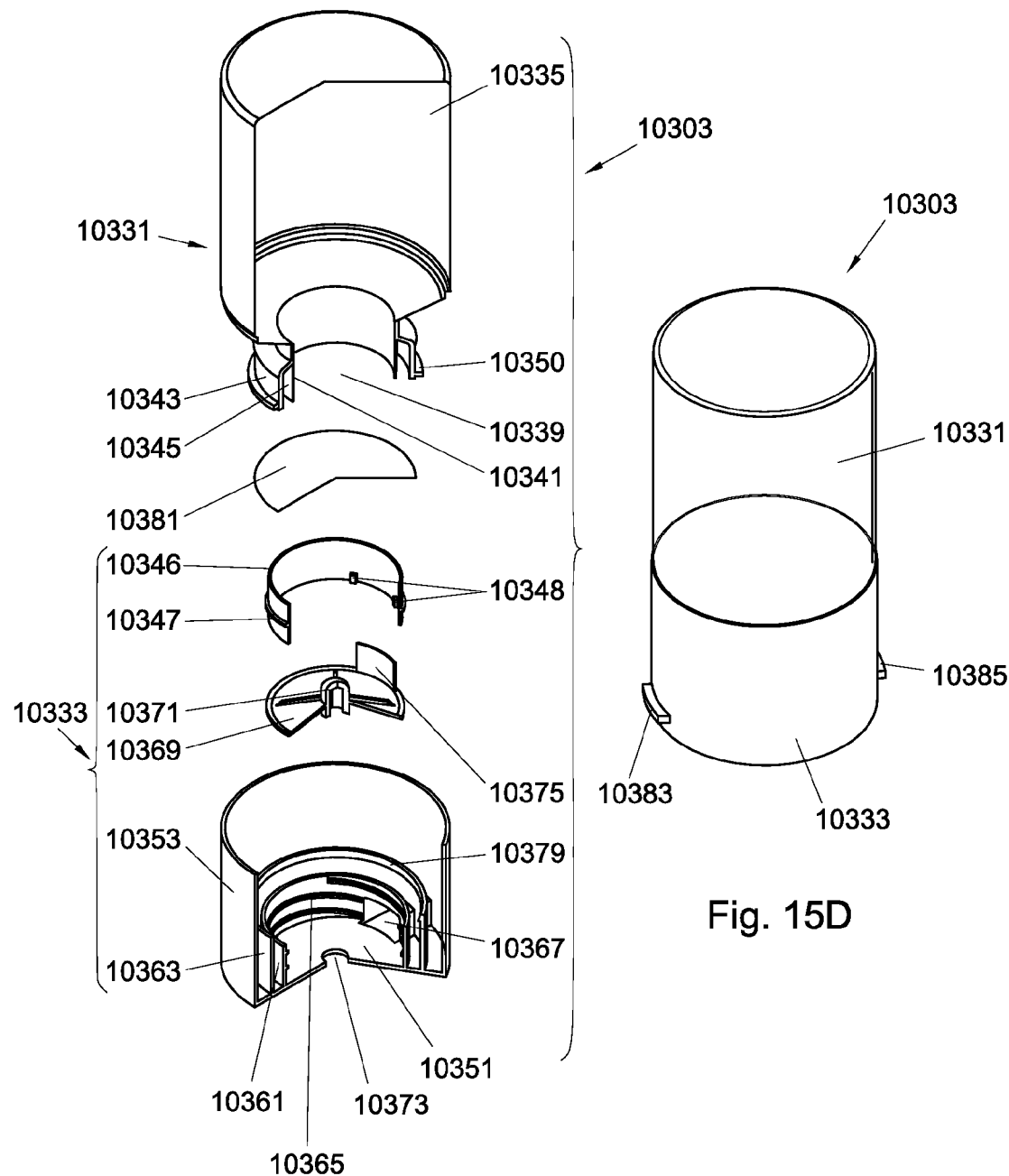
FIG. 15C is an exploded view of the components of the third embodiment of the ground coffee packaging cartridge, shown in half.
FIG. 15D is a perspective view of the third embodiment of the ground coffee packaging cartridge in its assembled form.

Rotatably received on the bottom 10351 is a ground coffee conveyor disc 10369 that has a driving hub 10371 that can be drivingly engaged through central opening 10373 in the bottom 10351. The rotatable ground coffee conveyor disc 10369 includes an upstanding closing flap 10375 for closing a perimeter aperture 10367 in the first cylindrical inner wall 10361. The perimeter aperture 10367 communicates with the ground coffee outlet 10311 via a cavity that is offset with respect to column of ground coffee within the interior volume 10335, for a purpose already explained. The closing flap 10375 functions as the movable closing means. As seen in FIG. 15C the conveyor disc 10369 may be provided, as part of the conveyor means and guiding means, with a number of radially extending ridges in addition to an upwardly convex shape. These features, which are optional, may be employed to assist conveyance of the ground coffee towards the periphery of the conveyor disc 10369 by forming an agitating and guiding means for the ground coffee. In an alternative arrangement the rotatable ground coffee conveyor may be formed by a paddle wheel with radially extending paddles or vanes. To prevent ground coffee jamming it may be advantageous not to have these paddles or vanes extend the entire radial distance to the perimeter edge of the paddle wheel or impeller. Alternatively or additionally the vanes may be formed in a flexible material. More in particular the entire impeller may be made from an elastic material, in particular in a plastic material having an E-modulus in the range of 150 to 1200 N/mm$^2$, more in particular 175 to 800 N/mm$^2$, and preferably between 175 and 300 N/mm$^2$. Further it is possible to vary the number of vanes in relation to the area of the perimeter aperture to block the escape of ground coffee with the impeller at rest.

Surrounding the ground coffee conveyor disc 10369, coextensive with the first cylindrical inner wall 10361, is a movable sleeve 10346. The movable sleeve is provided on its exterior with a male screw thread 10347, which engages a female screw thread formation on an interior surface of the first cylindrical inner wall 10361. The movable sleeve 10346 is further provided with inwardly projecting notches, which each engage one of the opposite upstanding sides of closing flap 10375.

In operation, the ground coffee packaging cartridge 10303 will be connected to the coffee brewing apparatus by means of bayonet formation 10383, 10385. To activate the package the coffee brewing apparatus initiates a control signal to drive the driving hub 10371 and thereby the conveyor disc 10369 and upstanding closing flap 10375. The closing flap 10375 will thereby engage a relevant one of the notches 10348 to move the movable sleeve 10346 along the engaged screw thread formations 10347, 10365 in an upward direction towards a sealing membrane 10381 that is attached with its periphery to the outer cylindrical sleeve 10343 of container 10331 and thereby forming the sealing means. This movement will rupture the sealing membrane 10381 and push it into the annular groove 10345. Thereby the movable sleeve 10346 forms a means for disrupting and displacing the sealing element. In particular the sealing membrane 10381 may have been prepared to tear open along predefined weakened lines. Once the upward movement of the movable sleeve 10346 is completed the notch 10348 engaged by the closing flap will disengage there from as best shown in FIG. 15B. It will be clear to the skilled person that for activating the package 10303 it will only be necessary to provide a single notch 10348 on the inner circumference of movable sleeve 10346. In this third embodiment the second notch engaging a trailing vertical edge of closing flap 10375 is merely provided for ease of assembling.

The second and third embodiments as described above can both be automatically activated by a driving means in of the system. Continued rotation of the driving hub will start conveyance of the ground coffee once the sealing membrane has been moved out of the way of the container opening.

FIGS. 16A to 16E show a fourth embodiment of ground coffee packaging cartridge 10403. The package 10403 includes a bottle-like container 10431 defines an interior volume 10435, and has a neck portion 10437 and an outer collar 10442. Received within an open end 10439 defined by the outer collar 10442 is a closure member 10433, which preferably is non-detachably attached to the container 10431. The outer circumference of the outer collar 10442 may be provided with bayonet formations 10483, 10485 or other suitable connecting means for connection to a coffee brewing apparatus such as apparatus 4 of FIG. 1.

The closure member 10433 fits snugly into the open end 10439 as defined by the neck 10437 and outer collar 10442 of the container 10431 and may be attached by adhesive or weld bonding. An axial outer edge of the closure member 10433 is slightly recessed from the outer axial edge of the outer collar 10442 as shown in FIGS. 16A and 16B. The closure member 10433 also has a bottom 10451 with a ground coffee outlet 10411. As best seen in FIGS. 16C and 16D, the closure member 10433 defines a central cavity wall 10462 with a perimeter aperture 10467. The perimeter aperture communicates with the ground coffee outlet 10411 via a cavity that is again radially offset from the column of ground coffee held in the interior volume 10435. Received in a central cavity defined by cavity wall 10462 and bottom 10451 is a rotatable ground coffee conveyor disc. Axially extending from the conveyor disc 10469 is a closing flap 10475 configured to form a movable closing means for the perimeter aperture 10467. The ground coffee conveyor disc has a driving hub 10471 protruding through a central opening 10473 in the bottom 10451. It will be clear to the skilled person that conceivably the closure member (10433) of this embodiment may also be designed to engage the outside of the container (10431), in a similar fashion as in the previously described embodiments. In such an alternative arrangement the bayonet formations (10483, 10485) will be part of the closure member (10433) rather than the container (10431).

To protect the ground coffee contents of package 10403, prior to its activation for use in a coffee brewing apparatus, a sealing membrane 10481 is hermetically attached to the axial free edge of the outer collar 10442. In the fourth embodiment the sealing membrane 10481, forming the sealing means, is not automatically removed by the coffee brewing machine but will be removed by the user. For this purpose a manual pull tab 10482 may be provided as a configuration of the means for disrupting and displacing the sealing element. The arrangement of the bayonet formations 10483, 10485 on the exterior of the container 10431 with the closure member 10433 recessed in its open end allows the barrier foil or sealing membrane 10481 to be sealingly attached to the outer edge of the container 10431. Thereby the sealing barrier 10481 also covers the joint between the container 10431 and the closure member 10433. The sealing membrane or barrier foil 10481 can keep the ground coffee contents fresh and protected from ambient air during shipping and stock keeping prior to the package being put to use. However freshly roasted ground coffee may still emanate gases, such as $CO_2$. To enable roasted ground coffee to be freshly packed the sealing membrane, or barrier foil such as 10481, may additionally be provided with a one-way pressure relief venting valve (not shown in the drawing, but conventional).

In operation the package 10403 of the fourth embodiment, after manual removal of its sealing membrane 10481 can be coupled to the brewing apparatus of FIG. 1 by the bayonet formations 10483, 10485 or like suitable connecting means. The operation of conveying ground coffee into the coffee brewing apparatus is similar to the other embodiments. Once the brewing apparatus is activated to produce a coffee brew the control unit initiates rotation of the conveyor disc 10469 and the closing flap 10475 will rotate away from the perimeter aperture 10467. The rotation of conveyor disc 10469 will be continuous and the closing flap 10475 will only line up with the perimeter aperture 10467 once per revolution. During the time that closing flap 10475 is not aligned with the perimeter aperture 10467, ground coffee may exit towards the ground coffee outlet 10411 and into the grinder or metering unit of the brewing apparatus. As soon as the required amount of ground coffee to be ground is withdrawn from package 10403, the ground coffee conveyor disc 10469 will stop its rotation in the exact position that the closing flap 10475 aligns with the perimeter aperture 10467. A means to interrupt the supply of ground coffee is thereby provided. Preferably the rotative power and the sturdiness of the components comprising the closing flap 10475 and the perimeter aperture 10467 is such that any ground coffee that may be in the way of closing is cut or crushed, so that this does not present an obstacle to the closing of perimeter aperture 10467.

Figure 16E:
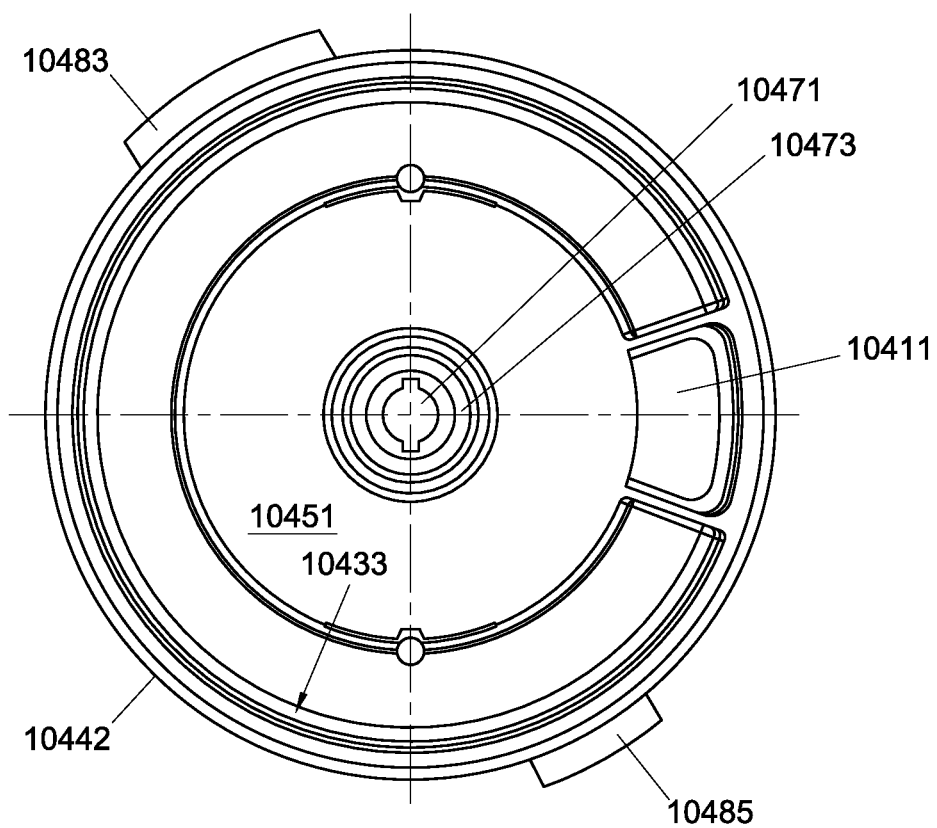
FIG. 16E is a bottom view of the fourth embodiment of the ground coffee packaging cartridge with its sealing membrane removed.
Figure 16F:
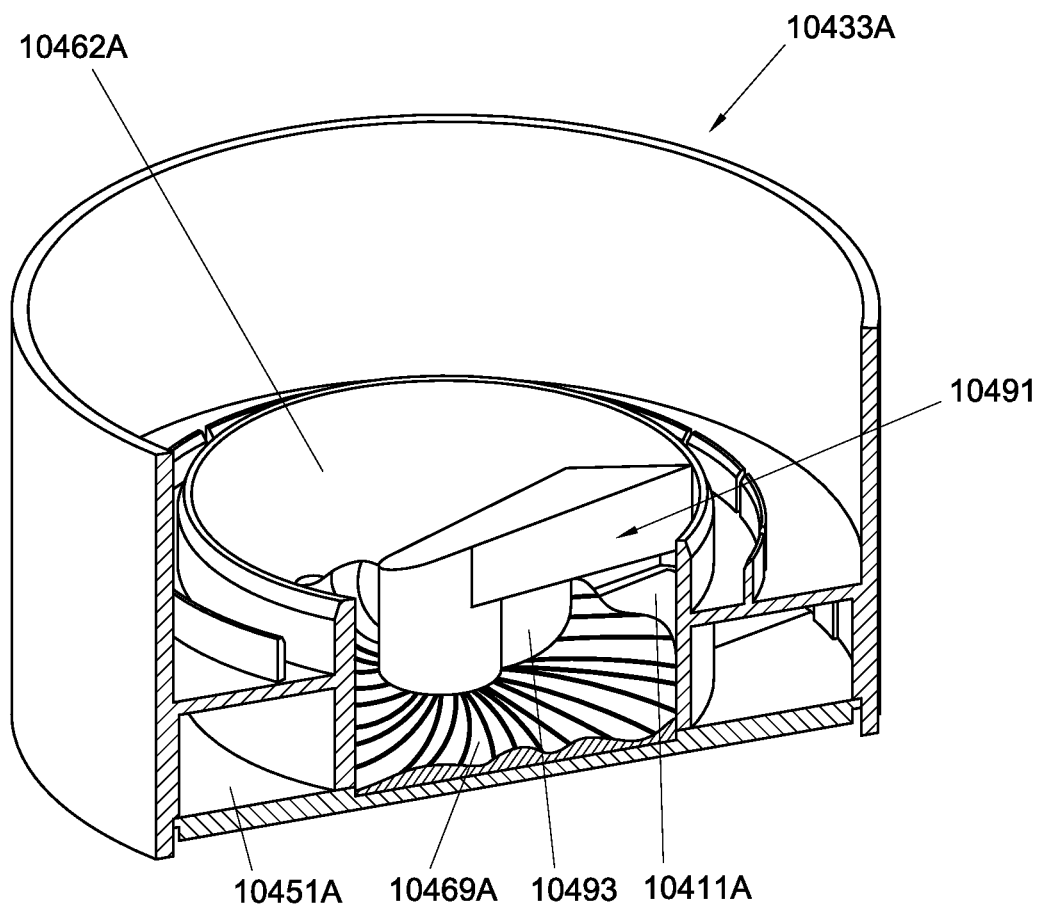
FIG. 16F is a partially cross-sectioned perspective view of a modified closure member for use with the fourth embodiment of the ground coffee packaging cartridge.

FIG. 16F shows a modified alternative closure member for use with the ground coffee packaging cartridge of FIGS. 16A to 16D. Closure member 10433A of FIG. 16F is adapted to be non-detachably attached to the open end of the container 10431 of FIGS. 16A-D. The axial outer edge of the closure member 10433A may thereby again be slightly recessed from the outer axial edge of the outer collar of the container 10431 as shown in FIGS. 16A and 16B to allow a sealing membrane only to be attached to the axial free edge of the outer collar of the container. The closure member 10433A also is provided with a bottom 10451A through which a ground coffee outlet 10411A extends. The closure member 10433A defines a central cavity wall 10462A with a perimeter aperture communicating with the ground coffee outlet 10411A. Accommodated in the central cavity defined by cavity wall 10462A and the bottom 10451A is a rotatable ground coffee conveyor disc 10469A. Guiding means include a plurality of generally radially extending alternating ridges and grooves on an upper surface of the conveyor disc 10469A that in use confronts the interior of container 10431. The plurality of generally radially extending alternating ridges and grooves of the conveyor disc 10469A assist in transporting the ground coffee towards the periphery thereof, by forming an agitating and guiding means for the ground coffee. Alternatively a flat upper surface on the conveyor disc 10469A may be used when it is rotated at a higher speed. In addition the guiding means of the embodiment of FIG. 16F includes a stationary guide arm 10491 overlying a portion of the upper surface of the conveyor disc 10469A to guide ground coffee from the conveyor disc 10469A along a generally radially extending guide surface 10493 toward the exit opening 10411A.

Figure 17:
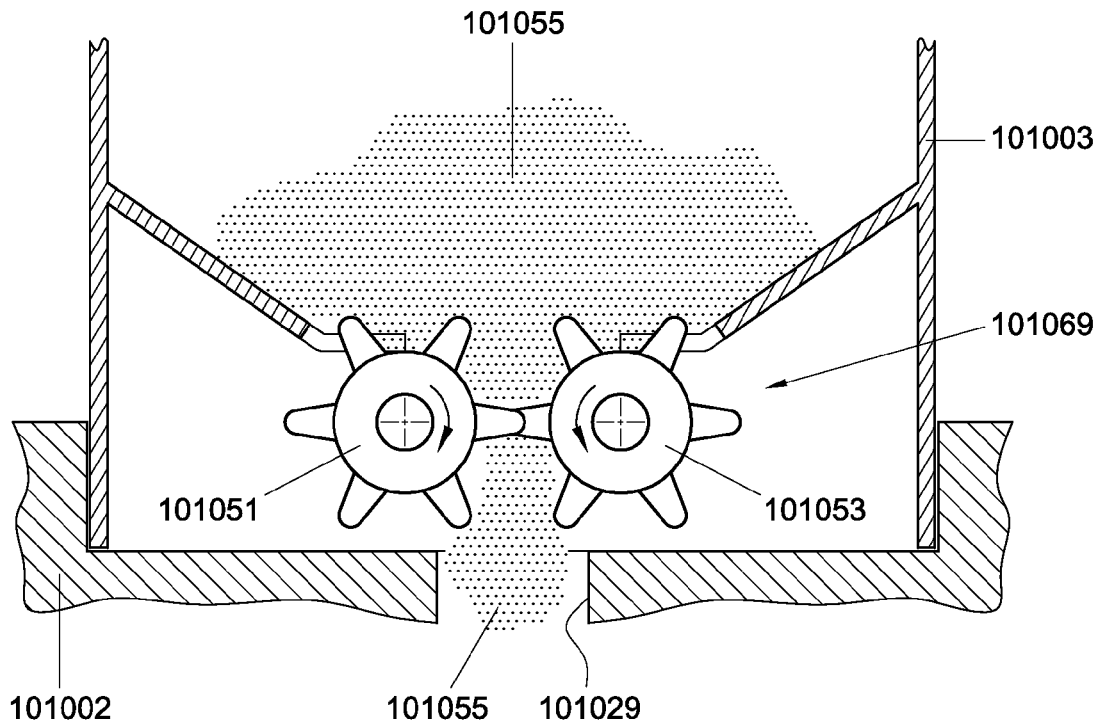
FIG. 17 in cross section shows an alternative form of transportation for use in a ground coffee packaging cartridge.
Figure 18:
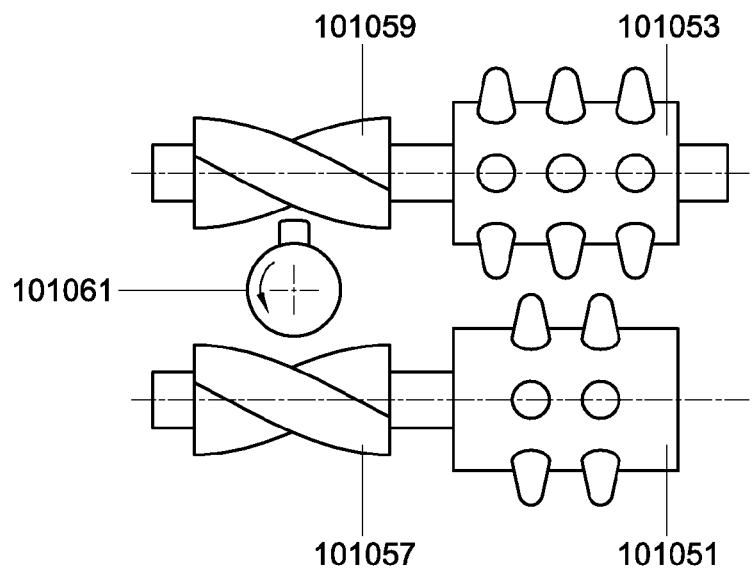
FIG. 18 is a plan view of a portion of the transportation means of FIG. 17.

In FIGS. 17 and 18 transportation or conveyor means 101069 is part of the package 101003 and includes a part of counter rotating first and second rubber ground coffee wheels 101051, 101053. The first and second rubber ground coffee wheels 101051, 101053, each have a plurality of flexible radial protrusions extending from their circumferences. Ground coffee 101055 is conveyed between the rubber ground coffee wheels 101051, 101053 when in motion, but the exit of the package 101003 is effectively closed to prevent ground coffee form falling out, when the rubber wheels 101051, 101053 are held stationary, by the radially extending protrusions.

As seen in FIG. 17 the package 101003 is positioned on top of a coffee brewing apparatus 101002 and ground coffee 101055 conveyed by the conveyor means 101069 will be allowed to enter a ground coffee supply opening 101029 of the brewing apparatus 101002. As seen in the plan view arrangement of FIG. 18, the first rubber ground coffee conveyor wheel 101051 has a first helical drive gear 101057. Similarly the second rubber conveyor wheel 101053 has a second helical drive gear 101059. Both the first and second helical drive gears 101057, 101059 are driven by an apparatus drive 101061, which is part of the apparatus 101002, rather than of the package 101003. It is clear that the drive coupling here is not in the form of a common shaft coupling, or the like, but rather accomplished through the drive engagement of complementary gear members.

Figure 19:
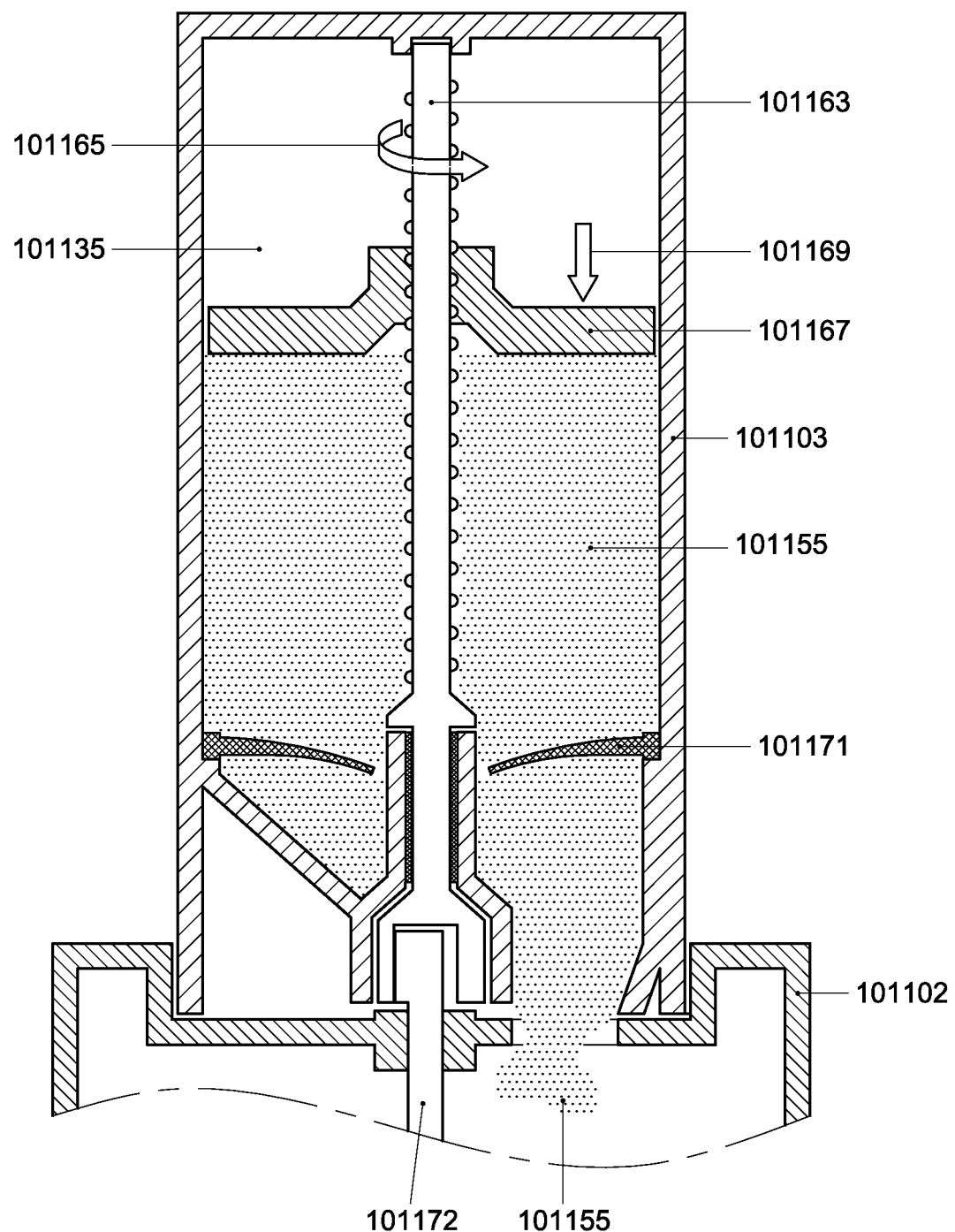
FIG. 19 is a cross section through another ground coffee packaging cartridge according to the invention employing yet another form of transportation means.
Figure 20:
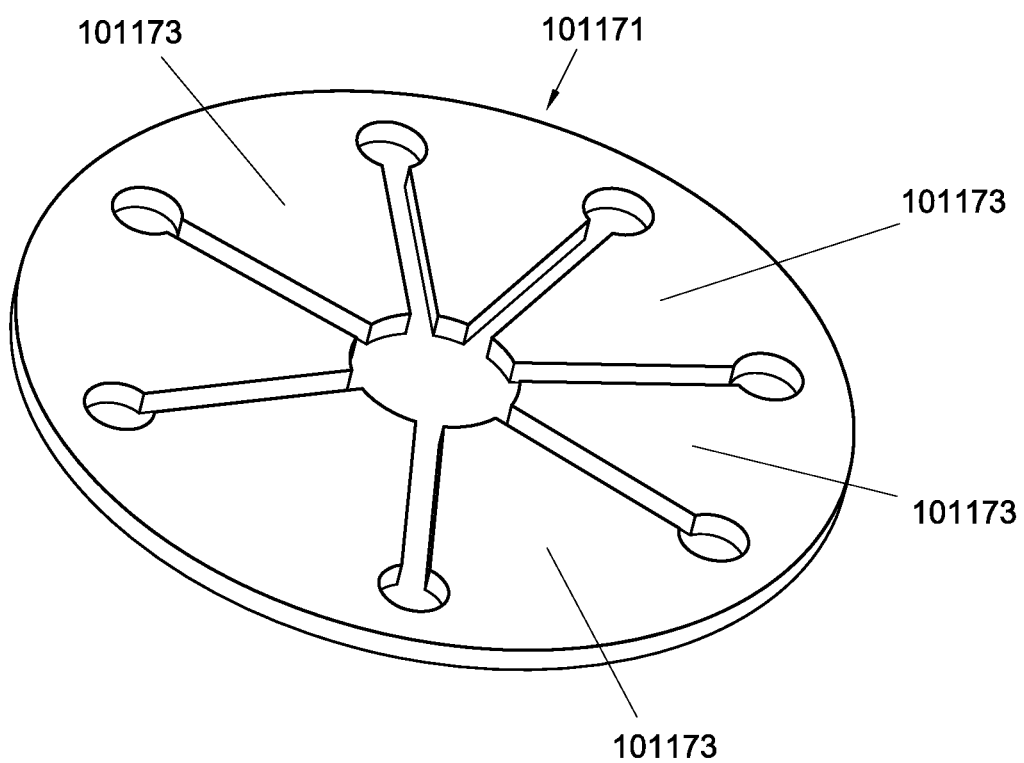
FIG. 20 is an isometric view of a flexible valve for use in the embodiment of FIG. 19.
Figure 21:
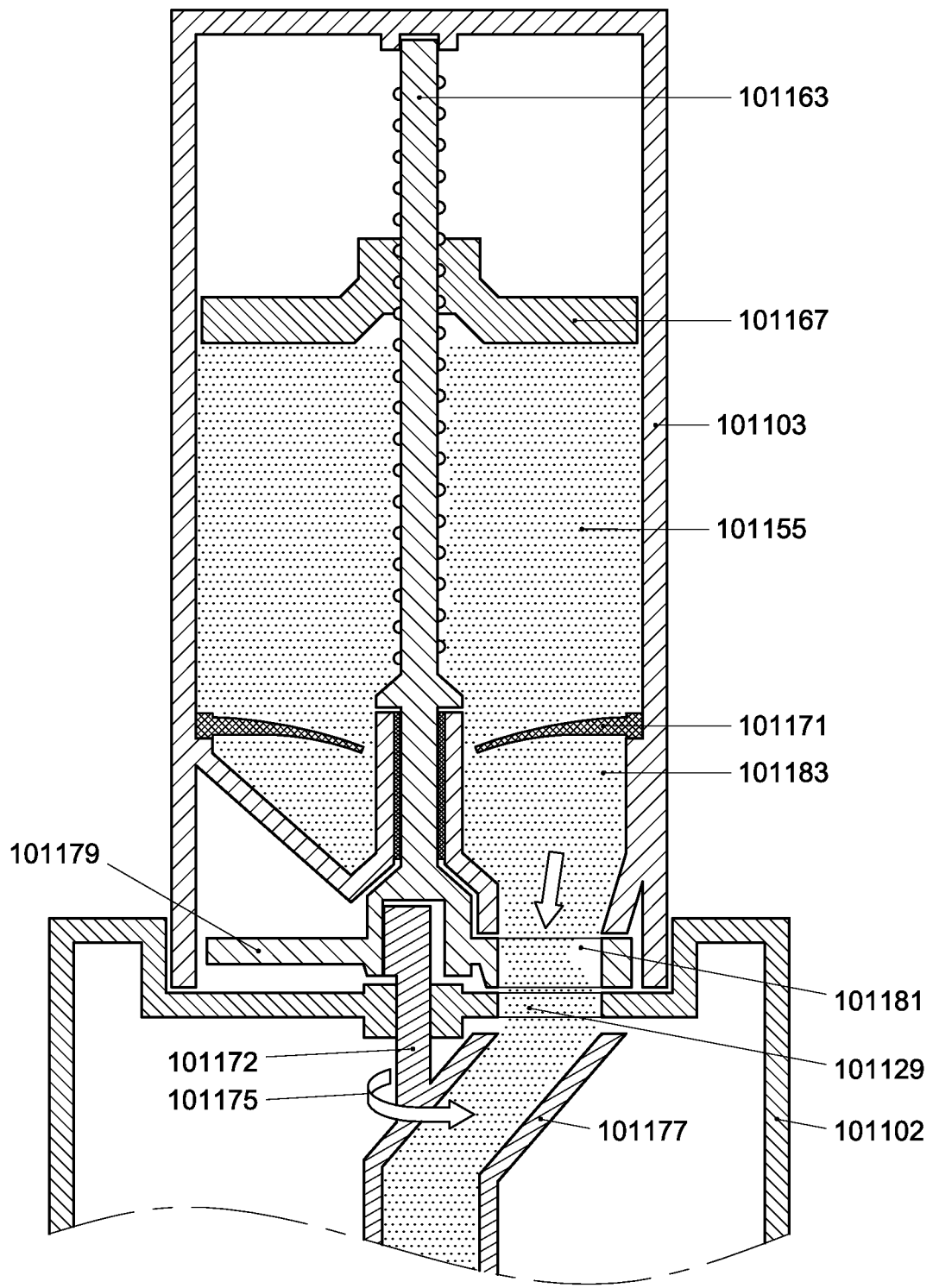
FIG. 21 is a variation on the embodiment of FIG. 19 using an additional synchronizing means in the coffee brewing apparatus.

The embodiments illustrated in FIGS. 19 to 21 use a rotative drive from the apparatus 101102, which is converted into a linear movement in the interior volume 101135 of the package 101103. Drive shaft 101172 rotatably engages lead screw 101163 in accordance with arrow 101165 and moves a conveyor piston 101167 in a downward direction, as indicated by arrow 101169. This forces ground coffee 101155 past a flexible valve 101171. The flexible valve 101171, which is shown separately in FIG. 20, is of a relatively stiff resilient material and is radially slotted to form a number of deflectable individual flaps 101173. The stiffness given by the material of the valve 101171, to the individual flaps, separated by the radial slots, is sufficient to support a filling of ground coffee 101155 in the package 101103. It is only by the force exerted by the conveyor piston 101167 that ground coffee 101155 is forced through the radial slots between the yieldable flaps 101173. Conveniently the flexible valve 101171 can be made from a plastic material. Without pressure being exerted on the flexible valve 101171, through the conveyor piston 101167 and the intervening ground coffee 101155, the ground coffee 101155 will be prevented from falling out of the package 101103. It will thereby be clear that with the package 101103 engaged with a grinding and/or brewing apparatus 101102 upon rotation of drive means 101172 interruption of the rotation of drive means 101172 will stop the supply of ground coffee 101155 through the flexible valve 101171.

In the alternative of FIG. 21 a rotating chute 101177 is associated with drive shaft 101172 for rotation therewith in a direction indicated by arrow 101175. Internally of the package 101103 the variation of FIG. 21 has a rotating closure member 101179 which rotates together with the lead screw 101163, when driven by the drive shaft 101172. The rotatable closure member 101179 has an exit aperture 101181 that registers with the rotating chute 101177. By stopping the drive shaft 101172 in a position where the chute 101177 is out of register with the ground coffee supply opening 101129 of the apparatus, also the exit aperture 101181 will be out of register with an internal chute 101183, formed in the package 101103. Thereby and additional closure of the package 101103 will be obtained, when ground coffee 101155 is not withdrawn there from by the apparatus 101102. To enable the exchange of unemptied packages 101103 from the apparatus 1102 it would merely suffice when ground coffee is prevented from falling out. However to enable stocking of partly emptied packages for prolonged periods of time it is certainly beneficial to counteract the entrance of air into the package, at least limit exposure to ambient air. For this purpose the additional closure member 101179 may be very useful.

Figure 22A:
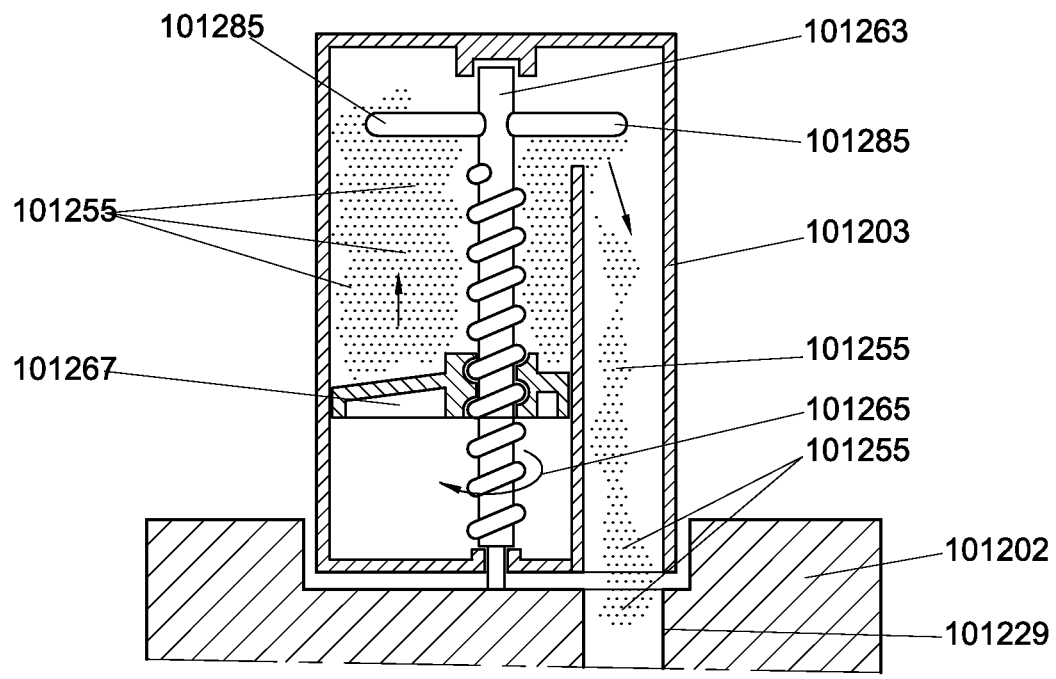
FIG. 22A in cross section shows a further embodiment of transportation means as part of a ground coffee packaging cartridge.
Figure 22B:
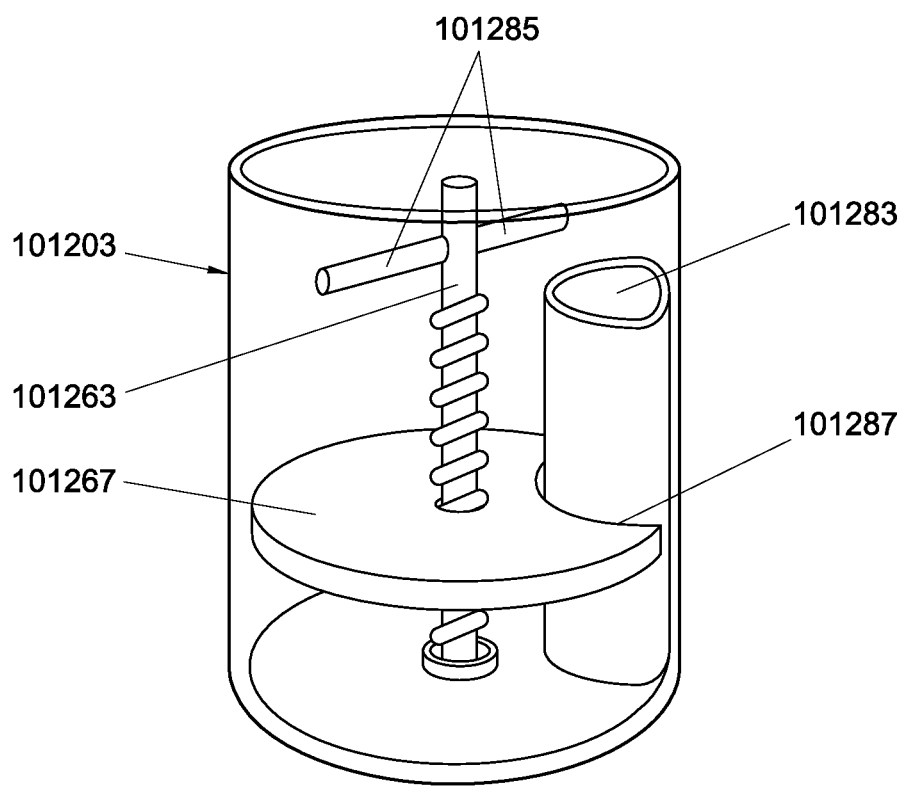
FIG. 22B is an isometric ghost view of the package of FIG. 22A.

Another variation of the ground coffee packaging cartridge 101203 is illustrated in FIGS. 22A and 22B. The package 101203 has again a rotatable lead screw 101263, which is arranged to be driven from a coffee brewing apparatus 101202 (such as the brewing apparatus 4 of FIG. 1) similar to the previously described embodiments. Rotation of the lead screw 101263 in the direction of arrow 101265 raises a floor forming piston 101267. Raising of the floor forming piston 101267, raises ground coffee 101255 resting on top of the floor forming piston 101267 to a level above internal chute 101283. Arms 101285 rotate together with the lead screw 101263 and assist in sweeping ground coffee 101255 at the upper surface into the internal chute 101283. It is further seen in FIG. 22B that the floor forming piston 101267 is formed with a recess 101287 that snugly fits around the internal chute 101283. When the package 101203 is in the form of a cylindrical container, as represented in FIG. 22B, then the recess 101287 effectively prevents relative rotation between the floor forming piston 101267 and the remainder of the package 101203, without the need for other rotation preventing means. The ground coffee 101255 that has been transferred into the chute 101283 will enter the apparatus 101202 through supply opening 101229, as shown in FIG. 22A.

Figure 23A:
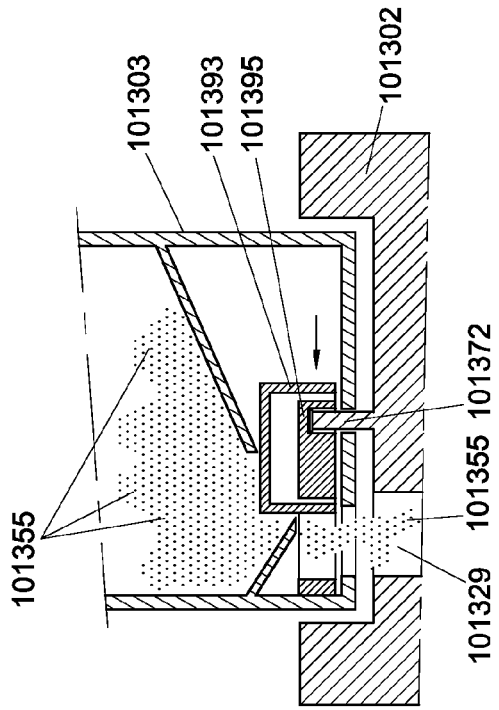
FIG. 23A is a cross sectional view through another embodiment of transportation means of a ground coffee packaging cartridge in a first position.

Yet another form of transportation or conveyor means in a ground coffee packaging cartridge 101303 is shown in FIGS. 23A to 238D. The package 101303 is adapted to be connected to a brewing appliance 101302 and to be drivingly connected to a drive shaft 101372 of the appliance 101302. The package 101303 has a primary bottom 101389 having a ground coffee outlet 101311, that lines up with the ground coffee supply opening 101329 of the appliance 101303. The package 101303 is further provided with a secondary bottom 101391 that is generally funnel shaped with a lowermost position being interrupted for communication with a shuttle slider 101393.

Figure 23B:
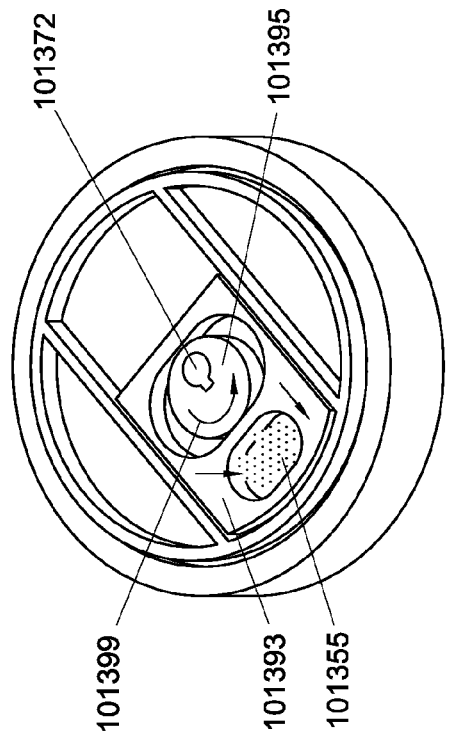
FIG. 23B is an isometric view of the transportation means of FIG. 23A in the first position.
Figure 23C:
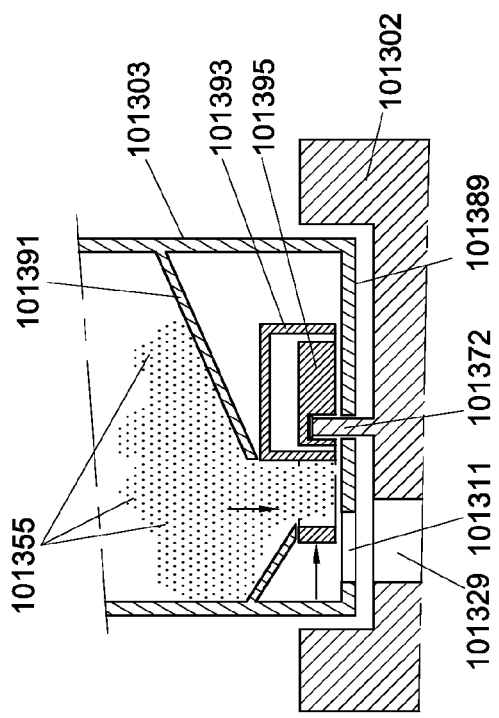
FIG. 23C is a cross sectional view of the transportation means of FIG. 23A in a second position.
Figure 23D:
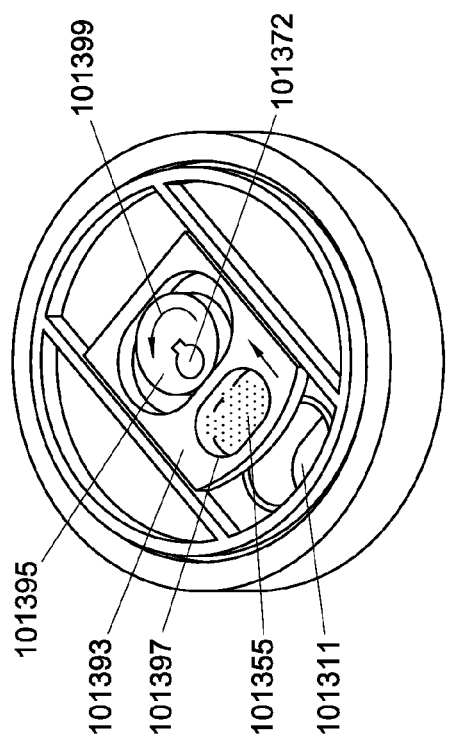
FIG. 23D is an isometric view of the transportation means of FIG. 23A in the second position.

The shuttle slider 101393 is guided for reciprocating movement by an eccentric 101395, rotatably by drive shaft 101382. See in particular FIGS. 23B and 23D. As shown in FIGS. 23A and 23B the shuttle slider 101393 has a dosing cavity 101397 holding a predefined quantity of ground coffee 101355. In a first position as shown in FIGS. 23A and 23B, the shuttle slider 101393 has its dosing cavity 101397 in communication with the supply of ground coffee 101355 supported by the secondary bottom 101391. Rotation of the eccentric 101395 in the direction of arrow 101399 will move the shuttle slider 101393 from the first position shown in FIGS. 23A en 23B, into a second position shown in FIGS. 23C and 23D. In the second position the dosing cavity 101397 aligns with the exit opening 101311 and ground coffee is allowed to pass through the supply opening 101329 of the appliance 101302. It will be clear to the skilled person that the embodiment of FIGS. 23A to 23D may be used for both conveyance and dosing of ground coffee to an appliance. The number of rotations of drive shaft 101372, together with the capacity of the dosing cavity 101397 may provide an accurate dosing for a selected number of beverage servings. Also it will be clear that with the shuttle slider 101393 in either one of the first and second positions the package 101303 will be closed, as communication between the supply of ground coffee 101355 within the package 101303 is not possible with an immobilized shuttle slider 101395.

Figure 24A:
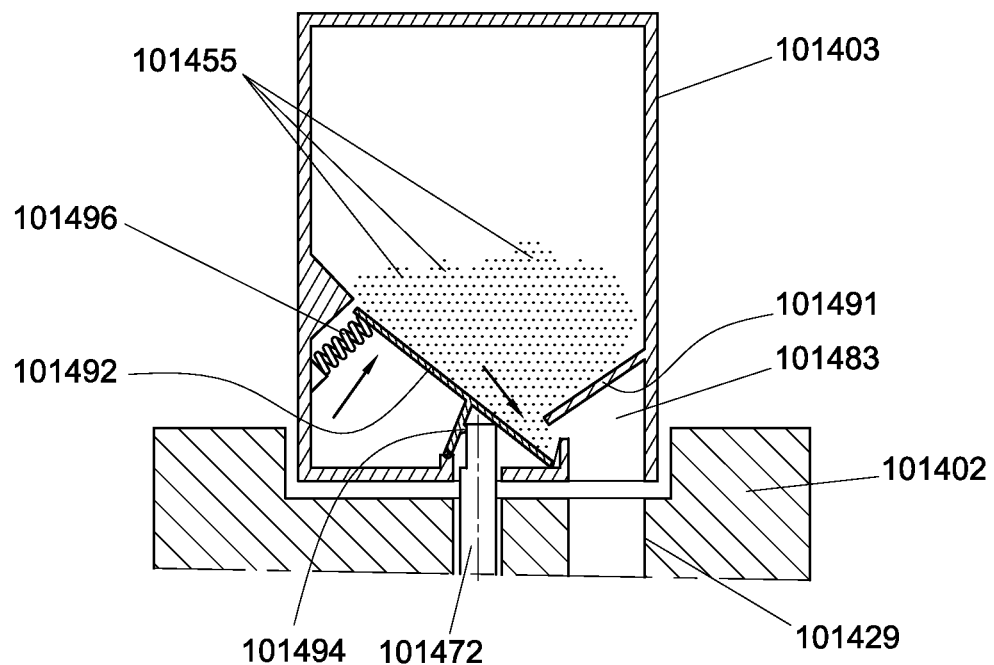
FIG. 24A in cross section shows another alternative form of transportation means for a ground coffee packaging cartridge in a first position.
Figure 24B:
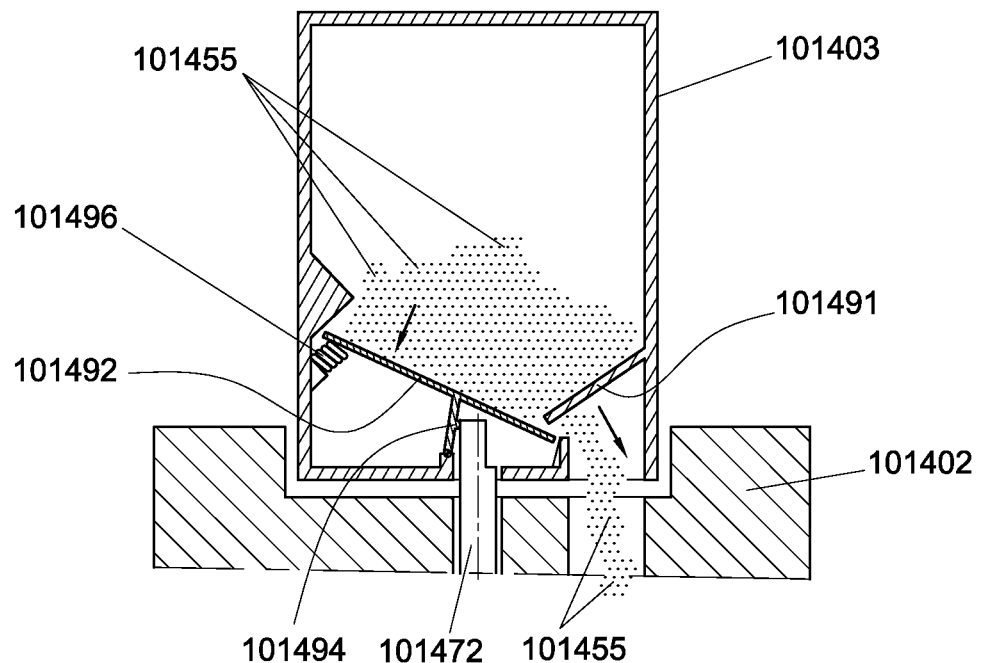
FIG. 24B shows the alternative form of the transportation means of FIG. 24A in a second position.

The transportation or conveying means illustrated in FIGS. 24A and 24B have again a secondary bottom 101491, which is completed by a tipping section 101492. Tipping section 101492 is pivoted in the vicinity of drive shaft 101472, which protrudes from the appliance 101402 (i.e. the coffee brewing apparatus 4 of FIG. 1). A top end of drive shaft 101472 is formed as an eccentric and a follower 101494 is biased against the eccentric top end of drive shaft 101472 by a spring 101496. The rotating speed of the drive shaft 101472 can be configured such that a vibrating movement is induced into the tipping section 101492. The geometry may be chosen to effect that only a specific amount of ground coffee 101455 may be admitted into a chute 101483 every time the tipping section 101492 tips, i.e. upon each rotation of the drive shaft 101472. Clearly still other arrangements will be conceived by the skilled person. While the embodiment of FIGS. 24A and 24B is shown to be biased to an open position of its tipping section 101492, it is indeed easily conceivable to arrange the tipping section in a manner that it will be biased into the closed position of the secondary bottom, so that ground coffee will not fall out when the package is removed from the brewing apparatus.

Further embodiments of such a ground coffee packaging cartridge which are manually operated will be described now with reference to the following Figures.

The ground coffee packaging cartridge is specifically adapted to be connected to the coffee brewing apparatus 4. Thereto, the ground coffee packaging cartridge is provided with connection elements (such as e.g. bayonet elements) similarly to the coffee bean packaging cartridge. However, the ground coffee packaging cartridge can in addition be connected to another external apparatus, e.g. a coffee grinder apparatus only used for grinding coffee beans but not for brewing coffee. In view of this the description which follows refers to an external apparatus to which the ground coffee packaging cartridge can be connected rather than to the coffee brewing apparatus.

Figure 25A:
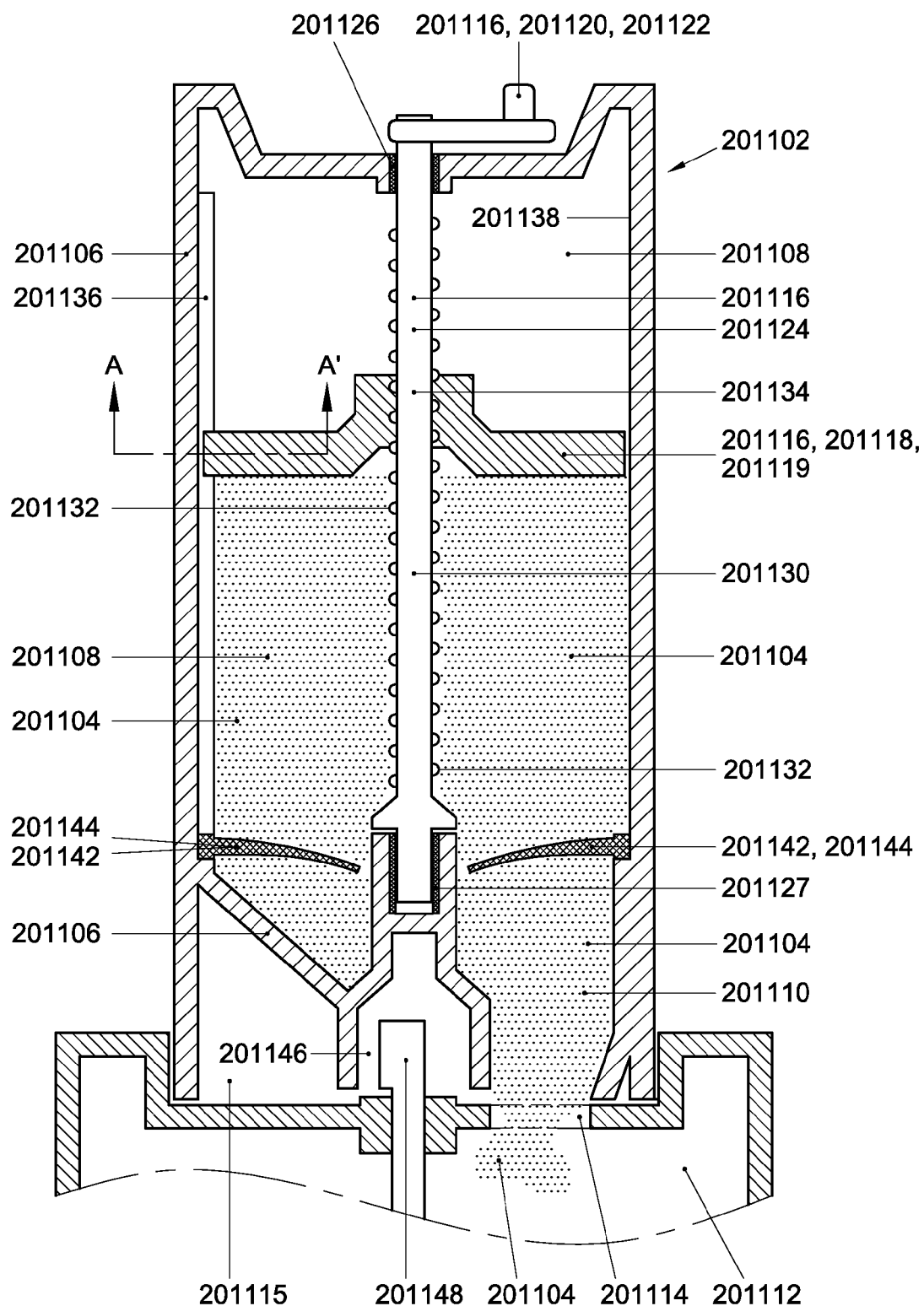
FIG. 25A shows in cross-section a ground coffee packaging cartridge for holding and supplying ground coffee according to a first aspect of a first manually operated package embodiment of the invention.

FIG. 25A shows in cross-section of the ground coffee packaging cartridge 201102 for holding and supplying ground coffee according to a first aspect of the first embodiment of manually operated packages. In this example, the package 201102 is filled with roasted ground coffee 201104, being an example of ground coffee.

The ground coffee packaging cartridge 201102 includes a housing 201106 that encloses an interior volume 201108 of the ground coffee packaging cartridge 201102. The housing 201106 may e.g. have a cylindrical shape. In the interior volume 201108, the ground coffee 201104 can be held. The housing 201106 has an outlet 201110 for releasing the ground coffee 201104 from the interior volume 201108. From the outlet 201110, the ground coffee 201104 can be supplied to a hosting external apparatus 201112. The external apparatus 201112 may be arranged for hosting the ground coffee packaging cartridge 201102 by means of a cavity 201115. The cavity 201115 may be present in a, in use, top part of the external apparatus 201112. The external apparatus 201112 may have an inlet 201114 through which the ground coffee 201104 can be received. The inlet 201114 of the external apparatus 201112 may be positioned in the cavity 201115.

The ground coffee packaging cartridge 201102 further includes transportation means 201116 for transporting the ground coffee 201104 towards the outlet 201110. The transportation means 201116 include a moveable structure 201118 for contacting the ground coffee 201104. As a result of such contacting, a force may be applied to the ground coffee 201104. However, alternatively, as a result of such contacting, movement of ground coffee can be blocked. Then, the force applied by the moveable structure 201118 may be a reaction force caused by another force that works on the ground coffee, such as gravity force. Thus, the contacting element can be used for actively transporting the ground coffee, and/or can be used for blocking the ground coffee and realizing transport of the ground coffee by releasing the blockage of the ground coffee. The moveable structure 201118 is at least partly, and in this example completely, present in the interior volume 201108. In this example, the moveable structure 201118 may form a plunger 201119.

The transportation means 201116 further include manually operable actuation means 201120, in this example a crank handle 201122, for manually actuating the moveable structure 201118. The manually operable actuation means 201120 are at least partly, and in this example completely, provided outside of the interior volume 201108. Their position outside the interior volume 201108 enables that the manually operable actuation means 201120 can be reached by hand by a user.

In the first example, the transportation means 201116 may further include a rotatable element, such as a rotatable axle 201124. The rotatable axle 201124 may be located at least partly, in this example completely, inside the interior volume 201108. Here, the rotatable axle 201124 in use rotates in a first bearing 201126 provided through the housing 201106, and in a second bearing 201127. The rotatable axle 201124 may be coupled, e.g. outside the housing 201106, to the crank handle 201122. In this way the crank handle 201122 may be arranged for rotating the rotatable axle 201124.

In the first example, the rotatable axle 201124 may be partly formed as a conveyor screw 201130, provided with screw thread 201132. Additionally, the plunger 201119 may include a threaded bore 201134 through which the conveyor screw 201130 may be engaged. By rotating the conveyor screw 201103 by means of the crank handle 201122, the plunger 201119 may be moved downwards or upwards through the interior volume 201108. As a result of moving the plunger 201119 downwards, a downward force can be applied on the ground coffee 201104.

Figure 25B:
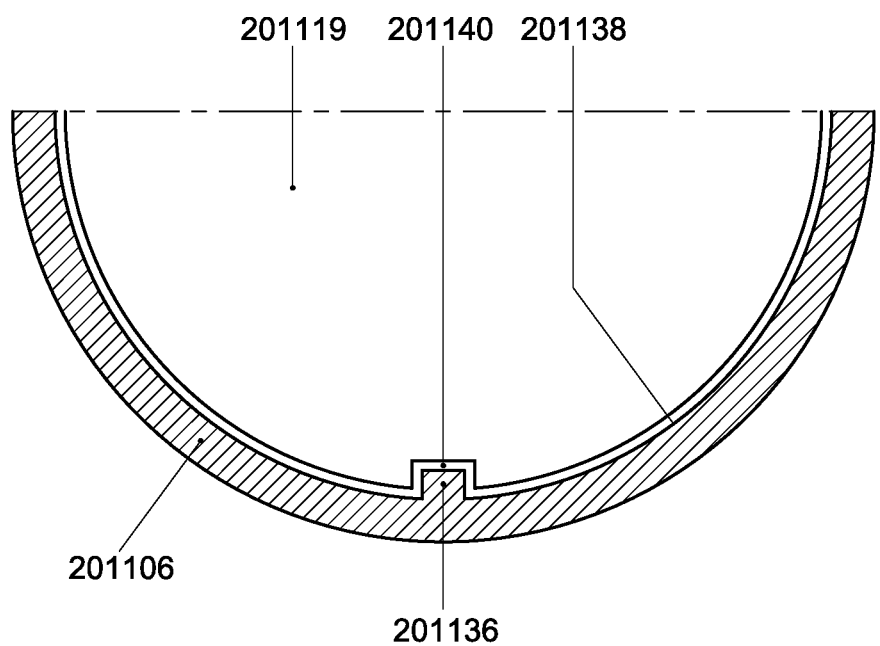
FIG. 25B shows a notch, a plunger, a ridge, and a housing in a cross-section.

The ground coffee packaging cartridge 201102 may further include a blocking element, such as a ridge, 201136 for substantially preventing movement of the moveable structure 201118 inside the interior volume 201108 in a direction transverse to an axis of rotation of the rotatable element. In this example, the blocking element is formed as the ridge 201136 that is rigidly attached to an interior side 201138 of the housing 201106. The ridge 201136 may extend along the interior side 201138 of the housing 201106, in a direction approximately parallel with the rotatable axle 201124. In use the ridge 201136 may engage with a notch 201140 in the plunger 201119. FIG. 25B shows the notch 201140, the plunger 201119, and the ridge 201136, and the housing 201106 in a cross-section A-A'. It may be clear however that the blocking element can be left out if the housing 201106 and the plunger

201119 have a rectangular shape, or if, more in general, the moveable structure 201118 and the housing 201106 are shaped for preventing movement of the moveable structure 201118 with respect to the housing 201106 in a direction transverse to a direction in which the conveyor screw 201130 extends.

The ground coffee packaging cartridge 201102 may be provided with a valve 201142 for forming a barrier that hinders passage of the ground coffee 201104 towards the outlet 201110. The valve 201142 may be located inside the interior volume 201108. The valve 201142 may include one or more, e.g. a plurality of, flexible elements 201144 that are deformed when the valve 201142 is opened. The flexible elements 201144 may include an elastic material, for example rubber. By means of the valve 201142, the downward force that can be applied on the ground coffee 201104 by means of the plunger 201119, can in use at least partly be counteracted. The valve 201142 thus increases possibilities for control of the supply of the ground coffee 201104, as the valve 201142 may prevent uncontrolled movement of the ground coffee 201104 towards the outlet 201110.

The ground coffee packaging cartridge 201102 may be provided with a recess 201146 in the housing 201106 for receiving an external drive member 201148 of the external apparatus 201112. In the first example, the housing 201106 is closed in the recess 201146. In FIG. 25A, the external drive member 201148 is received in the recess 201146. From FIG. 25A, it may be clear that the recess 201146 may be dimensioned for preventing mechanical contact between the ground coffee packaging cartridge 201102, in particular the housing 201106 of the ground coffee packaging cartridge 201102, and the external drive member 201148. In this way it is enabled that the ground coffee packaging cartridge 201102 may be used in combination with the external apparatus 201112 that is provided with the external drive member 201148, while the ground coffee packaging cartridge 201102 can also be used in combination with another external apparatus that is not provided with the external drive member 201148.

Figure 25C:
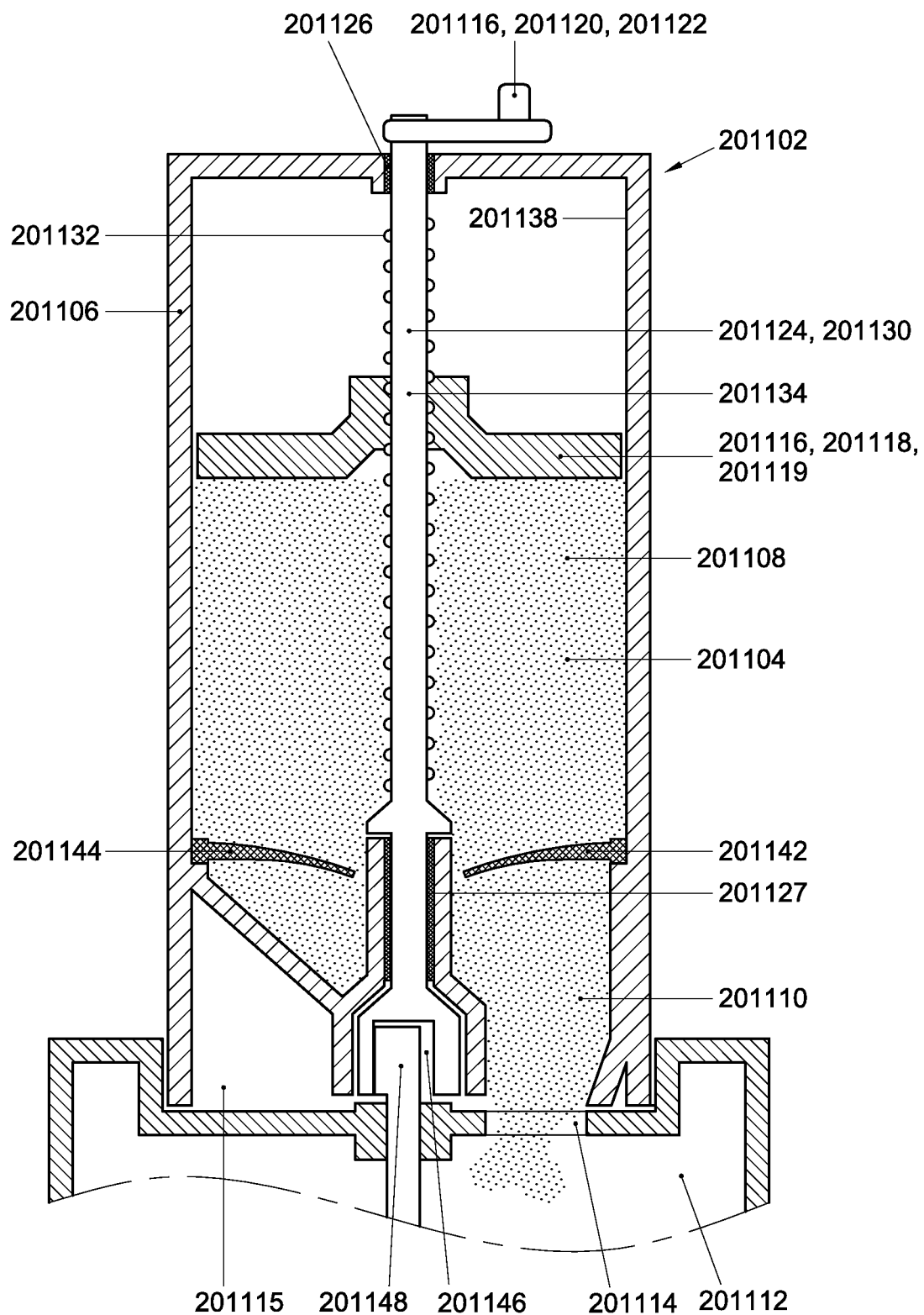
FIG. 25C shows a variation of the ground coffee packaging cartridge according to the first aspect.

FIG. 25A also shows that the transportation means 201116, in particular the rotatable axle 201124, may be positioned for preventing, in use, mechanical contact with the external drive member 201148. E.g. in FIG. 25A an end of the rotatable axle 201124, which in this example is located in the second bearing 201127, is spaced apart from the recess 201146. In this way driving of the transportation means 201116 by means of the external drive member 201148 may be prevented. However, in a variation of the ground coffee packaging cartridge 201102 in the first example shown in FIG. 25C, the transportation means 201116, in particular the rotatable axle 201124, may be positioned for establishing, in use, driving of the transportation means 201116 by means of the external drive member 201148. In the variation shown in FIG. 25C, the rotatable axle 201124 and the external drive member 201148 in use make mechanical contact. This enables driving of the rotatable axle 201124 by means of both the manually operable actuation means 201120 and the external drive member 201148.

Figure 26:
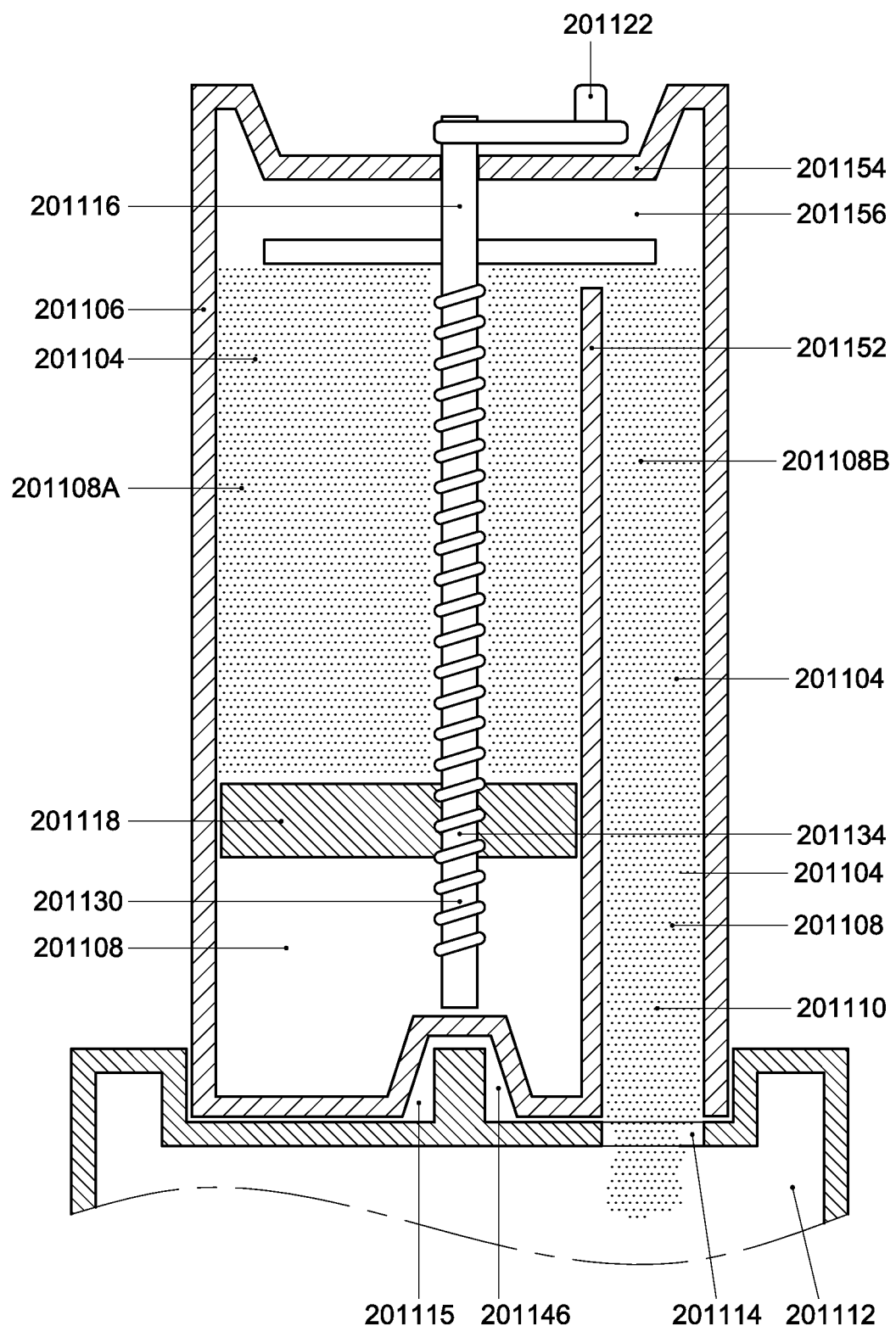
FIG. 26 shows in cross-section a ground coffee packaging cartridge for holding and supplying ground coffee according to a second aspect of the first manually operated package embodiment of the invention.

FIG. 26 shows in cross-section a ground coffee packaging cartridge 201102 for holding and supplying ground coffee, e.g. the ground coffee 201104, according to a second aspect of the first embodiment of a manually operated package. The ground coffee packaging cartridge 201102 is provided with the housing 201106, the transportation means 201116, the moveable structure 201118, and the outlet 201110.

In the second example, the ground coffee packaging cartridge 201102 may be provided in the interior volume 201108 with an internal wall 201152. The internal wall 201152 may be spaced apart from, in use, a top part 201154 of the housing 201106. Similar to the first example, the transportation means 201116 are provided with the conveyor screw 201130 provided in the threaded bore 201134 of the moveable structure 201118. By rotating the conveyor screw 201130 by means of the crank handle 201122, the moveable structure 201118 can be moved, in use, upwards. The transportation means 201116 are thus arranged for moving the ground coffee 201104 through a space 201156 between the, in use, top part 201154 of the housing 201106 and the internal wall 201152. Such moving through the space 201156 may occur if the ground coffee 201104 is lifted high enough by means of the moveable structure 201118. As a result of vibrations or sideward instability of the lifted pile of ground coffee 201104 that are not supported anymore by the internal wall 201152, ground coffee 201104 may move sideward over the internal wall 201152.

FIG. 26 further illustrates that the internal wall 201152 may separate a first part 201108A of the interior volume 201108 from a second part 201108B of the interior volume 201108. The moveable structure 201118 may be arranged in the first part 201108A of the interior volume 201108. The outlet 201110 may be accessible via the second part 201108B of the interior volume 201108.

Figure 27:
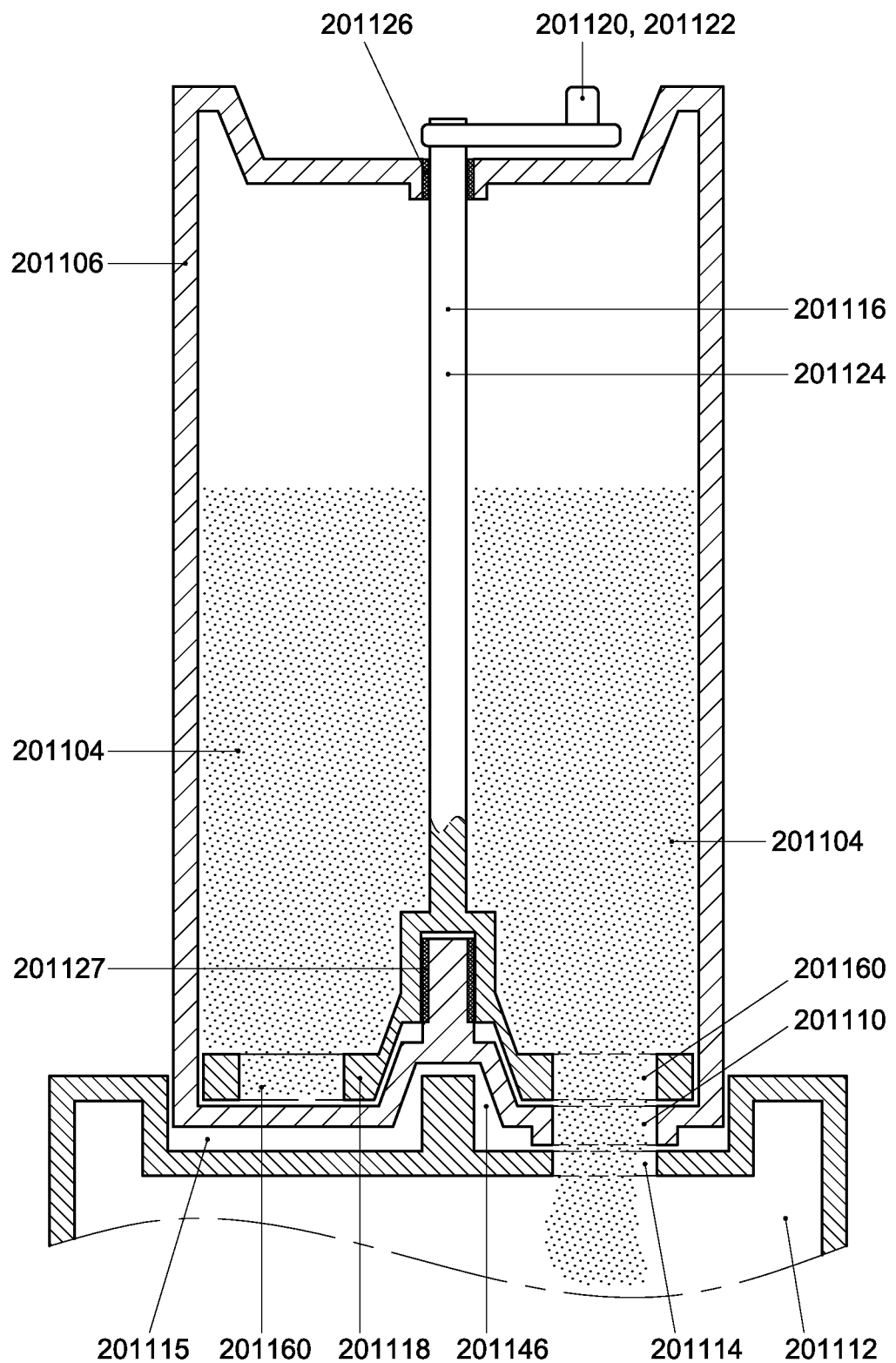
FIG. 27 shows in cross-section a ground coffee packaging cartridge for holding and supplying ground coffee according to a third aspect of the first embodiment of the invention.

FIG. 27 shows in cross-section a ground coffee packaging cartridge 201102 for holding and supplying ground coffee, e.g. the ground coffee 201104, according to a third aspect of the first manually operated embodiment. The ground coffee packaging cartridge 201102 is provided with the housing 201106, the transportation means 201116, the moveable structure 201118, and the outlet 201110.

In the third example, the moveable structure 201118 may be rigidly connected to the rotatable element, e.g. the rotatable axle 201124. The moveable structure 201118 may e.g. be shaped like a disk. The moveable structure 201118 may be provided with at least one first aperture 201160 for letting the ground coffee 201104 pass there through. In FIG. 27, two first apertures 201160 are visible. A total amount of first apertures 201160 may be in a range from 1 to 6, in a range from 7 to 15, and/or larger than 15.

The ground coffee packaging cartridge 201102 may be provided with at least one second aperture that is positioned, in use, above or below the at least one first aperture 201160 and that offers entrance to the outlet 201110. As a result of rotating the rotatable axle 201124, the at least one aperture can be aligned with the at least one second aperture. Then, ground coffee 201104 can fall through both the at least one first and the at least one second aperture. By further rotating the rotatable axle 201124, alignment of the at least first and the at least second apertures can, at least partly be cancelled. In this way supply of the ground coffee 201104 can be stopped. Thus, rotating the rotatable axle 201124 enables control of the supply of the ground coffee 201104.

In this example, the second aperture is formed by the outlet 201110, in use located below the first apertures 201160. However, alternatively, the at least one second aperture may be spaced apart from the outlet 201110. More in general, a total amount of the second apertures may be approximately equal to a total amount of the first apertures 201160. It may thus be clear that the outlet 201110 may include a plurality of apertures, which may or may not be mutually interconnected.

Figure 28A:
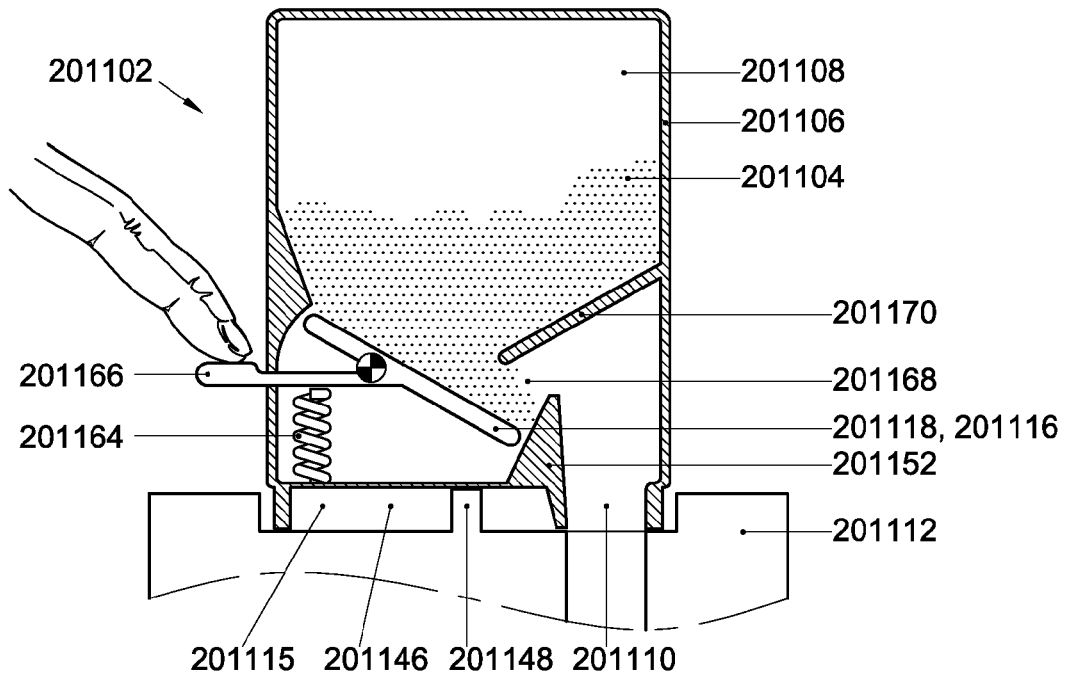
FIG. 28A shows in cross-section a ground coffee packaging cartridge for holding and supplying ground coffee according to a fourth aspect of the first manually operated package embodiment of the invention, with a moveable structure in a first position.
Figure 28B:
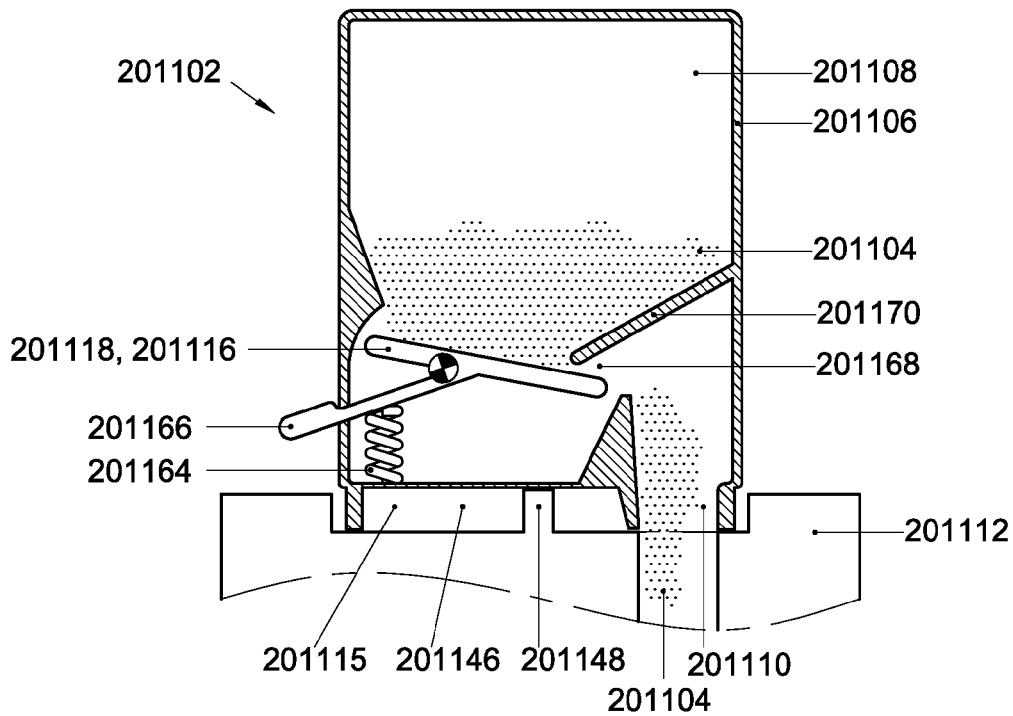
FIG. 28B shows in cross-section the ground coffee packaging cartridge for holding and supplying ground coffee according to the fourth aspect of the first manually operated package embodiment of the invention, with the moveable structure in a second position.

FIGS. 28A and 28B shows in cross-section a ground coffee packaging cartridge 201102 for holding and supplying ground coffee, e.g. the ground coffee 201104, according to a fourth aspect of the first manually operated embodiment. The ground coffee packaging cartridge 201102 is provided with the housing 201106, the transportation means 201116, the moveable structure 201118 of the transportation means 201116, and the outlet 201110.

In the fourth example, the moveable structure 201118 is resiliently attached to the ground coffee packaging cartridge 201102 by means of a resilient member, here an elastic spring 201164. The moveable structure 201118 is moveable by means of the manually operable actuation means 201120, here comprising a lever 201166, repeatably from a first position to a second position and vice versa.

FIG. 28A shows the ground coffee packaging cartridge 201102 in the fourth example with the moveable structure 201118 in the first position. FIG. 28B shows the ground coffee packaging cartridge 201102 in the fourth example with the moveable structure 201118 in the second position. It may thus be clear that, by moving the moveable structure 201118 from the first position to the second position, the spring 201164 may be resiliently deformed.

The ground coffee packaging cartridge 201102 in FIGS. 28A and 28B is provided in the interior volume 201108 with a passage 201168 for the ground coffee towards the outlet 201110. The passage 201168 may be formed by the internal wall 201152 and an additional wall 201170 that extends from the housing 201106 into the interior volume 201108. In this example, in the second position the passage 201168 is at least partly obstructed, in this example substantially completely obstructed, i.e. substantially blocked, by the moveable structure 201118. In this example, in the first position the passage 201168 is obstructed less by the moveable structure 201118 than in the second position. In this example, in the first position the passage 201168 is not obstructed by the moveable structure 201118. In a variation however, the first and second position may be reversed, so that in the first position the passage 201168 is at least partly obstructed by the moveable structure 201118 and in the second position the passage 201168 is obstructed less by the moveable structure 201118 than in the first position or is not obstructed by the moveable structure 201118.

In the fourth example, the first position is located, in use, below the second position. In addition, at least part of the ground coffee 201104 is located, in use, above the moveable structure 201118. As a result, repeatedly moving the moveable structure 201118 from the first position to the second position and vice versa, may result in a shaking motion of at least part of the ground coffee 201104 that are located above the moveable structure 201118. Such a shaking motion may promote movement of the ground coffee through the interior volume 201108.

The ground coffee packaging cartridge 201102 in one of the first, second, first, and fourth examples can be used in a method. The method includes supplying ground coffee, e.g. the ground coffee 201104, from the ground coffee packaging cartridge 201102 to the external apparatus 201112. The method further includes holding the ground coffee 201104 in the housing 201106 that encloses the interior volume 201108 of the ground coffee packaging cartridge 201102. The method further includes transporting the ground coffee 201104 by means of the transportation means 201116 towards the outlet 201110 of the housing 201106. The method further includes releasing the ground coffee 201104 through the outlet 201110 from the interior volume 201108. In the method, transporting the ground coffee 201104 includes contacting the ground coffee 201104 by means of the moveable structure 201118 of the transportation means 201116. Here, the moveable structure 201118 is, at least partly, present in the interior volume 201108. The method further includes actuating the moveable structure 201118 by means of the manually operable actuation means 201120 of the transportation means 201116. Here, the manually operable actuation means 201120 are, at least partly, provided outside of the interior volume 201108. It may be clear however that the method can also be carried out by other embodiments of the ground coffee packaging cartridge 201102. Alternatively, the method may be carried out without making use of the ground coffee packaging cartridge 201102 in one of the example or variations described.

Figure 29A:
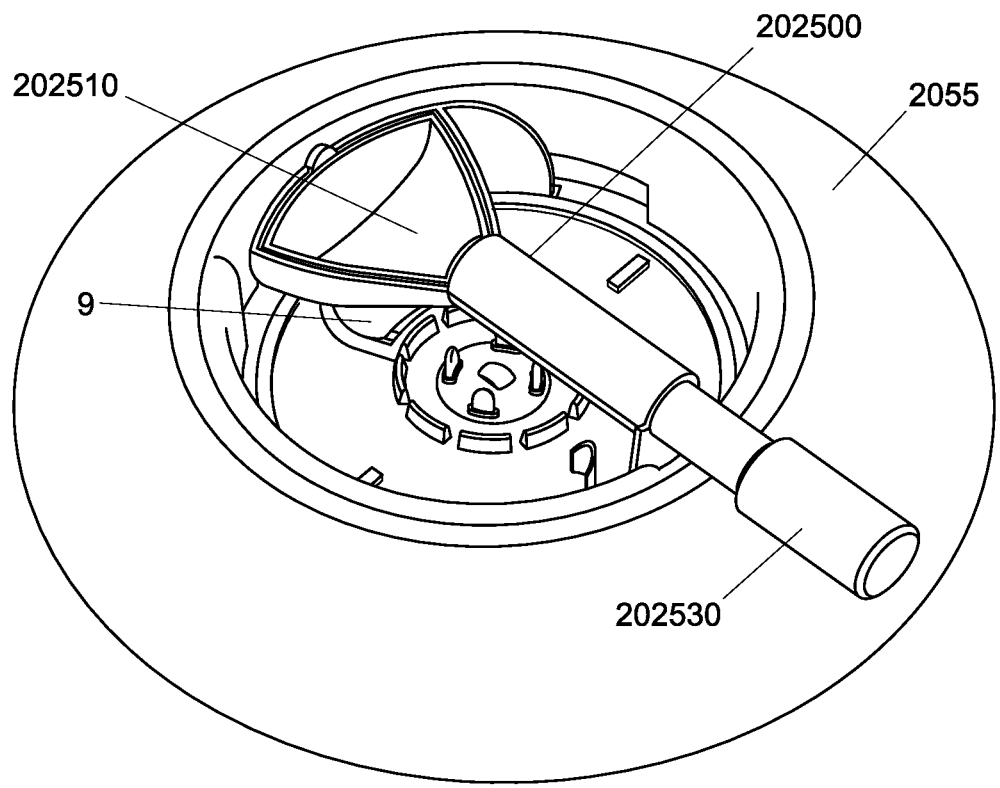
FIG. 29A shows a perspective view of a ground coffee packaging cartridge according to a second manually operated package embodiment of the invention mounted to the coffee brewing apparatus.
Figure 29B:
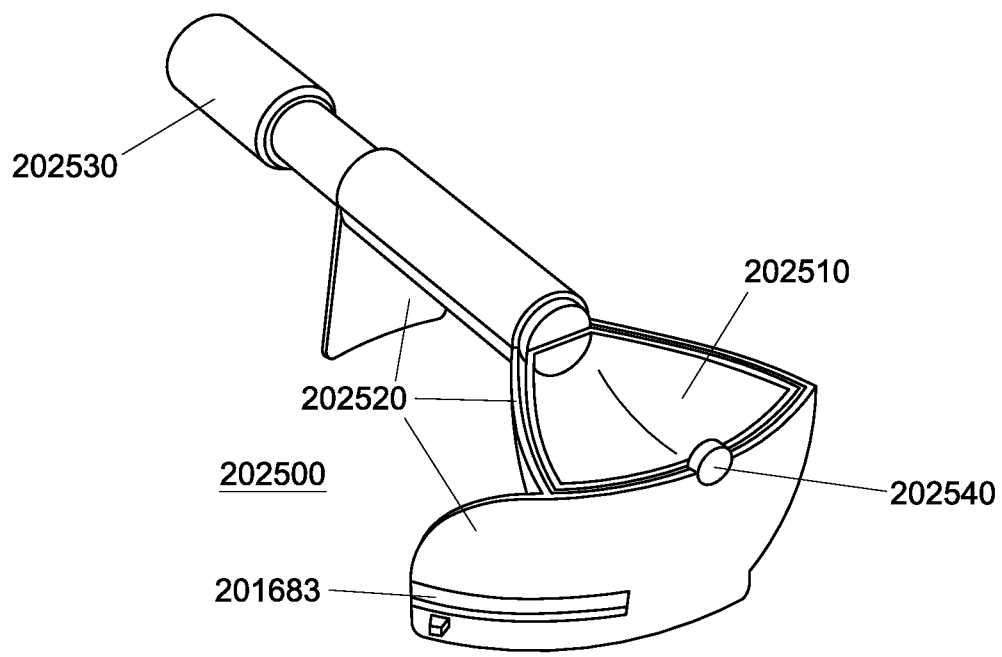
FIG. 29B shows a perspective view of the ground coffee packaging cartridge shown in FIG. 29A disconnected from the coffee brewing apparatus.

A second embodiment of a manually operated ground coffee packaging cartridge that can be connected to the coffee brewing apparatus (or in addition another external apparatus) will be described now with reference to FIGS. 29A-29D. As shown in FIGS. 29A and 29B the ground coffee packaging cartridge 202500 comprises a scooper 202510 for holding and supplying the ground coffee 201140. The ground coffee packaging cartridge 202500 comprises furthermore a body 202520 having bayonet elements (only one bayonet element 201683 is shown) for connecting the ground coffee packaging cartridge 202500 to the coffee brewing apparatus 4 by placing the bayonet elements in the openings 58 in the side wall 54 of the recess 50 and rotating the ground coffee packaging cartridge 202500 to its final position. In this final position, the scooper 202510 is aligned with the entrance opening 9 of the coffee brewing apparatus 4. The ground coffee packaging cartridge 202500 comprises a handle 202530 for manually turning the scooper. The scooper 202510 is connected to the body by means of a pivot 202540, enabling the scooper 202510 to rotate around a horizontal axis by actuating the handle 202530. Please note that throughout this description ground coffee packaging cartridge is intended to also encompass 'holder' so that the scooper which can hold an amount of ground coffee is also identified as package.

Figure 29C:
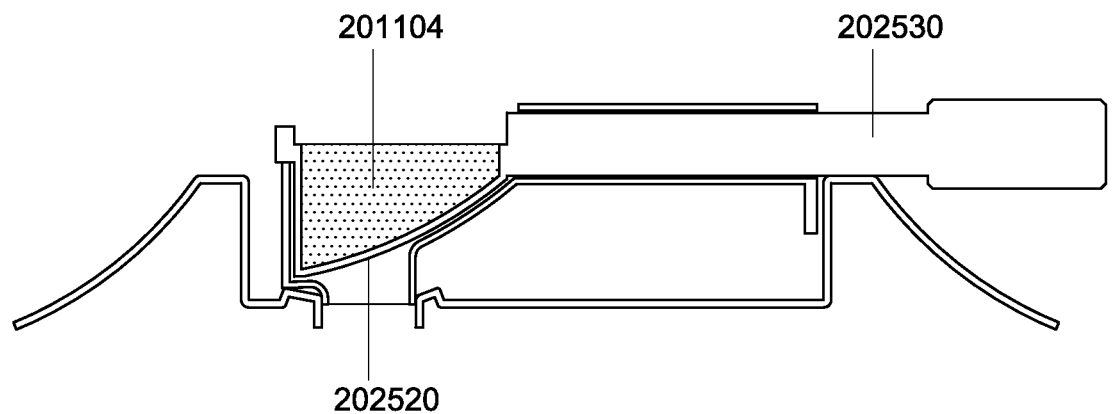
FIG. 29C shows in cross section the ground coffee packaging cartridge shown in FIG. 29A holding an amount of ground coffee.
Figure 29D:
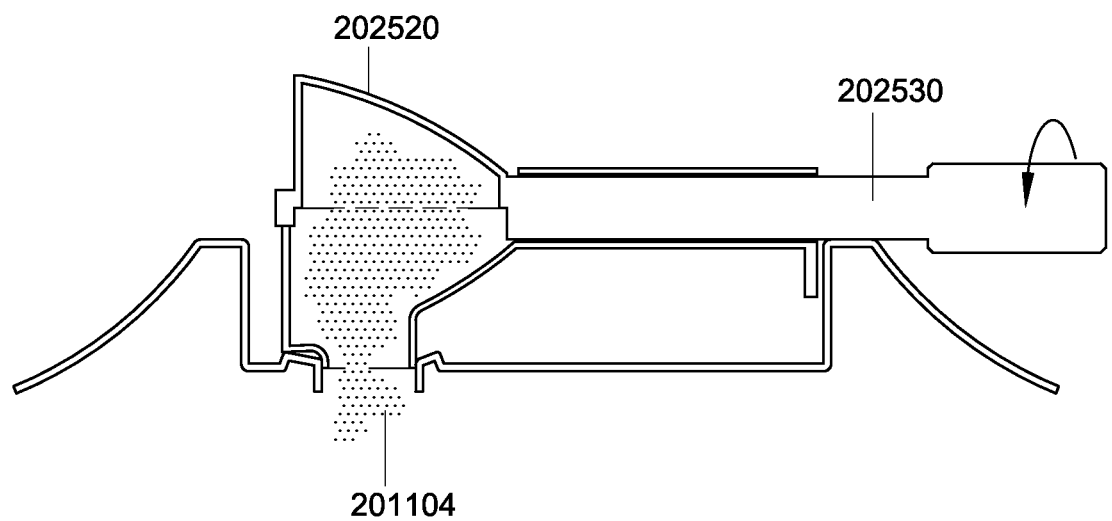
FIG. 29D shows in cross section the ground coffee packaging cartridge shown in FIG. 29A supplying ground coffee to the coffee brewing apparatus.

FIG. 29C shows the scooper 202510 in its upright position holding a dose of ground coffee 201104. The user may supply the ground coffee to the coffee brewing apparatus 4 by simply turning the handle 202530 half, thereby emptying the scooper 202510 as shown in FIG. 29D. So, the scooper works as transportation means for transporting the ground coffee towards the ground coffee entrance 9 of the brewing apparatus 4.

Figure 30A:
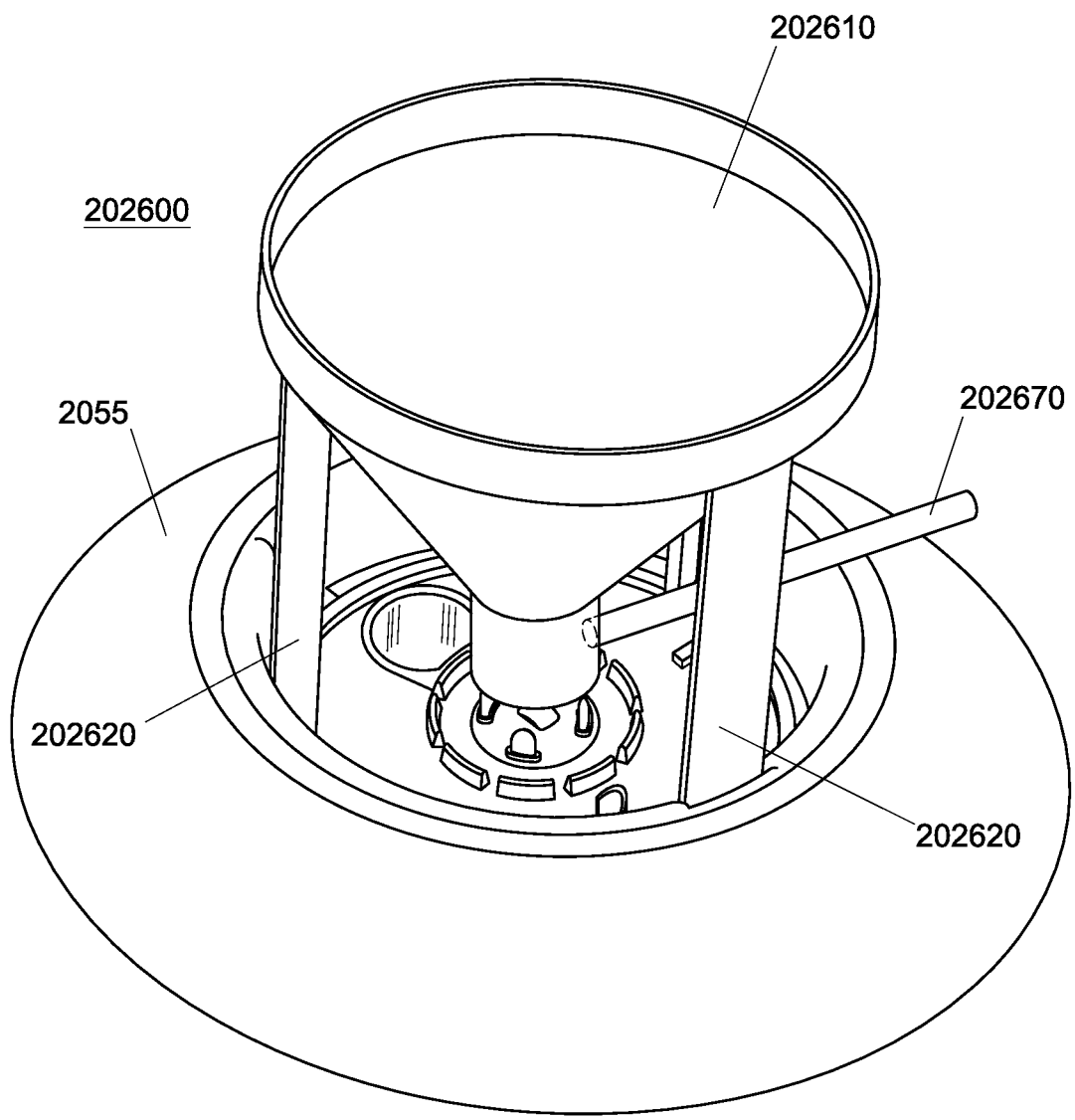
FIG. 30A shows a perspective view of a ground coffee packaging cartridge according to a third manually operated package embodiment of the invention mounted to the coffee brewing apparatus.
Figure 30B:
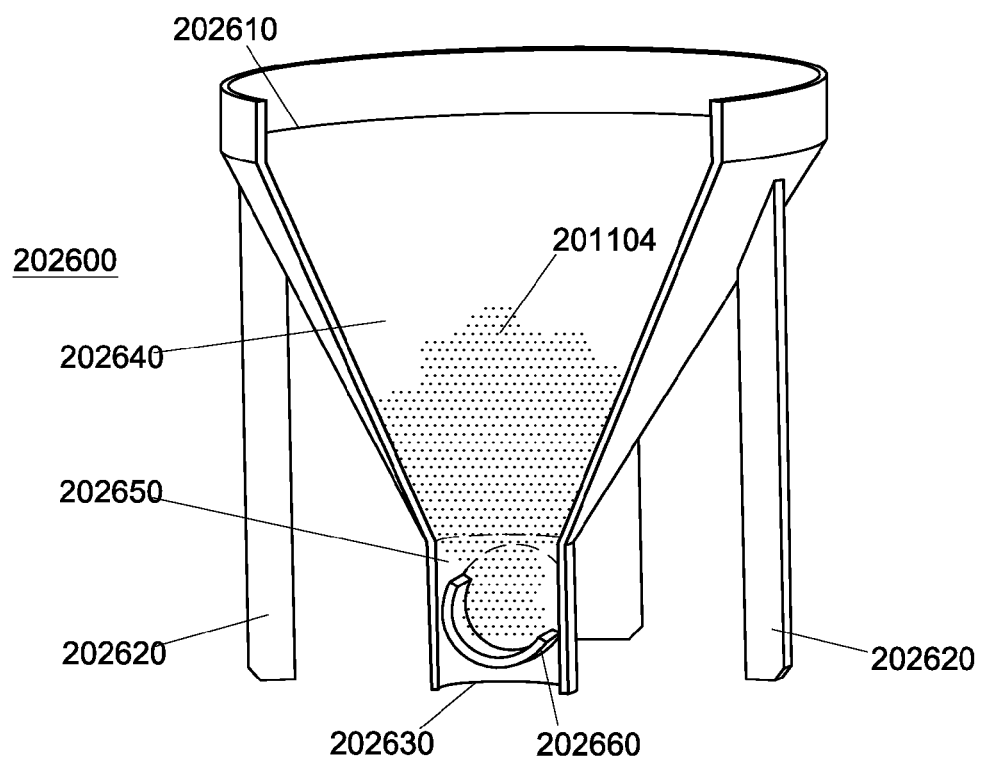
FIG. 30B shows the ground coffee packaging cartridge shown in FIG. 30A holding an amount of ground coffee.
Figure 30C:
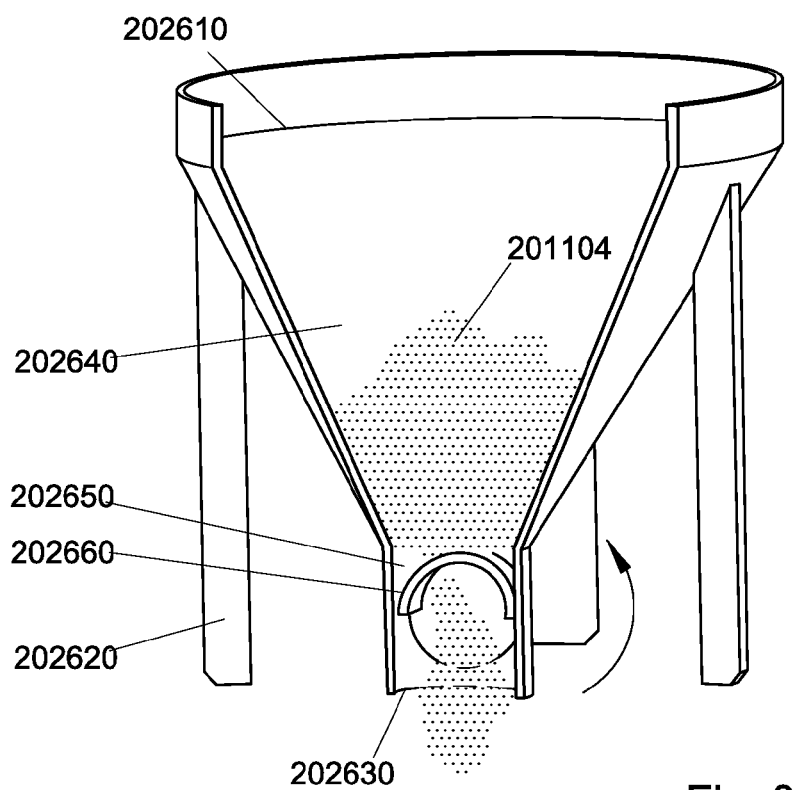
FIG. 30C shows the ground coffee bean package shown in FIG. 30A supplying ground coffee to the coffee brewing apparatus.

A third embodiment of a manually operated ground coffee packaging cartridge that can be connected to the coffee brewing apparatus will be described now with reference to FIGS. 30A-30C. As shown in FIG. 30A, the ground coffee packaging cartridge 202600 comprises a hopper 202610 for holding ground coffee 201104 inserted by a user. The ground coffee packaging cartridge 202600 comprises a plurality of legs 202620. Some or all of the legs are provided with a bayonet element (not shown) for connecting the ground coffee packaging cartridge 202600 to the coffee brewing apparatus 4 by placing the bayonet elements in the openings 58 and subsequently rotating the ground coffee packaging cartridge, as described herein above. When the ground coffee packaging cartridge 202600 is in its final position an outlet 202630 of the hopper 202600, as shown in FIGS. 30B and 30C is aligned with the ground coffee entrance 9 of the coffee brewing apparatus 4. The transportation means comprise a closure plate 202660, which is manually rotatable around a horizontal axis by means of manually operable actuation means, such as a handle 202670. The closure plate forms a part, of a virtual cylinder, preferably approximately half of it. The other part of the virtual cylinder is open. In a first position as shown in FIG. 30B, the closure plate closes or substantially closes the outlet 202630, thereby hindering the passage of ground coffee 201104 from the hopper 202610 to the coffee brewing apparatus 4. In a second position as shown in FIG. 30C, the closure plate 202660 delimits or substantially delimits a first broader part 202640 of the interior volume of the hopper 202610 from a second narrower part 202650 of the interior volume of the hopper 202610. Thereby the passage of the ground coffee 201104 from the first part 202640 to the second part 202650 is hindered.

By rotating the closure plate between the first and the second positions the user can supply doses of ground coffee to the coffee brewing apparatus 4. Indeed, when the closure plate 202660 is in its first position as shown in FIG. 30B due to the gravity the ground coffee 201104 will enter the second part 202650 of the hopper. When the closure plate 202660 is rotated to its second position as shown in FIG. 30C, the ground coffee in the second part 202650 of the hopper due to the gravity will fall into the coffee brewing apparatus 4. So, one dose of ground coffee 201104 corresponds to the ground coffee that is held in the second part 202650 of the interior volume of the hopper 202610.

Figure 31A:
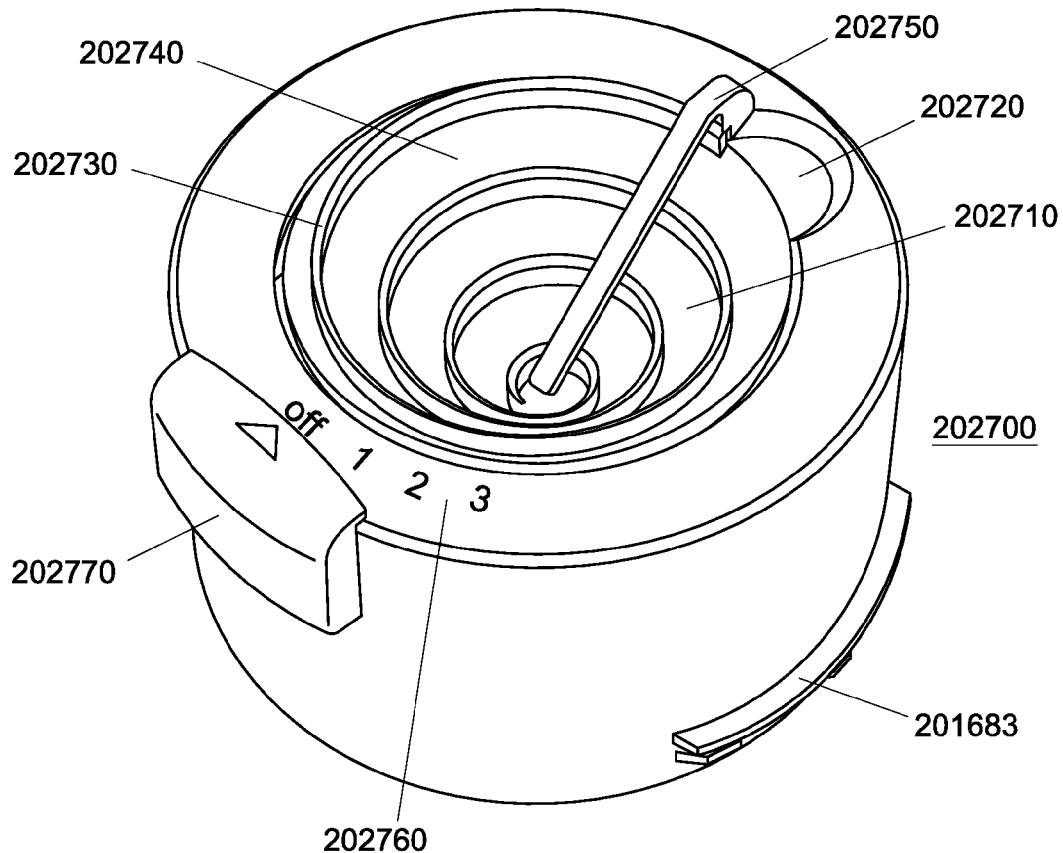
FIGS. 31A and 31B show two different perspective views of a ground coffee packaging cartridge according to a fourth embodiment of the invention in which the package is independently operable from the coffee brewing apparatus.
Figure 31B:
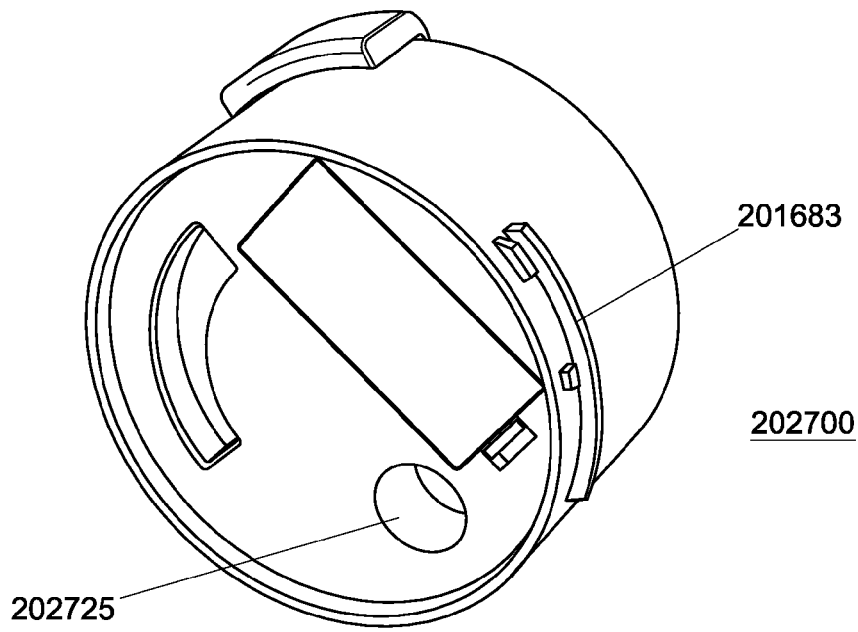
Figure 31C:
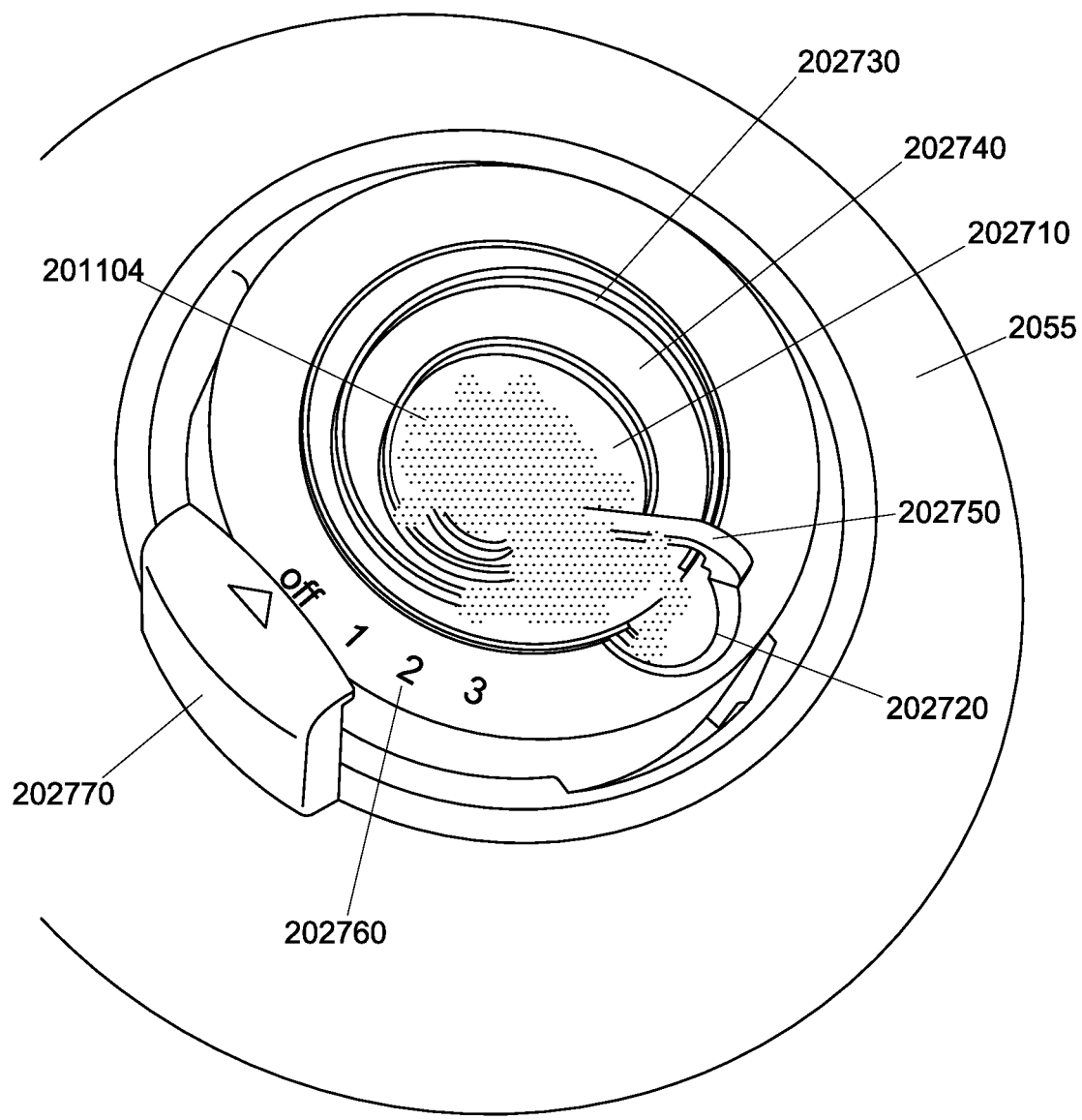
FIG. 31C shows how, in use, the ground coffee is supplied by the ground coffee packaging cartridge shown in FIGS. 31A and 31B to the coffee brewing apparatus.

A fourth embodiment of a ground coffee packaging cartridge that can be connected to the coffee brewing apparatus and can be operated independently from the brewing apparatus will be described now with reference to FIGS. 31A-31C. As shown in FIG. 31A, the ground coffee packaging cartridge 202700 comprises a funnel shaped holder 202710 for holding the ground coffee. The ground coffee packaging cartridge comprises an upper outlet 202720 at the upper end of the funnel shaped holder 202710, which upper outlet is connected by a tube (not shown) to a lower outlet 202725 (see FIG. 31B) for releasing the ground coffee 201104 from the holder. The ground coffee packaging cartridge 202700 can be connected to the coffee brewing apparatus 4 by placing the bayonet elements (only one of them 201683 is shown in FIG. 31B) in the openings 58 and subsequently rotating the ground coffee packaging cartridge, as described herein above. When the ground coffee packaging cartridge 202700 is in its final position, the outlets 202720 and 202725 are aligned with the ground coffee entrance opening 9 of the coffee brewing apparatus 4. The transportation means consist of a spiral-shaped trajectory 202740 on the inner wall of the funnel shaped holder. The spiral shaped trajectory 202740 is obtained by a spiral-shaped edge 202730 protruding from the inner wall. The funnel shaped holder 202710 is, in use, rotated, as shown in FIG. 31C. A non-moving block element 202750 impedes the ground coffee to continue rotating on the inner wall. As a result, because the spiral shaped trajectory continues to be rotated, the ground coffee is driven to follow the spiral shaped trajectory 202740 upwards towards the outlet 202720.

Preferably, the actuation means for rotating the holder 202710 are formed by a battery operated motor, although in principle also manually operable actuation means may be used. The rotation of the holder may be initiated by moving the drive clutch 202770 to a position 202760, corresponding to the desired rotation speed. By selecting the rotation speed, the user can select the amount of ground coffee supplied to the coffee brewing apparatus and thereby adjust the coffee strength.

Alternatively, the operation of the motor may be initiated and ended, automatically by detecting the start and stop of the grinder in the coffee brewing apparatus 4. The detection may be implemented by means, known per se detecting the sound of the grinder or the vibration thereof. In this way, the coffee brewing apparatus is supplied with ground coffee as long as the grinder thereof is working.

According to a fifth embodiment of the invention in which the ground coffee packaging cartridge is activated independently of the brewing apparatus, the ground coffee packaging cartridge comprises a first module, which is a ground coffee packaging and a second module, which comprises a motor. The first module is removably connectable to the coffee brewing apparatus and the second module is removably connectable to the first module, when the first module is connected to the coffee brewing apparatus. This embodiment will now be described with reference to the ground coffee packaging cartridge as shown in FIGS. 32A-32F.

Figure 32A:
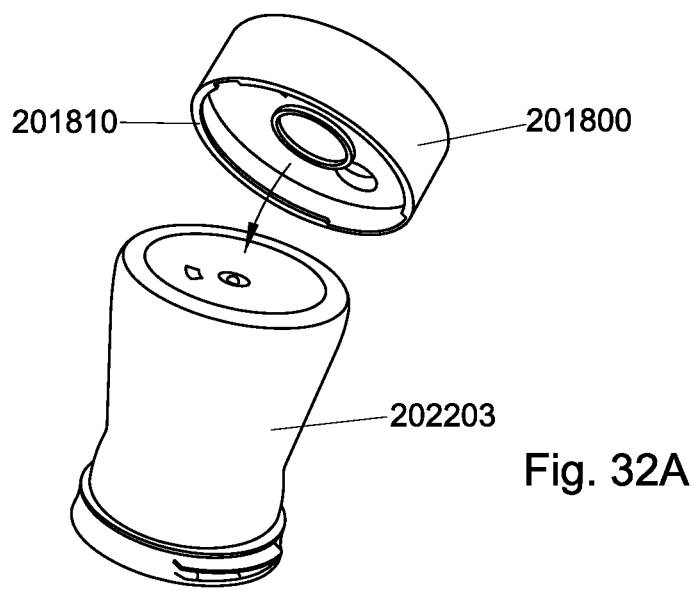
FIG. 32A shows in perspective view how a first module and a second module of a ground coffee packaging cartridge according to a fifth independently operable package embodiment of the invention should be connected to each other in a ground coffee supply mode.
Figure 32B:
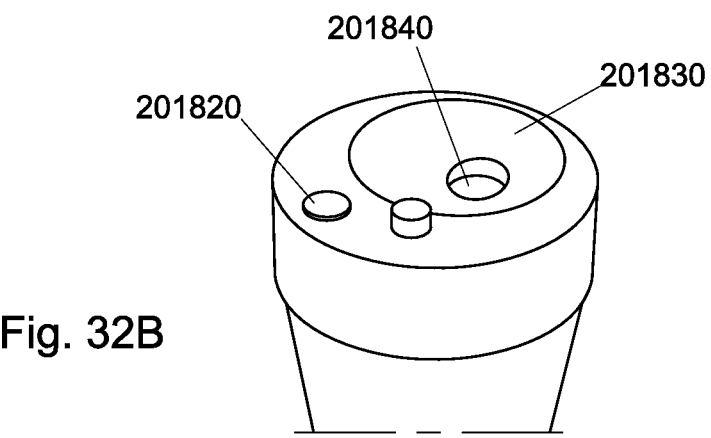
FIG. 32B shows a perspective view of the ground coffee packaging cartridge shown in FIG. 32A with the first and the second module thereof connected to each other in the ground coffee supply mode.
Figure 32C:
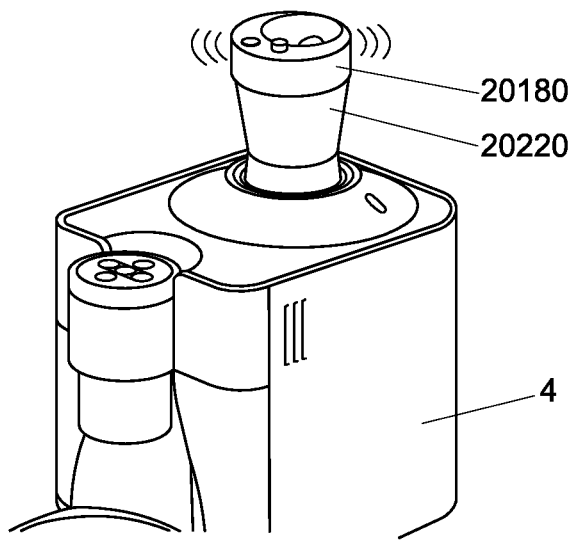
FIG. 32C shows a perspective view of the ground coffee packaging cartridge shown in FIG. 32A mounted to the coffee brewing apparatus.

As shown in FIG. 32A, a ground coffee packaging cartridge comprises a first module 202203 being a ground coffee packaging or container. A second module 201800 is removably connectable to the upper side of the first module 202203 by attaching an element 201810 thereto. When the second module 201800 is connected to the upper side of the first module 202203, the ground coffee packaging cartridge is in a ground coffee supply mode. The second module comprises a battery driven unit with a vibration motor, similar to the ones used in mobile telephones. When the second module 201800 is placed on the first module 202203 as shown in FIG. 32B, the motor may be switched on by means of button 201820. The shaking or vibration of the second module encourages the ground coffee present in the first module 202203 to flow towards the outlet thereof, resulting in the supply of the ground coffee to the coffee brewing apparatus 4, as shown in FIG. 32C.

Figure 32D:
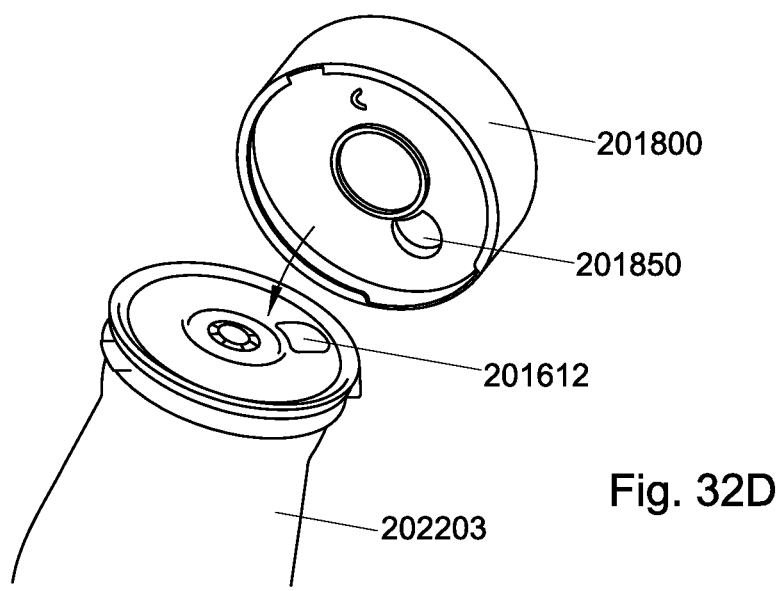
FIG. 32D shows in perspective view how the first module and the second module of the ground coffee packaging cartridge shown in FIG. 32A should be connected to each other in a ground coffee refill mode.
Figure 32E:
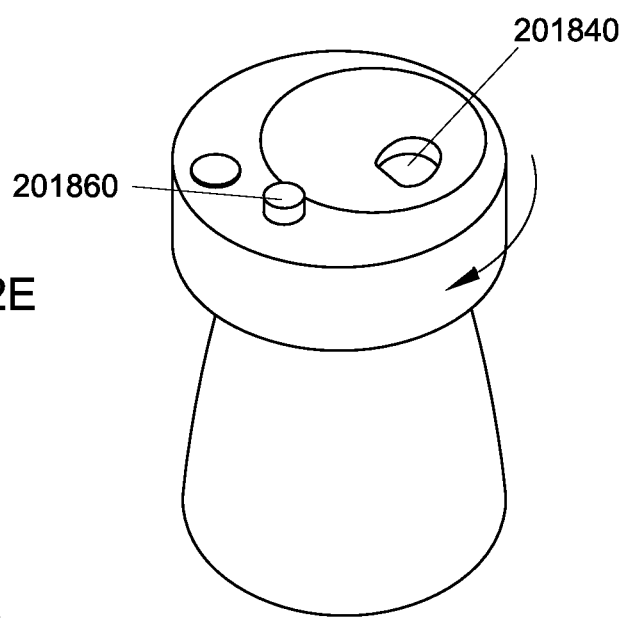
FIG. 32E shows a perspective view of the ground coffee packaging cartridge shown in FIG. 32A with the first and the second module thereof connected to each other in the ground coffee refill mode.
Figure 32F:
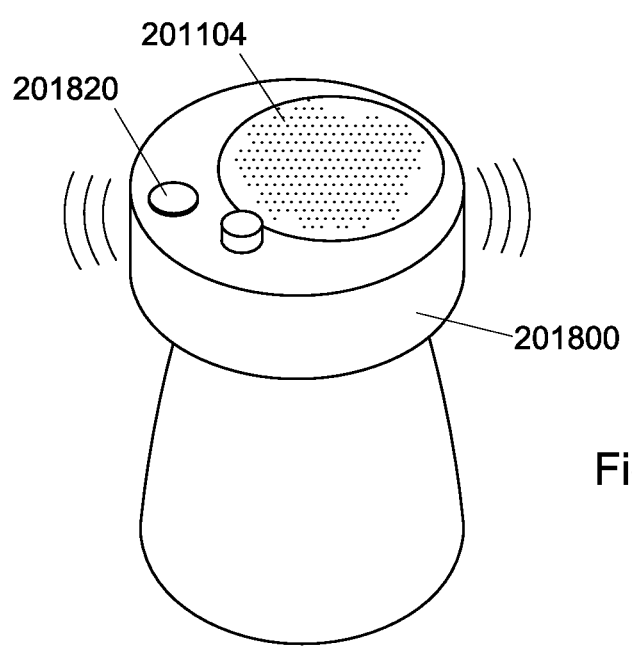
FIG. 32F shows how the ground coffee packaging cartridge is refilled with ground coffee.

In order to bring the ground coffee packaging cartridge in a ground coffee refill mode, the first module 202203 should be detached from the coffee brewing apparatus 4 and the second module should be connected to the bottom side of the first module, as shown in FIG. 32D. As described herein above, the outlet 201612 of the first module 202203 is open, when it is connected to the coffee brewing apparatus 4 and closed when it is disconnected. By connecting the second module in the ground coffee refill mode to the first module in the same or a similar way as the coffee brewing apparatus, the outlet of the first module 202203 may be opened and used as inlet for refilling the ground coffee packaging cartridge with ground coffee. Thereto, the second module 201800 comprises a funnel shaped part 201830, for supplying the ground coffee by the user and a ground coffee inlet 201840. It furthermore comprises a ground coffee outlet 201850, which when the second module is connected to the first module 202203 in the ground coffee refill mode, is aligned with the outlet 201612 of the first module, which here has the function of ground coffee inlet. In order to connect the second module 201800 to the first module 202203, the user has to press button 201860 to engage a latch opener, as shown in FIG. 32E. By turning the motor on, the ground coffee 201104 in the funnel shaped part 201830 are assisted into the first module 202203, as shown in FIG. 32F.

Figure 33:
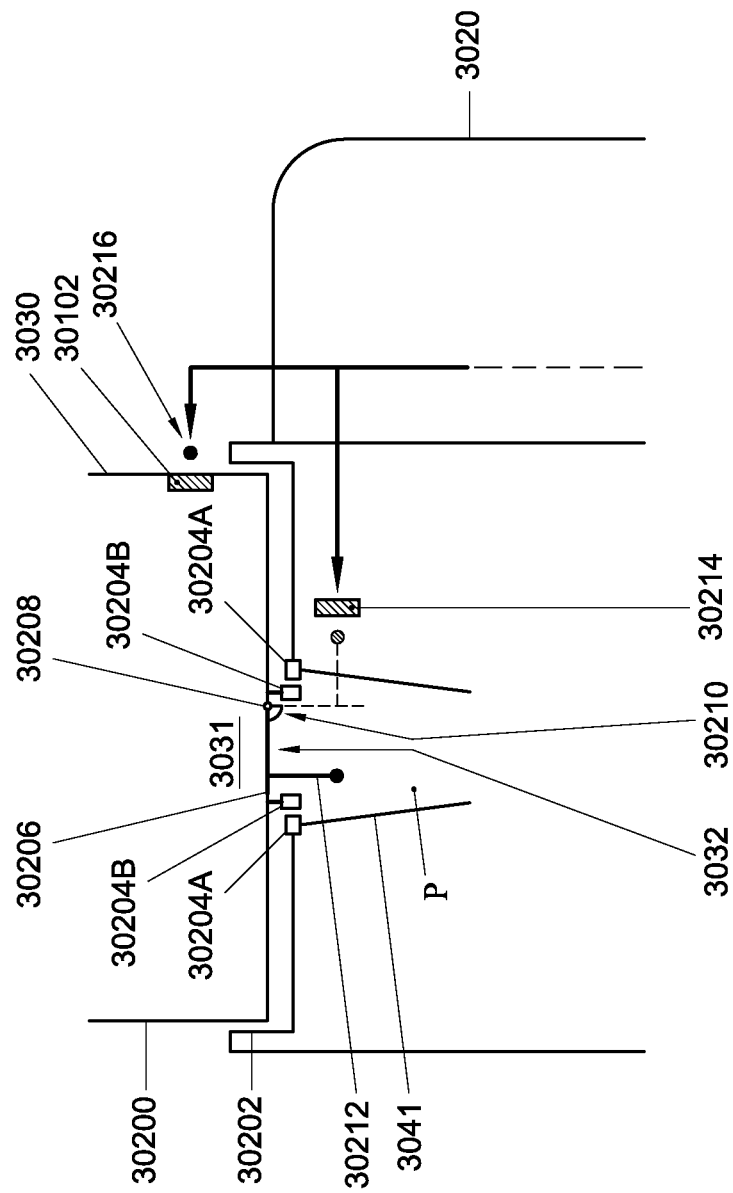
FIG. 33 shows a schematic diagram of a further embodiment of a ground coffee packaging cartridge connected to a coffee brewing apparatus.

With reference to FIG. 33 a further embodiment of a ground coffee packaging cartridge 3030 is shown which comprises a closing means 3032 for closing off the ground coffee outlet 3031 when the outlet 3031 is uncoupled from the ground coffee inlet 3041 of the brewing apparatus. The closing means 3032 may include a substantially air-tight closure and/or allow the package 3030 to be vacuumized and/or to remain under vacuum, even after the package 3030 is detached from the coffee brewing apparatus 3020. The closing means 3032 also closes off the package 3030 when it is connected to the coffee brewing apparatus 3020, for instance while the ground coffee inlet 3041 and the ground coffee outlet 3031 are coupled, so that also during connection and coupling, respectively, contact between the ground coffee and the ambient air is avoided. The closing means 3032 is of robust design such that if a grain of coffee should be present in or at the inlet 3041 as it is being closed, the closing means will crush or cause its expulsion during the closing operation. The closing means 3032 can then open for delivering ground coffee from the package to the brewing device. After delivering the ground coffee, the closing means 3032 can close the package 3030 again. The opening of the closing means 3032 can be carried out with an opening means 3036, which for instance may be operated by hand and provided with a handle on the package.

In the embodiment of FIG. 33, the ground coffee packaging cartridge 3030 is manufactured from tin and has a cylindrical upstanding sidewall 30200. This upstanding sidewall 30200 slides along an upstanding inner wall 30202 of the coffee brewing apparatus 3020 when the package 3030 is to be connected to the coffee brewing apparatus 3020. The ground coffee inlet 3041 is provided with a first part 30204A of a bayonet closure, and the ground coffee outlet 3031 is provided with a second part 30204B of the bayonet closure. Thus the connecting device in this example comprises the bayonet closure 30204A, 30204B and the walls 30200, 30202. A user can connect the parts 30204A and 30204B of the bayonet closure with each other by rotating the package e.g. ⅛ turn around its axial axis relative to the coffee brewing apparatus 3020. Thus, the ground coffee outlet 3031 and the ground coffee inlet 3041 are directly connected with each other. The closing means 3032 of the ground coffee packaging cartridge includes a flap 30206 which is connected with the rest of the package via a hinge 30208. The hinge 30208 is provided with a spring 30210 which biases the flap 30206 to a closed position. The closing mechanism 3034 hence comprises the spring 30210. The flap 30206 further comprises a projecting pin 30212 of soft iron. The coffee brewing apparatus 3020 further comprises an electromagnet 30214 which is operated by a control device of the apparatus. The control device is connected with a sensor 30216 (arranged in or near the side wall 54 of the recess 50: FIG. 1) which detects when a package 3030 is connected to the coffee brewing apparatus 3020. When a user operates an operating element of the control device of the coffee brewing apparatus and when the sensor detects the presence of a package, the control device activates the electromagnet 30214 so that the pin 30212 is attracted by the electromagnet, whereby the flap 30206, overcoming the bias of the spring 30210, swings open in the direction of the arrow 30218. The open position of the flap 30206 (closing means 3032) is shown in dotted outline in FIG. 33. Thereupon, the control device activates a dosing device, to be described in more detail hereinafter, for delivering predetermined doses of ground coffee from the package 3030 to the coffee brewing apparatus 3020. The control device, the sensor 30216 and the electromagnet 30214 form part of opening means for opening the package. When a user uncouples/disconnects the package 3030 from the coffee brewing apparatus 3020, the flap 30206 assumes its closed condition under the influence of the spring 30210. This also happens if the electromagnet 30214 were still energized, because the magnetic field remote from the coffee brewing apparatus is then too weak to keep the flap 30206 in its open position. It is also possible that the control device 3038, upon detecting with the sensor 30216 that the package is being uncoupled from the machine, deactivates the electromagnet 30214. In that case, the electromagnet 30214 and the control device together with the spring 30210 function as part of the closing mechanism 3034. It is further possible that the control device deactivates the electromagnet 30214 after each preparation of a quantity of coffee beverage, even while the package remains connected to the coffee brewing apparatus 3020. In that case, too, the control device 3038 and the spring 30210 form part of the closing mechanism. The opening means hence can open the package as soon as a connected package is detected with the sensor or as soon as, with the sensor, a connected package is detected and a user activates the operating element for preparing a coffee beverage.

In one embodiment, the control device is activated through detection of the package 3030 by the sensor 30216. The sensor 30216 may comprise an electric, magnetic and/or an optical sensor 30216. Additionally or alternatively, the sensor 30216 may comprise a mechanical detection system, for instance, including a switch which can be tripped by a corresponding part of the package 3030. The mechanical parts of the package 3030 and the sensor 30216 have corresponding shapes so that the package 3030 serves as a "key" to enable the apparatus 3020 to operate. In a further embodiment, the package 3030 includes an RFID tag, and the apparatus includes an RFID reader. The control device is arranged to recognize predetermined codes corresponding to the package 3030, so that the control device activates the apparatus 3020 only when the code on the RFID tag of the package 3030 corresponds to a predetermined code.

In use, when the ground coffee packaging cartridge 3030 is connected directly to the coffee brewing apparatus 3020, the package 3030 is opened, whereby after or upon connection of the package 3030 onto the coffee brewing apparatus 3020 the ground coffee is supplied from the package 3030 to the brewing device. Preferably, the coffee grinds from the package 3030 are delivered as a dose sufficient for one cup of coffee, for example, less than 20 grams. After the ground coffee has been used up, the package 3030 can be removed. Upon removing the package 3030 from the coffee brewing apparatus 3020, the package 3030 may be thrown away, and during this operation, preferably automatically, be closed off with the closing means, as already explained.

The coffee brewing apparatus 3020 in this example is so arranged that after the preparation of the coffee beverage, substantially no unused ground coffee remains behind in the coffee transport path P.

In an embodiment the coffee beverage system comprises a dosing device 3050 which is, for instance, included in the coffee brewing apparatus 3020. Also, the dosing device 3050 may be included partly in the package 3030 and partly in the coffee brewing apparatus 3020. The dosing device 3050 is arranged such that a dose of coffee grounds can be supplied to the brewing device for making one cup of coffee beverage. The volume of one cup of coffee beverage can vary from about 20 milliliters, for instance for a small amount of strong espresso, to 400 milliliters or more, for instance for a large cup of coffee beverage. The weight of a dose of ground coffee may be approximately equal to 50 grams or less, in particular 20 grams of less, more particularly 15 grams or less. Preferably, the dose approximately corresponds to a weight of between 4 and 10 grams, in particular about 7 grams. The dosing device 3050 is operated through the operating element of the control device, for setting the dose of ground coffee, thereby allowing the dose to be determined by the user during operation. Also, the amount of water to be supplied may be determined through the or an additional operating element.

Figure 34:
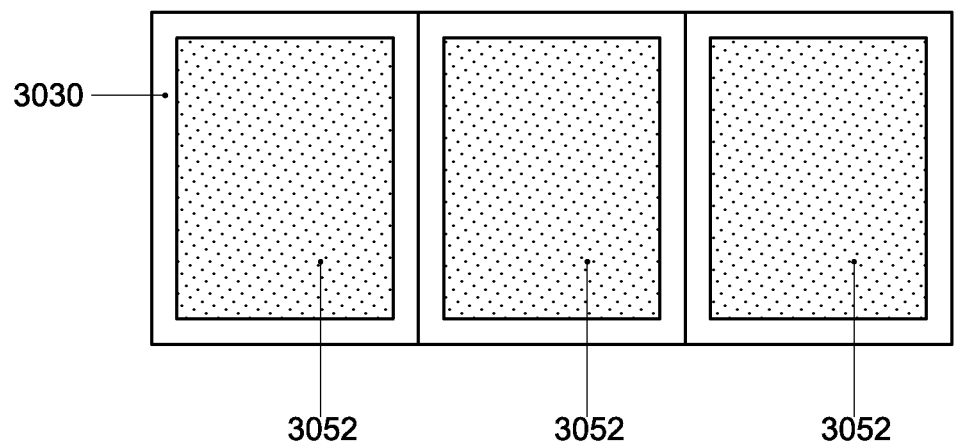
FIG. 34 shows schematically a section of an embodiment of a ground coffee packaging cartridge with multiple compartments.
Figure 35:
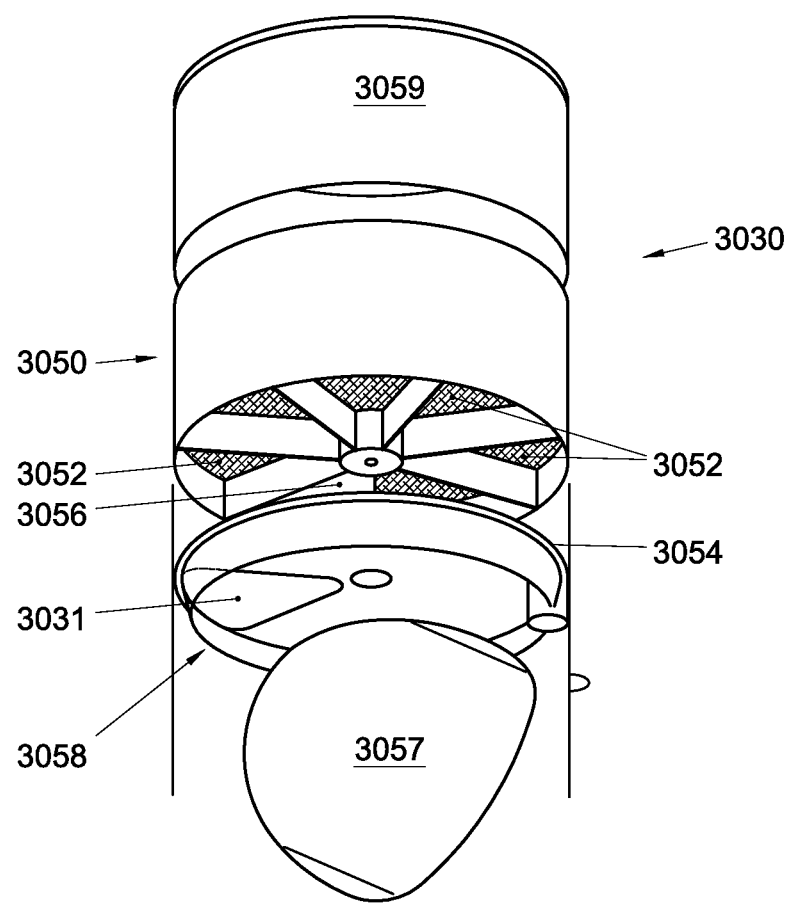
FIG. 35 shows an exploded perspective representation of an embodiment of a ground coffee packaging cartridge with multiple compartments and a dosing device.

In FIG. 34, there is schematically shown a section of a ground coffee packaging cartridge 3030 with multiple compartments. In FIG. 35, the ground coffee packaging cartridge 3030 with multiple compartments is shown with the package 3030 being provided with a dosing device 3050. To this end, the package 3030, in particular the dosing device 3050 is arranged with multiple compartments 3052 which are each filled with one dose of ground coffee. The package 3030, in particular the dosing device 3050, comprises a displaceable dosing element 3054, being a rotary part in the embodiment shown, which displaceable dosing element 3054 has a ground coffee outlet 3031. In line with the example of FIG. 33, the coffee brewing apparatus 3020 corresponding with the package 3030 may be provided with an electric motor which is controlled by the control device for displacing the dosing element 3054. The package 3030 according to FIG. 35 is further provided, under the displaceable dosing element 3054, with a flap 30206 and a part 30204B of a bayonet connection as discussed with reference to FIG. 33. A difference with the variant according to FIG. 3 is that the ground coffee outlet 3031 of FIGS. 34 and 35 has approximately the same diameter as the compartment 3052, whereas in FIG. 33 the diameter of the ground coffee outlet 3031 is much smaller than the diameter of the package. In this description, a displaceable dosing element 3054 may be understood to cover an element which, through displacement, doses an amount of ground coffee for supply to the brewing device. By placing the ground coffee outlet 3031 under one of the compartments 3052, the ground coffee from the respective compartment 3052 is able to move through the ground coffee outlet 3031 towards the brewing device, for instance, by gravity. At least one parking position 3056 is provided approximately at the location of which the ground coffee outlet 3031 can park, so that no ground coffee flows out undesirably through the outlet 3031. Furthermore, the package 3030 comprises a closing strip 3057 or the like which closes off an exit side 3058 of the ground coffee packaging cartridge 3030 before use, and which is intended to be removed by the user prior to placement of the package 3030 in the coffee brewing apparatus 3020. In this way, the exit side 3058 of the ground coffee packaging cartridge 3030 is hygienically covered before use. In addition, a shell 3059 is provided, which encloses the compartments 3052, for example, for providing information and/or advertising on the outside of the package 3030.

Figure 36:
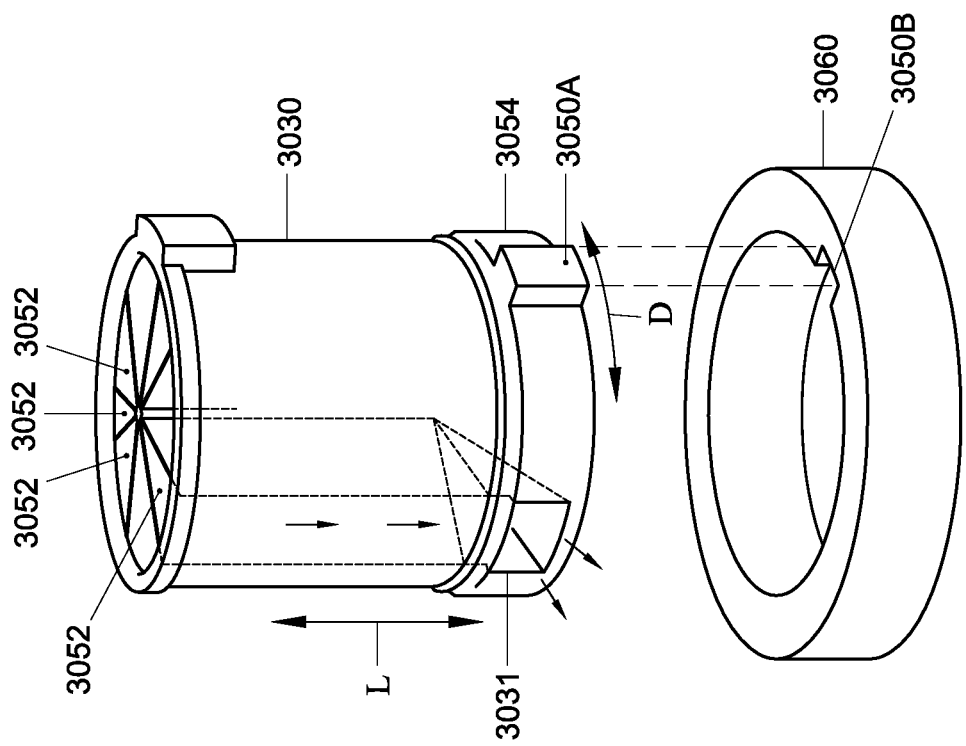
FIG. 36 shows an embodiment of a ground coffee packaging cartridge with multiple compartments, a dosing device, and a corresponding activation element.

In one embodiment, as discussed above with reference to FIGS. 33 to 35, the coffee brewing apparatus 3020 is arranged to operate the dosing device 3050 and/or the closing means. However, other variants are also conceivable. To this end, the coffee brewing apparatus 3020 may be provided with an activation element 3060, as shown in FIG. 36. The activation element 3060 comprises the closing mechanism and the opening means. The dosing and closing functions can be integrated advantageously, as will be illustrated below. The activation element 3060 is provided near the connecting device of the brewing apparatus, so that the latter in the connected condition can engage the package 3030. The activation element 3060 comprises a cam and/or notch for engaging a corresponding part of the package 3030, in particular for moving the dosing element 3050. The activation element 3060 has a shape that corresponds to the part of the dosing device 3050 that is to be engaged. The dosing device 3050 may comprise a male part 3050A and a corresponding female part 3050B, with one of the parts 3050A, 3050B being provided in the coffee brewing apparatus 3020 and the corresponding part in the package 3030. The part provided in the coffee brewing apparatus 3020 is preferably the activation element 3060, whereby it can engage the package 3030, in particular the displaceable dosing element 3054, for displacing the outlet 3031 to the respective compartment 3052. The activation element 3060 can be controlled electrically and/or mechanically and/or directly by the user.

The activation element 3060 may be arranged for operating the displaceable dosing element 3054, being a rotary part in the embodiment shown, for placing the ground coffee outlet 3031 opposite one of the compartments 3052, for supplying the dose of ground coffee to the brewing device. The displaceable dosing element 3054 is rotatable in a rotational direction D for displacing the ground coffee outlet 3031 under and/or opposite the desired compartment 3052. Also, the displaceable dosing element 3054 is arranged to function as a closing means and/or be provided with a closing means. When the dosing element 3050 is rotated such that it only releases an empty compartment, the other compartments are closed off such that the exposure of the ground coffee in the ground coffee packaging cartridge 3030 to ambient air is prevented.

As shown in FIG. 36, the displaceable dosing element 3054 is displaceable in the direction L of the compartments 3052. The displaceable dosing element 3054 is moveable relative to the rest of the package 3030 so that the ground coffee outlet 3031 is released, for example, in a downwardly moved condition, or so that the ground coffee outlet 3031 is closed, for example, in an upwardly moved condition (see FIG. 36). As can be seen, the outlet 3031 is arranged on the side of the package 3030, in particular the displaceable dosing element 3054.

Figure 37:
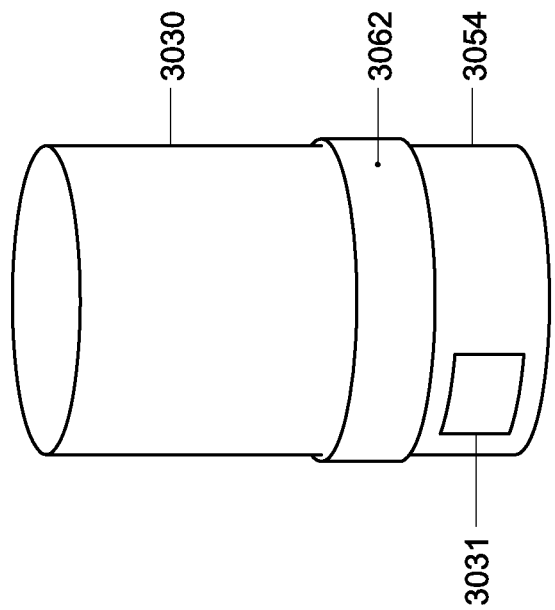
FIG. 37 shows an embodiment of a ground coffee packaging cartridge with a closure.

In FIG. 37 an alternative embodiment is shown in which by moving a ring 3062 forming part of the closing means, upwards, the ground coffee outlet 3031 is released. The package 3030 may be provided with multiple compartments 3052. Under the closing means 3032 a rotatable dosing element 3054 is provided, provided with, for example, one outlet 3031. The outlet 3031 can then release one compartment 3052 with coffee beans, if the outlet 3031 is positioned opposite that compartment 3052. The closing means 3062 is arranged for closing off and releasing the ground coffee outlet 3031 upon connection of the package 3030 to the coffee brewing apparatus 3020, in particular onto the connecting device 3040. The closing means 3062 are constructed to slide upwards if the package 3030 is placed in the connecting device of the coffee brewing apparatus 3020. The rotatable dosing element 3054 can place the ground coffee outlet 3031 opposite the respective compartment 3052, through rotation of the activation element 3060, whereby the ground coffee is free to flow out of the respective compartment 3052.

In another embodiment, the package 3030 is provided with multiple coffee outlets 3031, with each compartment 3052 being provided with an outlet 3031. The coffee brewing apparatus 3020 comprises one ground coffee inlet 3041. A displaceable dosing element 3054 is arranged in the coffee brewing apparatus 3020, where the displaceable dosing element 3054 is operable to couple the ground coffee inlet 3041 with one of the ground coffee outlets 3031 for releasing the ground coffee adjacent the respective ground coffee outlet 3031. The system is arranged such that the package 3030 is rotatable relative to the coffee brewing apparatus 3020, for instance for coupling a particular coffee outlet 3031 with the coffee inlet 3041.

In another embodiment, the package 3030 has multiple outlets 3031 corresponding to multiple compartments 3052, with all the outlets 3031 comprising associated closing means. The activation element 3060 is then arranged to open or break-through a closure for supplying a dose of ground coffee to the brewing device. The closing means 3032 may comprise a breakable, tearable and/or cuttable foil.

In another embodiment, a dose of ground coffee can be supplied from the respective compartment 3052 directly to the coffee brewing apparatus 3020, without the ground coffee packaging cartridge 3030 first needing to be connected. The package 3030 comprises a dosing device 3050 which the user himself may then operate, for example, by releasing the respective outlet 3031, and/or by displacing the dosing element 3054.

Figure 39:
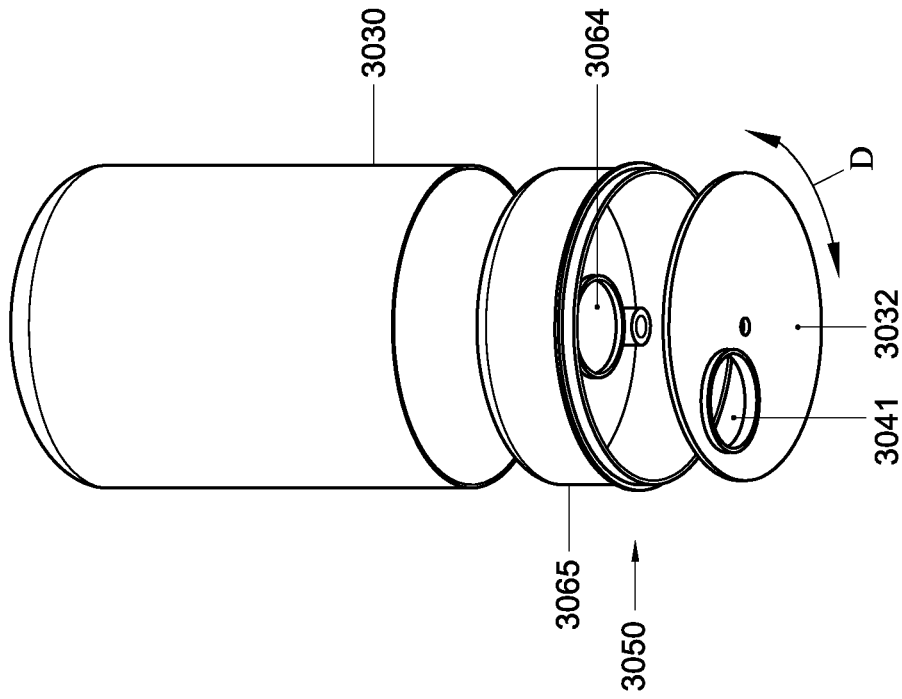
FIG. 39 shows an exploded perspective drawing of an embodiment of a ground coffee packaging cartridge and a dosing device.
Figure 38:
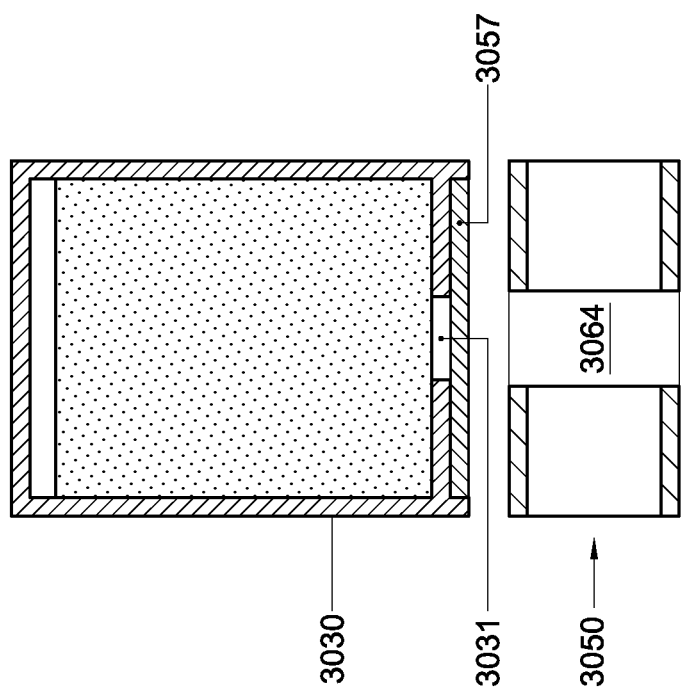
FIG. 38 schematically shows a section of an embodiment of a ground coffee packaging cartridge and a dosing device shown separately from the package.

In FIGS. 38 and 39, another embodiment is shown in which a dosing device 3050 is provided in the coffee brewing apparatus 3020. The dosing device 3050 comprises a rotary and/or sliding mechanism. The dosing device 3050 further comprises a housing 3065 with a chamber 3064, and a closing means 3032 having a closure member 3032A with a ground coffee inlet 3041 formed therein. The ground coffee inlet 3041 is moveable relative to the chamber 3064, so that the chamber 3064 is either released or is closed off by the closing means 3032, for instance by rotating the closure member 3032A and/or the housing 3065 in a rotational direction D.

The package 3030 is provided with a coffee outlet 3031 and a sealing strip 3057. By removing the sealing strip 3057 at least locally, the ground coffee outlet 3031 can be exposed/released. The connecting device is arranged such that upon placement of the package 3030, the sealing strip 3057 is locally or wholly removed in an automatic manner, or at least so that the ground coffee outlet 3031 is released. By placing the chamber 3064 under the ground coffee outlet 3031, ground coffee enters the chamber 3064. Preferably, the volume of the chamber 3064 is sufficient for temporarily storing one dose of ground coffee. After filling of the chamber 3064 with one dose of ground coffee, the chamber 3064 and the outlet 3031 are displaced relative to each other, so that the outlet 3031 is closed off by the upper surface of the housing 3065. By placing the ground coffee inlet 3041 under the chamber 3064, the dose of ground coffee in the chamber 3064 can be released and be passed to the brewing device. As the outlet 3031 and the chamber 3064 are no longer connected, no further ground coffee from the package 3030 will be passed via the chamber 3064 to the brewing device.

Figure 41:
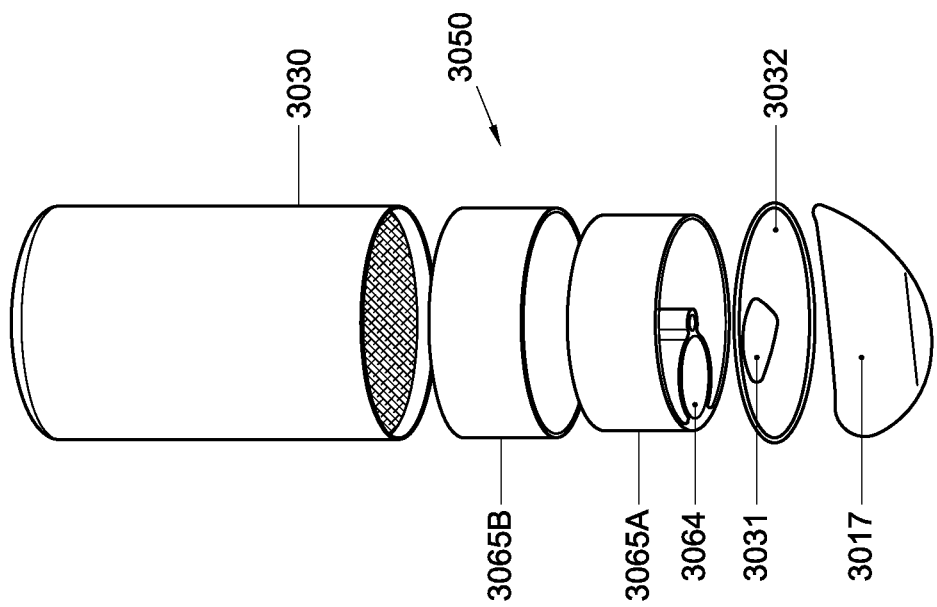
FIG. 41 shows an exploded perspective drawing of an embodiment of a ground coffee packaging cartridge with a dosing device.
Figure 40:
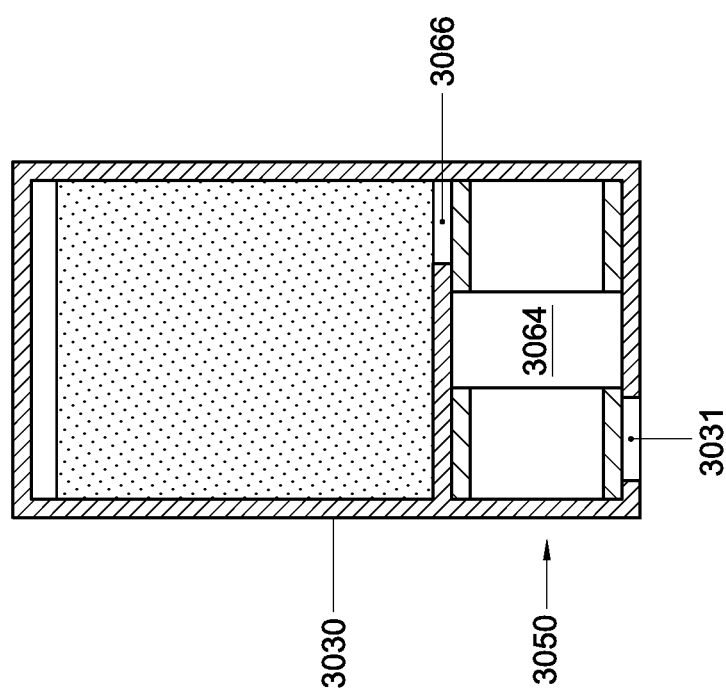
FIG. 40 shows a section of an embodiment of a ground coffee packaging cartridge with a dosing device.

In FIGS. 40 and 41, an embodiment is shown in which the dosing device 3050 is provided in and at the bottom of the package 3030. The package 3030, in particular the dosing device 3050, is provided with a chamber 3064 for temporarily storing and/or passing a dose of ground coffee. The chamber 3064 may be provided in a first housing part 3065A, while the first housing part 3065A and the chamber 3064 can rotate in and relative to a receiving housing part 3065B about a central axis of the first housing part 3065A. In the exploded drawing of FIG. 41, the first housing part 3065A and the chamber 3064 have been rotated 90° about the central axis, with respect to the position shown in FIG. 39. The housing parts 3065A, 3065B may be parts of one housing 3065. The housing 3065 is a part of the dosing device 3050. Furthermore, in the package 3030, above the housing 3065, a space filled with ground coffee is provided. The space may comprise only one compartment, and is filled with multiple dosages of ground coffee.

Furthermore, a ground coffee passage 3066 may be provided at the bottom of the space, under the space with ground coffee, and above the dosing device 3050, for supplying the ground coffee to the dosing device 3050 under the influence of gravity. The first housing part 3065A is arranged movably, in particular rotatably, relative to the passage 3066, while the receiving housing part 3065B is arranged fixedly with respect to the passage 3066. Under the chamber 3064, closing means 3032, with a ground coffee outlet 3031, is provided. The closing means 3032 is rotatable with respect to the housing 3065. By rotating the first housing part 3065A relative to the receiving housing part 3065B, the chamber 3064 can be placed under the ground coffee passage 3066, and a portion of the ground coffee, preferably approximately equal to one dose, descends into the chamber 3064. The chamber 3064 can thereupon be displaced again so that it becomes disconnected with the passage 3066, for instance, the upper side of the chamber 3064 is closed off by a bottom part 3065A of the package 3030. By thereupon placing the coffee outlet 3031 under the chamber 3064, the dose of ground coffee is supplied to the brewing device, via the ground coffee inlet 3041. The dosing of the ground coffee is operated through the activation element 3060 which is disposed in the coffee brewing apparatus 3020. The package 3030 is arranged such that by rotating the package 3030 relative to the coffee brewing apparatus 3020, a dose of ground coffee is released.

The ground coffee packaging cartridge 3030 can, for instance, be made of substantially rectangular or cylindrical shape. The connecting device has a complementary shape so that the two can be connected. In an embodiment, the inner space of the ground coffee packaging cartridge is arranged for holding multiple dosages of ground coffee, for instance, when this inner space is wholly filled with ground coffee, at least 20 grams, more particularly at least 50 grams, still more particularly at least 70 grams and still more particularly at least 200 grams of ground coffee. In another embodiment, the package 3030 comprises only one dose of ground coffee, so that the system after each connection of the package 3030 processes one dose of ground coffee, for instance, for one cup of coffee beverage. Also, a dose can, for instance, correspond to multiple cups of coffee beverage, or larger cups of coffee beverage, while the user can choose from smaller or larger packages 3030, which in use are placed in their entirety in the coffee brewing apparatus 3020. Different packages 3030 within the system can involve multiple volumes. Such packages 3030 can, for instance, after one dosage be exchanged and/or thrown away.

Figure 42H:
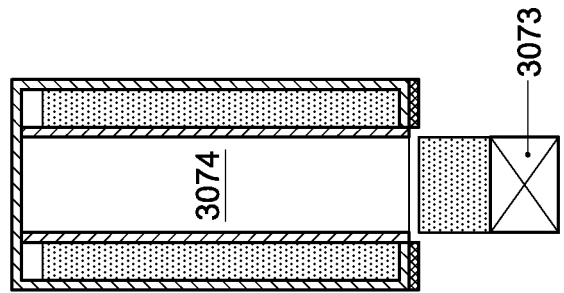
FIG. 42A-V schematically show steps in a dosing method.
Figure 42G:
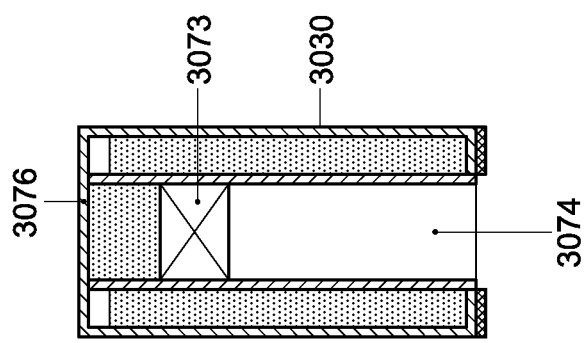
Figure 42F:
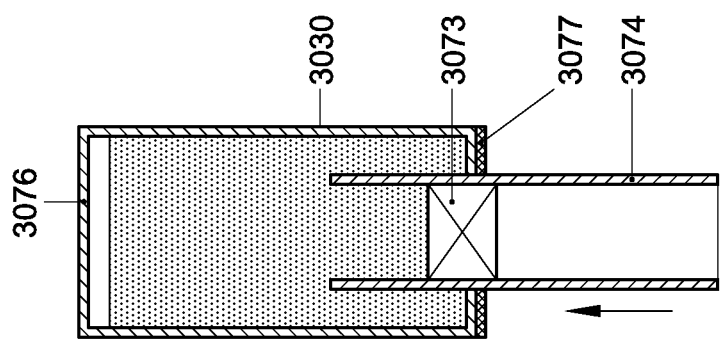
Figure 42E:
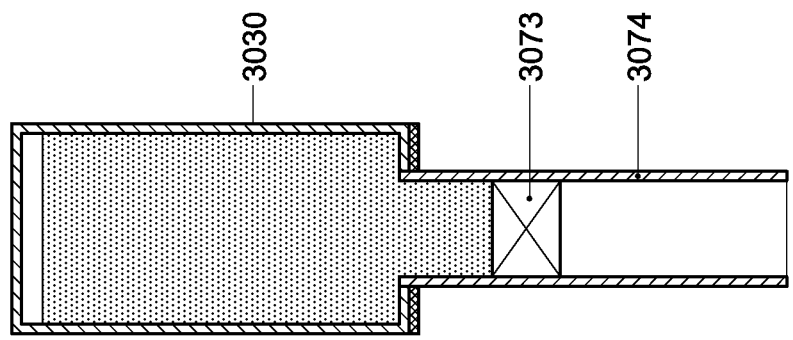
Figure 42L:
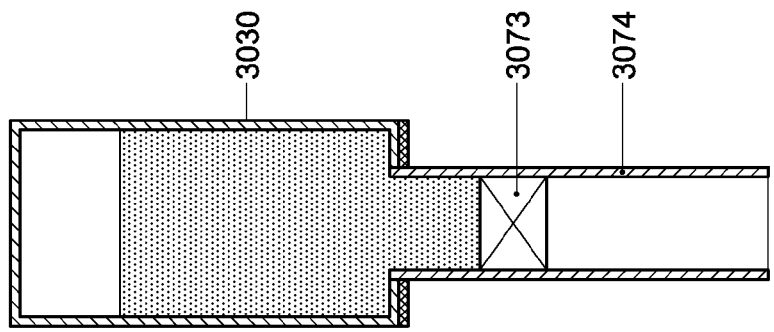
Figure 42K:
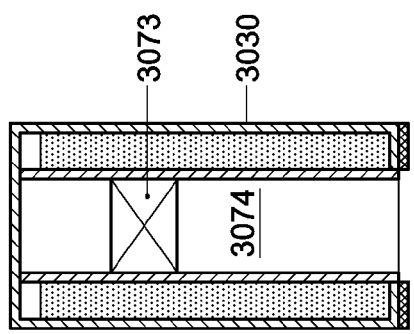
Figure 42J:
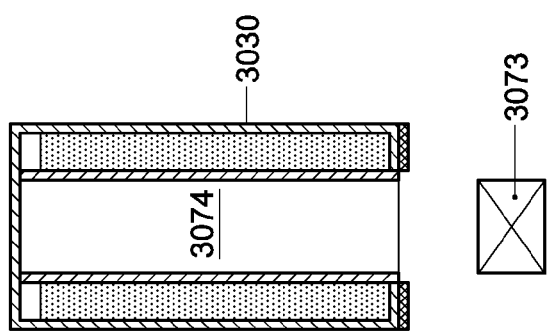
Figure 42I:
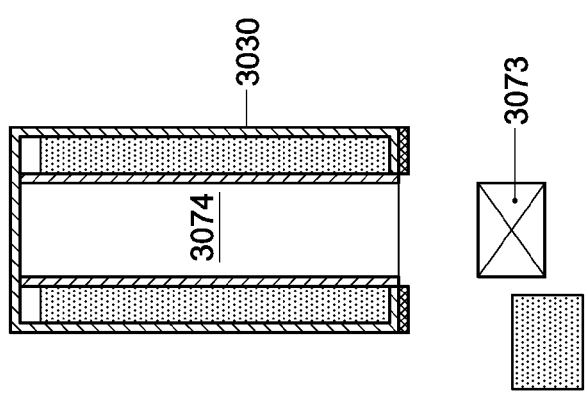
Figure 42P:
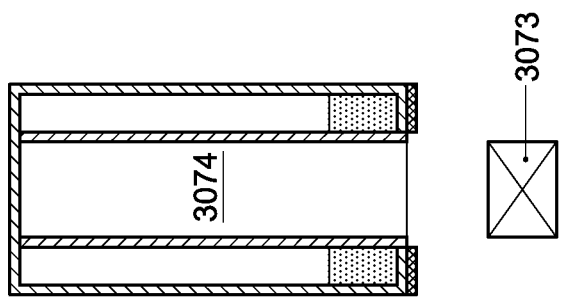
Figure 42O:
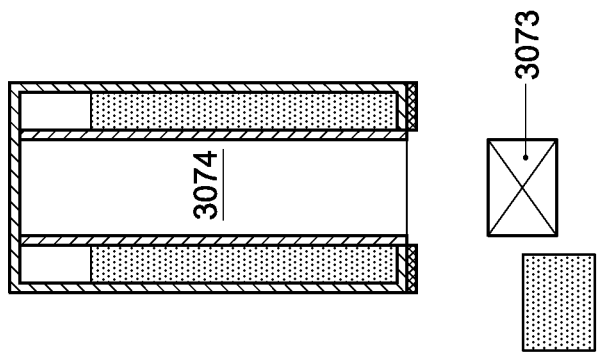
Figure 42N:
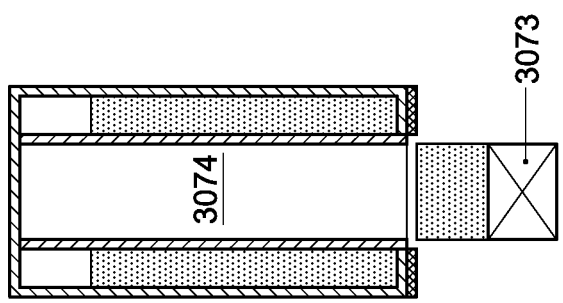
Figure 42M:
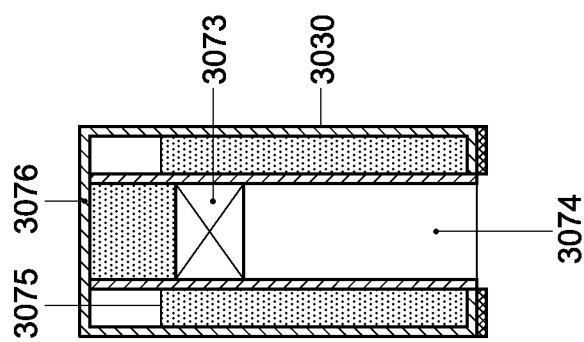
Figure 42T:
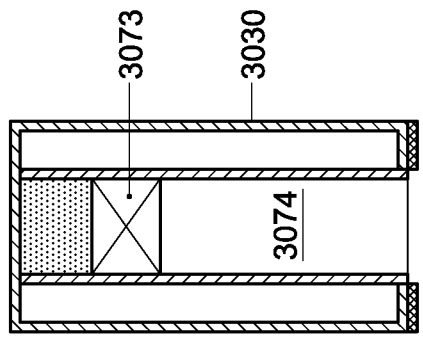
Figure 42S:
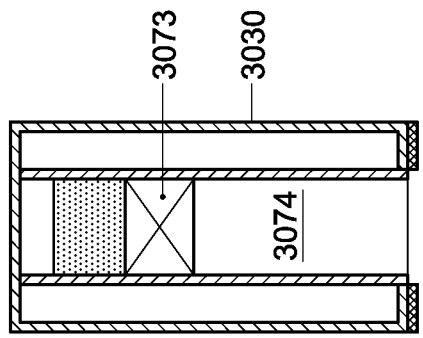
Figure 42R:
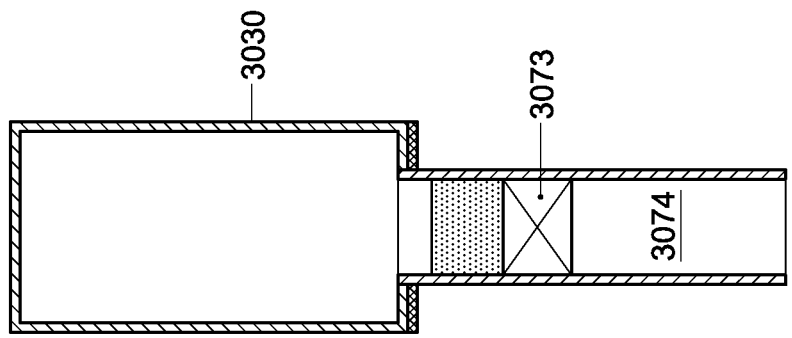
Figure 42Q:
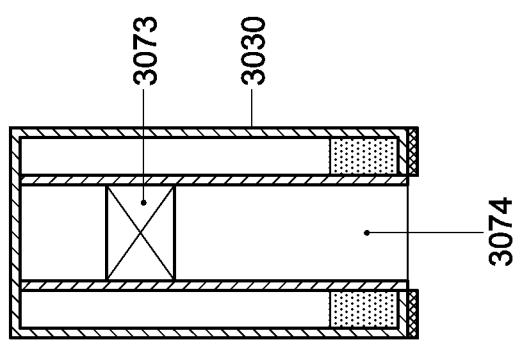
Figure 42V:
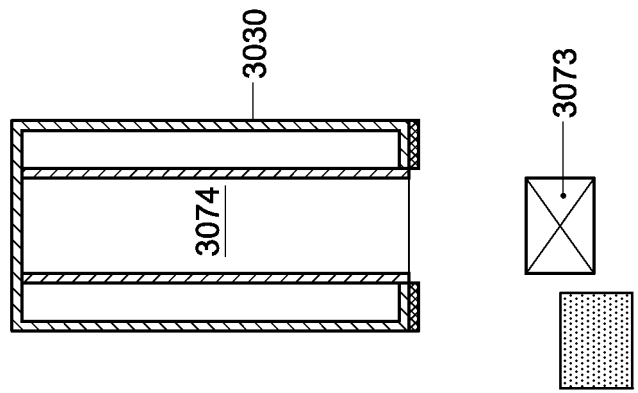
Figure 42U:
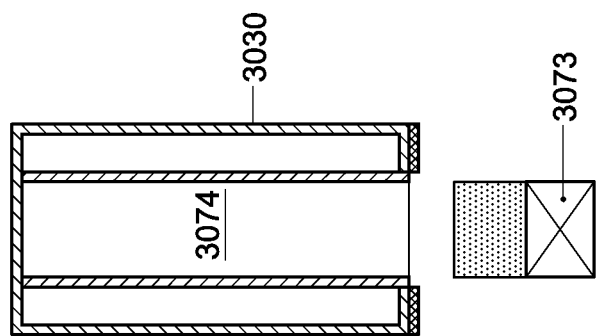

FIGS. 42A-V show in chronological order, by way of example, possible steps for a method with a dosing device 3050 for a package 3030 with ground coffee. The dosing device 3050 is arranged to enable a predetermined dose of ground coffee to be supplied from the package 3030 to the coffee brewing apparatus 3020. The dosing device 3050 comprises a piston 3073, which is provided in the coffee brewing apparatus 3020, and a displaceable, in particular slidable, dosing element, in the form of a corresponding tube 3074 with coffee outlet 3031. The tube 3074 is provided in the package 3030. The piston 3073 and the tube 3074 can, for example, have a circular cross section or a polygonal cross section. The tube 3074 is filled with at least a part of the ground coffee from the package 3030.

In a first step (FIG. 42A) the package 3030 is closed. The package 3030 comprises a sealing strip 3057 which closes off the package 3030 substantially in an airtight manner and/or under vacuum. The package 3030 is connected to a coffee brewing apparatus 3020, which is not further shown. In the package 3030 enough ground coffee may be present for multiple dosages of ground coffee for multiple cups of coffee beverage. Preferably, the package 3030 is substantially wholly filled with ground coffee.

In a second step, the package 3030 is connected to the coffee brewing apparatus 3020, whereby or whereupon the piston 3073 is inserted through the ground coffee outlet 3031, through interruption or detachment of at least a part of the sealing strip 3017 (FIG. 42B). The piston 3073 closes off the outlet 3031, so that no ground coffee exits the package 3030. The piston 3073 is disposed at an end of the tube 3074, so that a considerable part of the tube 3074 is still filled with ground coffee. In a next step, the piston 3073, the tube 3074 and ground coffee in the tube 3074 are partly moved out of the package 3030 (FIG. 42C), while the piston 3073 continues to close off the outlet 3031. The upper surface 3075 of the volume of ground coffee in the package 3030 is allowed thereby to descend, so that there is space for the piston 3073 to slide further into the package 3030, whereby said upper surface 3073 will rise (FIG. 42D). The piston 3073 continues to ascend until the portion of the ground coffee that is still in the tube 3074 is approximately equal to a predetermined dose of ground coffee (FIG. 42E). The piston 3073 moves to a particular height in the tube 3074, which height determines the dose of ground coffee to be supplied to the brewing device. The height can, for example, depend on settings which have been indicated by the user via the apparatus 3020, and/or of a circuit preprogrammed during manufacture of the apparatus 3020.

The tube 3074 and the piston 3073 may ascend up to a top wall 3076, or at least an opposite wall, of the package 3030 (FIGS. 42F, 42G), with the tube 3074 and the piston 3073 remaining in an approximately equal position relative to each other, so that said dose of ground coffee is confined in the tube 3074, between the piston 3073 and the top wall 3076, preventing any further ground coffee from coming to the piston 3073. As can be seen, the piston 3073 extends between a bottom wall 3077 and the top wall 3076 of the package 3030; preferably, the position of the piston 3073 is approximately equal to the initial position (FIG. 42A). The piston 3073 is then free to descend below the tube 3074, while the dose of ground coffee can descend along with it (FIG. 42H). The dose of ground coffee can be released if there is enough free space between the piston 3073 and the tube 3074 (FIG. 42I). This dose can then be supplied to the brewing device.

If the dose of ground coffee has been carried off (FIG. 42J), the piston 3073 may move back into the tube 3074 again, preferably up to the height which determines the dose of ground coffee (FIG. 42K). Thereupon the piston 3073 and the tube 3074, in equal position relative to each other, can move down whereby the part of the tube 3074 above the piston 3073 is filled with ground coffee (FIG. 42L). The piston 3073 and the tube 3074 can thereupon slide towards the opposite wall 3076, so that the predetermined dose of ground coffee is confined (FIG. 42M), which predetermined dose in turn can be released by the piston 3073 coming down (FIGS. 42N-P). The above steps can be repeated until the package 3030 is empty (FIGS. 42Q-V).

In an embodiment not shown, the piston 3073 is part of the package 3030, while the piston 3073 is activated by an activation element 3060 in the coffee brewing apparatus 3020, and the dosing device 3050 functions approximately according to the same principle as shown in FIGS. 42A-V. In a further embodiment, the dosing device 3050, or at least a part thereof that is provided in the package 3030, may be manufactured substantially from disposable or recyclable materials, such as, for instance, cellulose, paper, cardboard, or other materials, or, for instance, from plastic.

An embodiment of a brewing device is shown in FIGS. 43 to 48.

Figure 43:
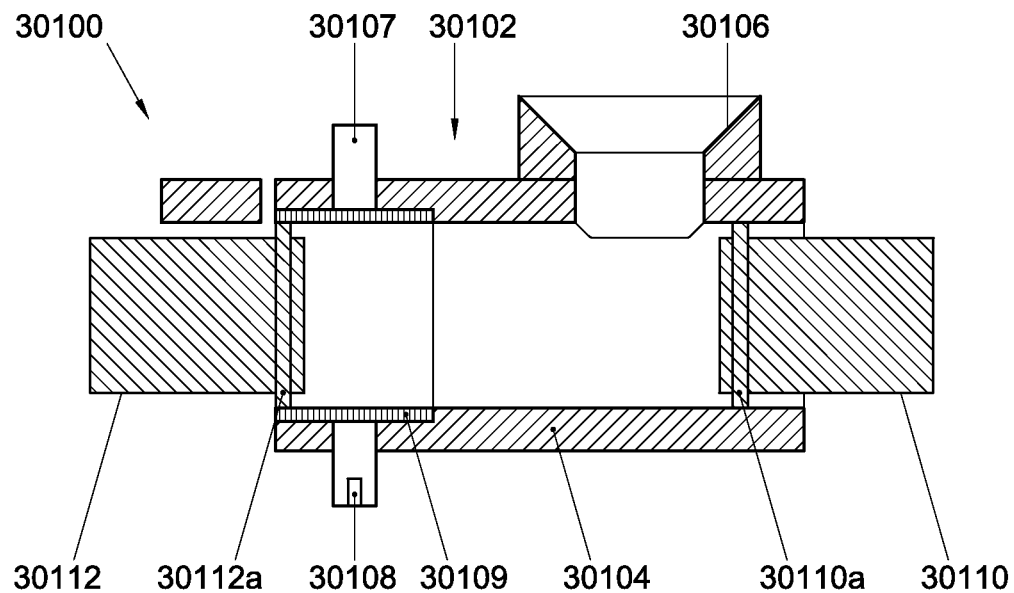
FIGS. 43 to 48 show an embodiment of a ground coffee packaging cartridge in various stages of the beverage preparation operation.

Referring to FIG. 43, the brewing device 30100 comprises a brew chamber assembly 30102. The brew chamber assembly 30102 comprises a horizontally-oriented, open-ended, stationary brew sleeve 30104 having a ground coffee inlet 30106 on an upper portion thereof that is in direction communication with the ground coffee transport path P of the connecting device, a water/steam inlet 30107 also on an upper portion thereof, and a beverage outlet 30108 on a lower portion thereof directly below the water/steam inlet 30107 through which prepared coffee beverage is dispensed to the user. A filter screen tube 30109 is disposed across brew sleeve 30104 between the water/steam inlet 30107 and the beverage outlet 30108. A first piston 30110 is mounted for movement back and forth along the brew sleeve 30108 from one end thereof, and a second piston 30112 is mounted for movement back and forth along the brew sleeve 30108 from the opposite end thereof.

In the illustrated embodiment, the pistons 30110, 30112 are driven from the same drive mechanism (not shown) via a scotch yoke or cam track mechanism such that they move in predetermined concert as shown in FIGS. 44 to 48.

Figure 44:
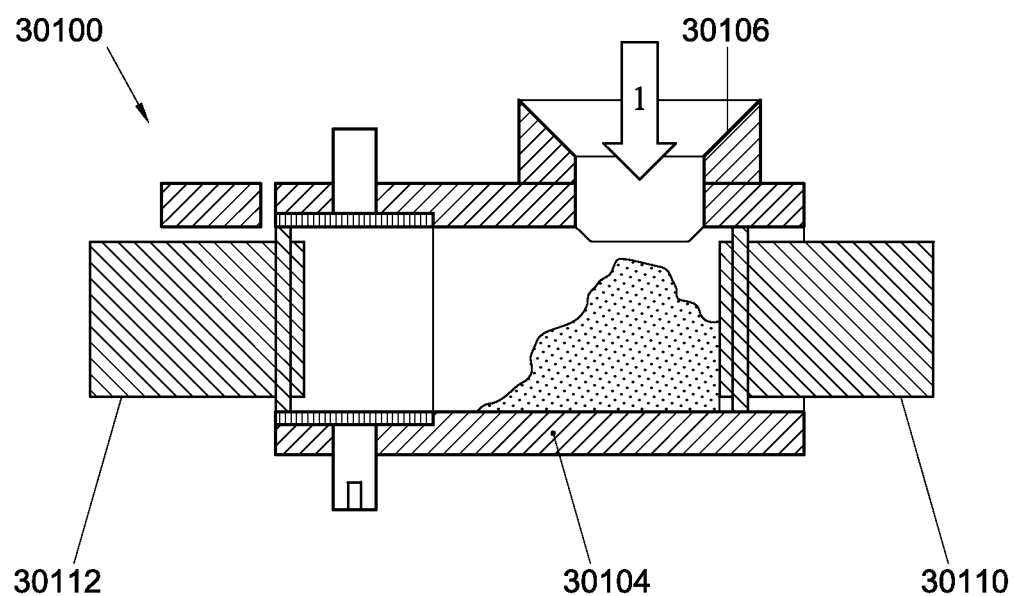
Figure 45:
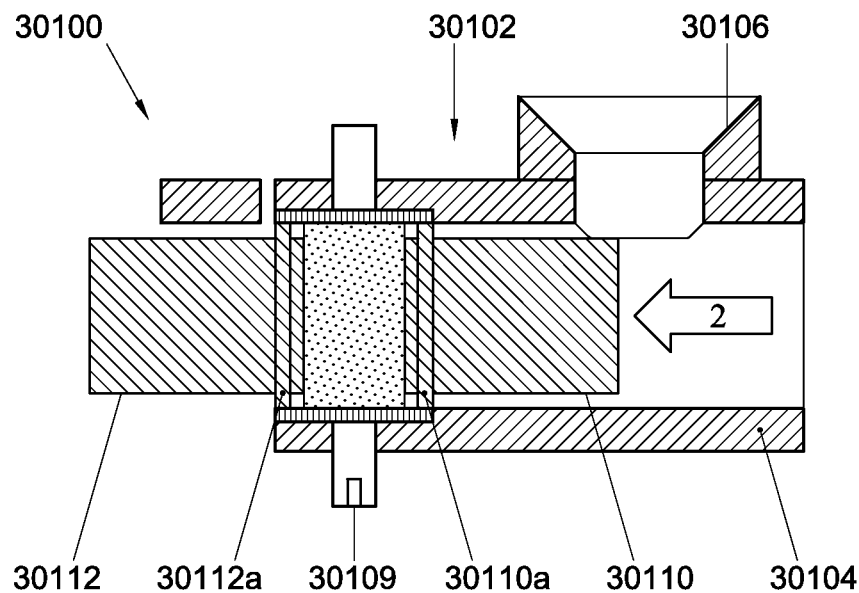
Figure 46:
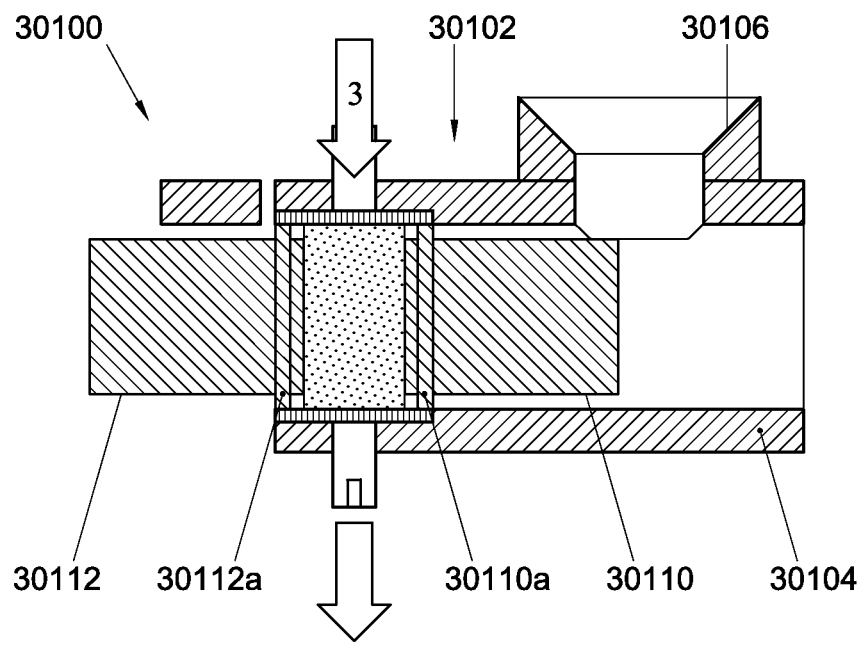
Figure 47:
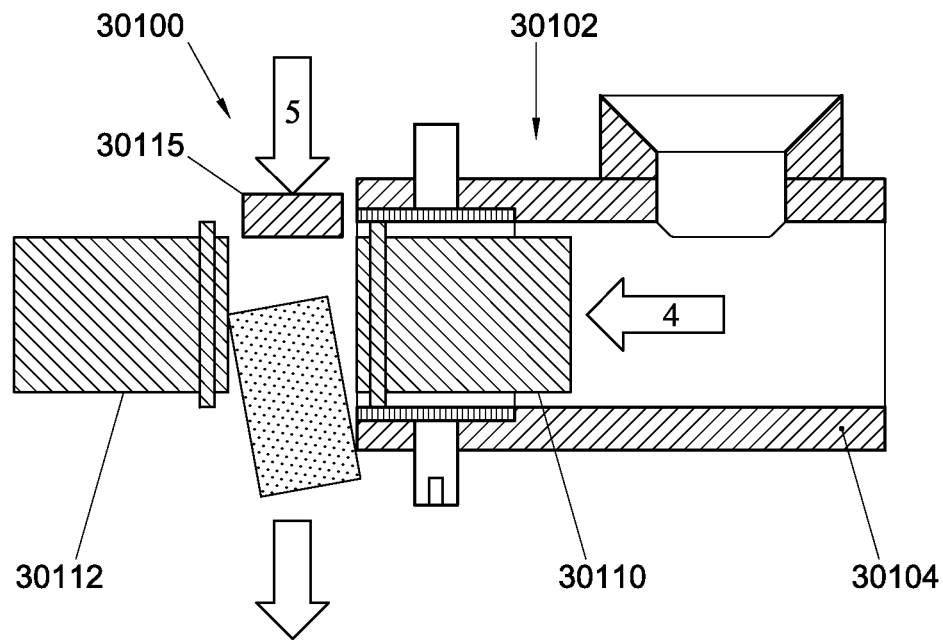

FIG. 44 shows the brewing device at the start of brewing cycle in which a dosing device 3050 has dispensed a fixed quantity, e.g. 7 g, of coffee grounds into the brew sleeve 30104 via the ground coffee inlet 30106, see arrow 1. The coffee grounds drop into a loose pile. Referring to FIG. 45, in a first phase of the brewing cycle, the first piston 30110 moves along the brew sleeve 30104 sweeping the coffee grounds into a compact (without voids) puck located within the filter screen tube 30109, see arrow 2. Referring to FIG. 46, water is injected from a boiler (not shown) into the water/steam inlet 30107 at low/medium pressure, see arrow 3. A sealing flange 30110a on the piston 30110 ensures that during the water injection the connecting device and ultimately the ground coffee packaging cartridge 3030 are protected from steam and water. A sealing flange 30112a on the piston 30112 provides similar sealing on the other end of the brew sleeve 30104. The prepared coffee beverage drains under gravity through the beverage outlet 30108. Referring to FIG. 47, in a further phase of the brewing cycle, the pistons 30110, 30112 move in unison leftwards displacing the used puck from the brewing position of FIG. 46 out of the left end of the sleeve to a disposal/discharge position where it is free to fall into a waste bin (not shown). A push arm or flicker 30115 is used to ensure that the puck if it does remain stuck to the faces of the pistons 30110, 30112 and, in fact, falls.

Figure 48:
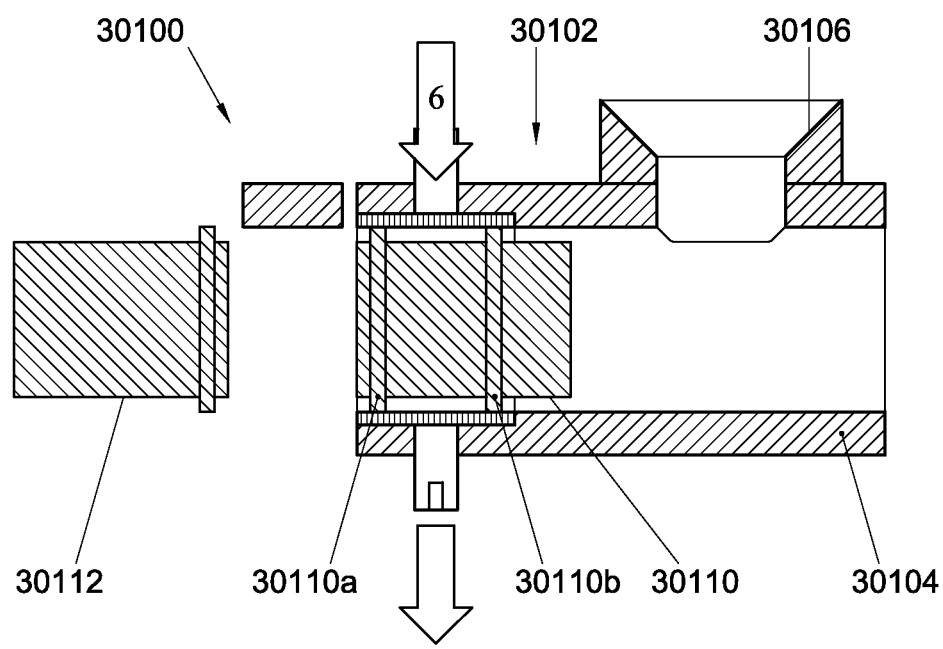

In a further embodiment shown FIG. 48, the piston 30110 comprises a second sealing flange 30110b which would allow for in-situ cleaning of the brew sleeve in the region of the filter screen tube 30109. The sealing flanges 30110 a, b provide protection for the rest of the system during the cleaning operation.

In other embodiments (not shown), while achieving the necessary sweeping, compacting, brewing, and discharge steps, the brew sleeve 30104 need not be stationary; for example, it may be coupled to the driving mechanism for movement, and one of the pistons may replaced by a passive stop.

The system may be favorably provided with different ground coffee packaging cartridges in which different kinds of coffee are stored. Prior to connection, the ground coffee packaging cartridges are closed, preferably air-tightly and/or vacuumized. The system may be thus arranged that after coffee beverage has been prepared with ground coffee from a first ground coffee packaging cartridge, the first ground coffee packaging cartridge can be disconnected from the coffee brewing apparatus and the second ground coffee packaging cartridge can be connected to the coffee brewing apparatus, after which coffee beverage can be prepared with the coffee brewing apparatus with coffee grounds from the second coffee package, substantially without ground coffee of the first ground coffee packaging cartridge being used for preparing the coffee beverage. As substantially no ground coffee of a previous serving will remain behind, there will be no contaminations between servings.

In between servings, the user can therefore exchange ground coffee packaging cartridges with different kinds of ground coffee without the desired taste of the new coffee beverage being affected. Favorably, the package may be provided with a closure which is reclosable, so that the package can be taken from the coffee brewing apparatus at any moment, with the package closing off automatically. In an embodiment, the package is closed off air-tightly. For instance, the closure is arranged for air-tight closure.

In an embodiment, the closure comprises a flap for closing off the ground coffee outlet. The flap links up with an activation element of the coffee brewing apparatus and comprises a cam which pushes—in the flap upon placement of the package. The activation element can also comprise an actively controlled, for instance, electrically controlled, element which opens the package. In another embodiment, the closure comprises, for instance, a slide or the like, which can also correspond with the activation element, while the activation element is arranged to open and/or close the slide for respectively supplying a dose of ground coffee and/or closing off the package.

In yet another embodiment, air is extracted from the package, whereupon the package is closed off air-tightly, so that the package can be in a substantially vacuum condition. The coffee brewing apparatus is arranged to draw in air and/or ground coffee. For instance, the coffee brewing apparatus may be provided with a pump for carrying off air from the ground coffee packaging cartridge. Also, the package may comprise flexible walls, for instance, allowing the package to shrink upon releasing the ground coffee. Also, the package may, for instance, be partly flexible and partly stiff. In yet another embodiment, upon closure of the package, an inert gas is injected for preserving the ground coffee.

In an embodiment, the coffee brewing apparatus comprises an operating panel with at least one operating element. The operating element may be arranged for activating the activation element that a dose of ground coffee can be supplied to the brewing device for preparing coffee beverage. In a further embodiment, the at least one operating element is arranged for setting the amount of water and/or the dose of ground coffee.

In an embodiment, the apparatus can for instance also supply, in addition to hot water, cold water for making a cold coffee beverage, like ice coffee. The brewing device can, for instance, comprise a filter or filter holder. The filter can, for instance, be a metal filter or a paper filter, and may be suitable for reuse or be designed as disposable filter. The brewing device can, inter alia, comprise a drip coffee maker, a pour-on system, a pressure system, in particular an espresso machine, a percolator and/or a system for making instant coffee. In principle, any coffee preparation method can be used.

In the foregoing, it has been indicated that the closing means can close off the coffee grounds in the package, so that the exposure of the ground coffee in the ground coffee packaging cartridge to ambient air is prevented. This should be understood to mean, inter alia, a closure which allows at least substantially no air to pass from the environment to the ground coffee in the package and vice versa. Preferably, the closing means can pass at least substantially no air from the environment to the grounds in the package and vice versa when there is a pressure difference between the space in the package in which the grounds are situated and the environment that is at most 1.1, preferably 1.2, more preferably 1.3 and still more preferably 1.5 bar. Preferably, the amount of air which enters the coffee package is at most equal to the volume of the grounds supplied from the ground coffee packaging cartridge to the coffee brewing apparatus. This can be realized, for instance, by connecting the ground coffee packaging cartridge air-tightly to the coffee brewing apparatus and by making the interior of the system where the ground coffee are permitted to be present at least substantially airtight with respect to an environment ('the outside world') of the system. For instance, in FIG. 33 the ground coffee inlet and the ground coffee outlet are air-tightly connected with each other. This interior of the system is formed in FIG. 33, for instance, by the inner space of the package, the ground coffee transport path P, and the brewing device, itself.

In an embodiment, the coffee brewing apparatus is provided with an emptiness detection system. This is arranged such that the coffee brewing apparatus with the aid of the sensor 30216 can read out an identification code on a package and record the same in the control device of the coffee brewing apparatus. The coffee brewing apparatus then knows on the basis of the identification code what is the amount of grounds (for instance in volume or weight) present when it has not been used before. Thus, the coffee brewing apparatus can monitor on the basis of the dosage of the ground coffee that is successively supplied from this package to the coffee brewing apparatus what the residual amount of ground coffee in the package is. This can also be done when the package is disconnected from the coffee brewing apparatus and is subsequently connected again. Then the coffee brewing apparatus will again determine the identification code of the package and hence know what the residual amount of ground coffee in the package is. The coffee brewing apparatus can update this amount again after ground coffee has been received from the package again. Also, the system may be further provided with means of verifying that, upon closure of the package with the closing means, the closing means are not blocked by coffee grounds. This can, for instance, be carried out with the aid of a CCD camera. This camera generates an image of the closing means which image is supplied to the control device. The control device can for instance comprise image signal processing means for recognizing (pattern recognition) coffee grounds, upon such recognition, generating an alert signal for a user. Also, instead of on the basis of the presence coffee grounds as such, it may be simply detected with the camera that the closing means fails to reach the closed condition, for instance through detection of the position of the pin 30212 in FIG. 33.

The inner space of the package 3030 may be provided with oxygen absorbing means, and/or a shelf life enhancing gas. The package may also be vacuum-packed. To obviate unduly high internal pressure, which may for instance be created upon accumulation of gases from the ground coffee, the package may for instance be provided with a valve which may be arranged to let off gas at a predetermined internal pressure. Preferably, the package is provided with a sealing foil for substantially air-tightly closing off the outlet and/or the closing means, to prolong shelf life of the grounds, at least prior to use. The sealing foil may for instance be provided over the closing means. The foil can optionally be provided with a valve.

It is thus believed that the operation and construction of the present invention will be apparent from the foregoing description. The invention is not limited to any embodiment herein described and, within the purview of the skilled person; modifications are possible which should be considered within the scope of the appended claims. For example the top wall of the metering chamber may be located well above the highest part of the inlet opening of the metering chamber. This means that if in the first step the transportation means is activated longer than required for filling the metering chamber, the metering chamber will always be filled up until about the highest part of the inlet opening.

Also, for example, the transportation means for transporting the ground coffee from the container to the metering chamber may be implemented as passive means not driven by a motor, for example by means of a downwardly extending bottom wall for transporting the ground coffee towards the exit opening and into the metering chamber under the influence of gravity only. A special means may in that case be required to close the inlet opening of the metering chamber once it is filled with ground coffee.

Similarly all kinematic inversions are considered inherently disclosed and to be within the scope of the present invention. The term "comprising" when used in this description or the appended claims should not be construed in an exclusive or exhaustive sense but rather in an inclusive sense. Expressions such as: "means for . . . " should be read as: "component configured for . . . " or "member constructed to . . . " and should be construed to include equivalents for the structures disclosed. The use of expressions like: "critical", "preferred", "especially preferred" etc. is not intended to limit the invention. Features which are not specifically or explicitly described or claimed may be additionally included in the structure according to the present invention without deviating from its scope.

The invention claimed is:

1. A coffee beverage system, including a coffee brewing apparatus and a coffee bean packaging cartridge, wherein the coffee bean packaging cartridge is removably connected to the coffee brewing apparatus, the coffee bean packaging cartridge being filled with coffee beans and being arranged for holding and supplying multiple servings of the coffee beans, the coffee bean packaging cartridge filled with the coffee beans including:
  a coffee bean packaging cartridge container comprising a coffee bean packaging cartridge interior volume and at least one coffee bean packaging cartridge exit opening defining a coffee bean outlet, the coffee bean packaging cartridge interior volume holding the coffee beans;
  coffee bean packaging cartridge transportation means adapted for enabling transportation of the coffee beans from the coffee bean packaging cartridge interior volume towards the at least one coffee bean packaging cartridge exit opening of the coffee bean packaging cartridge;
  wherein the coffee brewing apparatus comprises an entrance opening for receiving the coffee beans which are transported with the aid of the coffee bean packaging cartridge transportation means towards the at least one coffee bean packaging cartridge exit opening, a grinder for grinding the coffee beans which have entered the coffee brewing apparatus via the entrance opening and a brewing device for brewing coffee on the basis of ground coffee obtained by means of the grinder, wherein the coffee beverage system is further provided with a metering chamber for receiving the coffee beans which are transported with the aid of the coffee bean packaging cartridge transportation means into the metering chamber wherein the metering chamber comprises a bottom portion which forms a part of the grinder, said bottom portion being arranged in the coffee brewing apparatus for rotating around a first axis extending in a vertical direction wherein the coffee beverage system is arranged such that upon activation of the grinder the bottom portion is rotating around the vertical axis for transporting the coffee beans from the metering chamber into the grinder and for grinding the coffee beans, characterized in that the coffee beverage system is further provided with a ground coffee packaging cartridge filled with ground coffee which is also removably connectable to the coffee brewing apparatus and which is arranged for feeding the ground coffee into the coffee brewing apparatus via the entrance opening via the entrance opening, wherein the ground coffee packaging cartridge filled with the ground coffee comprises a hopper for holding the ground coffee, the hopper having a ground coffee outlet, which is aligned with the entrance opening of the coffee brewing apparatus, when the ground coffee packaging cartridge filled with the ground coffee is connected thereto, wherein the ground coffee packaging cartridge transportation means comprise a closure plate, which in a first position at least to a large extent and entirely closes the ground coffee outlet, thereby hindering passage of the ground coffee towards the entrance opening and in a second position does not obstruct the ground coffee outlet and wherein the ground coffee packaging cartridge transportation means further include manually operable actuation means for actuating the closure plate from the first to the second position and vice versa.

2. The coffee beverage system according to claim 1, wherein the ground coffee packaging cartridge filled with the ground coffee is arranged for being filled with and holding supplying the ground coffee.

3. The coffee beverage system according to claim 2, wherein the ground coffee packaging cartridge filled with the ground coffee includes:
  a ground coffee packaging cartridge container comprising a ground coffee packaging cartridge interior volume and at least one ground coffee packaging cartridge exit opening defining a ground coffee outlet, the ground coffee packaging cartridge interior volume being arranged for holding the ground coffee;
  ground coffee packaging cartridge transportation means adapted for enabling supplying the around coffee from the ground coffee packaging cartridge interior volume towards the at least one ground coffee packaging cartridge exit opening of the ground coffee packaging cartridge filled with ground coffee.

4. The coffee beverage system according to claim 3, wherein the coffee bean packaging cartridge transportation means or the ground coffee packaging cartridge transportation means comprise a part which is movable relative to the metering chamber for transporting the coffee beans or the ground coffee towards and into the metering chamber upon driving of said coffee bean packaging cartridge transportation means or the ground coffee packaging cartridge transportation means.

5. The coffee beverage system according to claim 4, wherein the coffee brewing apparatus is provided with a first motor and a vertically extending drive shaft wherein said drive shaft is releasable connected with the coffee bean packaging cartridge transportation means or the ground coffee packaging cartridge transportation means of the coffee bean packaging cartridge or the ground coffee packaging filled with the ground coffee for driving and thereby moving the coffee bean packaging cartridge transportation means or the ground coffee packaging cartridge transportation means upon rotation of the drive shaft by means of the first motor.

6. The coffee beverage system according to claim 3, wherein the coffee bean packaging cartridge transportation means or the ground coffee packaging cartridge transportation means comprise a downwardly extending bottom wall such as a funnel of the coffee bean packaging cartridge container or the ground coffee packaging cartridge container for transporting the coffee beans or the ground coffee towards the metering chamber under the influence of gravity.

7. The coffee beverage system according to claim 6, wherein the coffee bean packaging cartridge transportation means or the ground coffee packaging cartridge transportation means comprise a part which is movable relative to the metering chamber for transporting the coffee beans or ground coffee towards and into the metering chamber upon driving of said coffee bean packaging cartridge transportation means or the ground coffee packaging cartridge transportation means, and wherein the coffee bean packaging cartridge transportation means or the ground coffee packaging cartridge transportation means comprise the funnel of the coffee bean packaging cartridge container or the ground coffee packaging cartridge container and the part which is movable relative to the metering chamber.

8. The coffee beverage system according to claim 3, wherein the coffee bean packaging cartridge transportation means or the ground coffee packaging cartridge transportation means comprise a downwardly extending bottom wall for transporting the coffee beans or ground coffee towards the metering chamber under the influence of gravity only.

9. The coffee beverage system according to claim 3, wherein the coffee bean packaging cartridge transportation means or the ground coffee packaging cartridge transportation means are arranged for transporting the coffee beans or the ground coffee at least in a horizontal direction for transporting the coffee beans or the ground coffee into the metering chamber.

10. The coffee beverage system according to claim 3, wherein the at least one ground coffee packaging cartridge exit opening or the at least one coffee bean packaging cartridge exit opening is associated with a removable sealing element sealing the coffee bean packaging cartridge interior volume or the ground coffee packaging cartridge interior volume prior to activation of the coffee bean packaging cartridge or the ground coffee packaging cartridge filled with the ground coffee wherein said sealing element prevents gasses to escape from the coffee bean packaging cartridge or the ground coffee packaging cartridge filled with ground coffee.

11. The coffee beverage system according to claim 4, wherein the movable part comprises a bottom and a plurality of vanes which rotate around a second vertical axis upon driving the coffee bean packaging cartridge transportation means or the ground coffee packaging cartridge transportation means.

12. The coffee beverage system according to claim 1, wherein the coffee beverage system is arranged such that ground coffee is transported from the ground coffee packaging cartridge filled with the ground coffee to the coffee brewing apparatus by gravity.

13. The coffee beverage system according to claim 1, wherein the bottom portion has a conical shape such that the bottom portion extends downwardly in a direction extending perpendicular to and away from the first vertical axis.

14. The coffee beverage system according to claim 13, wherein the first vertical axis runs centrally through the bottom portion of the metering chamber and in that the bottom portion extends downwardly in a direction extending perpendicular to and away from the vertical axis all around the vertical axis or in that the first vertical axis runs centrally through the bottom portion of the second chamber portion and in that the bottom portion extends downwardly in a direction extending perpendicular to and away from the vertical axis all around the vertical axis.

15. The coffee beverage system according to claim 1, wherein the metering chamber is divided in a first chamber portion which is part of the coffee bean packaging cartridge or the ground coffee packaging cartridge filled with the ground coffee and a second chamber portion which is part of the coffee brewing apparatus wherein the second chamber comprises the bottom portion which forms a part of the grinder, said bottom portion being arranged in the coffee brewing apparatus for rotating around a first axis extending in a vertical direction.

16. The coffee beverage system according to claim 15, wherein the first chamber portion comprises at least one ground coffee packaging cartridge exit opening for the ground coffee packaging cartridge or the at least one coffee bean packaging cartridge exit opening and the second chamber portion comprises the entrance opening wherein the first chamber portion is located above the second chamber portion wherein the at least one ground coffee packaging cartridge exit opening or the at least one coffee bean packaging cartridge exit opening extends above the entrance opening.

17. The coffee beverage system according to claim 15, wherein the first chamber portion is provided with a top wall which limits the volume of the metering chamber in an upwardly vertical direction, wherein the bottom portion of the second chamber portion limits the volume of the metering chamber in a downwardly vertical direction.

18. The coffee beverage system according to claim 1, wherein the coffee beverage system is arranged such that after having received the coffee beans or ground coffee the metering chamber will hold a portion of the coffee beans or the ground coffee or in that the metering chamber is arranged for receiving a portion of the coffee beans or the ground coffee or ground coffee corresponding to a dosed amount of the coffee beans or the ground coffee which is necessary for preparing a single serving of coffee beverage, such as a single cup coffee comprising 80-160 ml of coffee.

19. The coffee beverage system according to claim 1, wherein the coffee bean packaging cartridge or the ground coffee packaging cartridge filled with the ground coffee comprises closing means for closing the coffee bean outlet or a ground coffee outlet when the coffee bean packaging cartridge or the ground coffee packaging cartridge filled with ground coffee is not connected to the coffee brewing apparatus.

20. The coffee beverage system according to claim 19, wherein the closing means are configured for opening the coffee bean outlet or the ground coffee outlet when the coffee bean packaging cartridge or the ground coffee packaging cartridge filled with the ground coffee is connected to the coffee brewing apparatus.

21. The coffee beverage system according to claim 1, the metering chamber is divided in a first chamber portion which is part of the coffee bean packaging cartridge or the ground coffee packaging cartridge filled with the ground coffee and a second chamber portion which is part of the coffee brewing apparatus wherein the second chamber comprises the bottom portion which forms the part of the grinder, said bottom portion being arranged in the coffee brewing apparatus for rotating around a first axis extending in a vertical direction, and wherein the grinder is positioned centrically with respect to the metering chamber and in that the grinder is positioned centrically with respect to the second chamber portion.

22. The coffee beverage system according to claim 1, wherein the coffee brewing apparatus comprises connection means for the removable connection to the coffee bean packaging cartridge or the ground coffee packaging cartridge filled with the ground coffee, the connection means comprising a recess at an upper side of the coffee brewing apparatus, the recess being surrounded by a side wall and being configured for receiving a corresponding part protruding from a lower side of the coffee bean packaging cartridge or the ground coffee packaging cartridge filled with the ground coffee.

23. The coffee beverage system according to claim 22, wherein the side wall comprises openings for receiving bayonet elements of the coffee bean packaging cartridge or the ground coffee packaging cartridge filled with the ground coffee.

24. The coffee beverage system according to claim 23, wherein the coffee bean packaging cartridge or the ground coffee packaging cartridge filled with the around coffee comprises the bayonet elements.

25. The coffee beverage system according to claim 24, further comprising a sensor arranged for detecting connection of the coffee bean packaging cartridge or the ground coffee packaging cartridge filled with the ground coffee to the coffee brewing apparatus; wherein the sensor is a switch; wherein the coffee bean packaging cartridge or the ground coffee packaging cartridge filled with the ground coffee comprises a protruding part for activating the switch when it is connected to the coffee brewing apparatus; wherein the protruding part is located below or above one of the bayonet elements.

26. The coffee beverage system according to claim 1, wherein the coffee brewing apparatus is provided with a control device.

27. The coffee beverage system according to claim 26, wherein the ground coffee packaging cartridge filled with the ground coffee is arranged for being filled with and holding and supplying the ground coffee;
wherein the ground coffee packaging cartridge filled with the ground coffee includes:
a ground coffee packaging cartridge container comprising a ground coffee packaging cartridge interior volume and at least one ground coffee packaging cartridge exit opening defining a ground coffee outlet, the ground coffee packaging cartridge interior volume being arranged for holding the ground coffee;
ground coffee packaging cartridge transportation means adapted for enabling transportation of the ground coffee from the ground coffee packaging cartridge interior volume towards the at least one ground coffee packaging cartridge exit opening of the ground coffee packaging cartridge filled with ground coffee;
wherein the ground coffee packaging cartridge transportation means comprise a part which is movable relative to the metering chamber for transporting the coffee beans or the ground coffee towards and into the metering chamber upon driving of said transportation means,
wherein the coffee brewing apparatus is provided with a first motor and a vertically extending drive shaft wherein said drive shaft is releasable connected with the ground coffee packaging cartridge transportation means of the ground coffee packaging cartridge filled with ground coffee for driving and thereby moving the ground coffee packaging cartridge transportation means upon rotation of the drive shaft by means of the first motor
wherein the control device is arranged for controlling the first motor and the grinder.

28. The coffee beverage system according to claim 27, wherein the control device is arranged such that, in use, in a first step the ground coffee packaging cartridge transportation means is driven for filling the metering chamber with the coffee beans or the ground coffee and that in a second step which follows after the completion of the first step the grinding device is activated for emptying the metering chamber and for grinding coffee beans or further grinding ground coffee which were/is collected in the metering chamber during the first step.

29. The coffee beverage system according to claim 1, wherein the coffee beverage system further comprises a sensor arranged for detecting connection of the coffee bean packaging cartridge or the ground coffee packaging cartridge filled with the ground coffee to the coffee brewing apparatus.

30. The coffee beverage system according to claim 29, wherein the sensor is a switch.

31. The coffee beverage system according to claim 30, wherein the coffee bean packaging cartridge or the ground coffee packaging cartridge filled with the ground coffee comprises a protruding part for activating the switch when it is connected to the coffee brewing apparatus.

32. The coffee beverage system according to claim 1, wherein the coffee beverage system is arranged such that, in use, the grinder is activated for emptying the metering chamber and for grinding the coffee beans or the ground coffee collected in the metering chamber.

33. The coffee beverage system according to claim 32, wherein the coffee beverage system is arranged such that in use the grinder is activated longer than is required for emptying the metering chamber and for grinding all the coffee beans or further grinding all the ground coffee collected in the metering chamber.

34. The coffee beverage system according to claim 32, wherein previous to the emptying of the metering chamber and the grinding of the coffee beans or further grinding of the ground coffee, in a first step the coffee bean packaging cartridge transportation means or the ground coffee packaging cartridge transportation means is driven for filling the metering chamber with the coffee beans or the ground coffee.

35. The coffee beverage system according to claim 34, wherein the coffee bean packaging cartridge transportation means or the ground coffee packaging cartridge transportation means is driven longer than is required for completely filling the metering chamber.

36. The coffee beverage system according to claim 1, wherein the ground coffee packaging cartridge filled with the ground coffee is adapted to the coffee brewing apparatus so that, during connection of the ground coffee packaging cartridge filled with the ground coffee to the coffee brewing apparatus, the ground coffee which is transported with the aid of the ground coffee packaging cartridge transportation means of the ground coffee packaging cartridge filled with ground coffee towards at least one ground coffee packaging cartridge exit opening of the ground coffee packaging cartridge filled with ground coffee is received by the coffee brewing apparatus via the entrance opening for preparing coffee.

37. The coffee beverage system according to claim 1, wherein the ground coffee packaging cartridge filled with the ground coffee comprises a scooper for holding and supplying the ground coffee, the scooper, when connected to the coffee brewing apparatus, being aligned with the entrance opening thereof, the scooper being configured to work also as ground coffee packaging cartridge transportation means by turning around its axis, thereby emptying the ground coffee into the entrance opening.

38. The coffee beverage system according to claim 1, wherein the ground coffee packaging cartridge filled with the ground coffee comprises a funnel shaped holder for holding the ground coffee and a ground coffee outlet for releasing the ground coffee from the holder, the ground coffee outlet being positioned at an upper end of the funnel shaped holder and, when the ground coffee packaging cartridge filled with the ground coffee is connected to the coffee brewing apparatus being aligned with the entrance opening thereof, wherein the ground coffee packaging cartridge transportation means are spiral shaped conveyor means and, in use, rotatably actuated for driving the ground coffee out of the funnel shaped holder towards the ground coffee outlet.

39. The coffee beverage system according to claim 1, further comprising a dosing device for supplying a predetermined dose of the ground coffee to the coffee brewing apparatus.

40. The coffee beverage system according to claim 1, wherein the coffee brewing apparatus comprises a ground coffee transport path that extends from the entrance opening of the coffee brewing apparatus to the brewing device, said path at least comprising a lower portion of the metering chamber, wherein the coffee beverage system is arranged such that prior to preparing the coffee beverage any remnant ground coffee remaining behind in ground coffee transport path is removed.

41. The coffee beverage system according to claim 1, further comprising a first ground coffee packaging cartridge filled with the ground coffee in which a first kind of coffee is contained and a second ground coffee packaging cartridge filled with the ground coffee in which a second kind of coffee is contained, the first and second kinds being different,
  wherein the coffee beverage system is arranged such that a first coffee beverage has been prepared with the coffee brewing apparatus with the ground coffee from the first ground coffee packaging cartridge filled with the ground coffee, the first ground coffee packaging cartridge filled with the ground coffee is disconnectable from the coffee brewing apparatus and the second ground coffee packaging cartridge filled with the ground coffee is connectable to the coffee brewing apparatus after which the coffee brewing apparatus is usable to prepare a second coffee beverage with coffee grounds from the second ground coffee packaging cartridge filled with the ground coffee without contamination from the ground coffee from the first ground coffee packaging cartridge filled with the ground coffee.

42. The coffee beverage system according to claim 1, wherein the coffee beverage system is arranged such that an amount of air that comes into the ground coffee packaging cartridge filled with the ground coffee is at most equal to a volume of the ground coffee that has been supplied from the ground coffee packaging cartridge filled with the ground coffee to the coffee brewing apparatus or that the interior of the coffee beverage system where the ground coffee is permitted to be present is designed to be air-tight with respect to an environment of the coffee beverage system, while said interior of the coffee beverage system is formed by an inner volume of the ground coffee packaging cartridge filled with the ground coffee, a ground coffee transport path from the ground coffee packaging cartridge filled with the ground coffee to the brewing device, and the brewing device itself.

43. The coffee beverage system according to claim 1, wherein the grinder is operable to grind already ground coffee.

44. The coffee beverage system according to claim 1, wherein the grinder is switchable to a configuration in which it allows the ground coffee to pass there through without undergoing a further grinding operation.

45. The coffee beverage system according to claim 1, wherein the coffee brewing apparatus comprises closing means which are configured for closing or opening the entrance opening of the coffee brewing apparatus, said closing means being configured to be controlled by the coffee brewing apparatus or the (dis)connection of the coffee bean packaging cartridge or the ground coffee packaging cartridge filled with the ground coffee (from) to the coffee brewing apparatus.

46. A coffee beverage system, including a coffee brewing apparatus and a coffee bean packaging cartridge, wherein the coffee bean packaging cartridge is removably connected to the coffee brewing apparatus, wherein when disconnected from the coffee brewing apparatus the coffee bean packaging cartridge is filled with coffee beans and holds and supplies multiple serving of the coffee beans, the coffee bean packaging cartridge including:
  a coffee bean packaging cartridge container comprising a coffee bean packaging cartridge interior volume and at least one coffee bean packaging cartridge exit opening defining a coffee bean outlet, the coffee bean packaging cartridge interior volume holding coffee beans;
  coffee bean packaging cartridge transportation means adapted for enabling transportation of the coffee beans from the coffee bean packaging cartridge interior volume towards the at least one coffee bean packaging cartridge exit opening of the coffee bean packaging cartridge;
  wherein the coffee brewing apparatus comprises an entrance opening for receiving of the coffee beans from the coffee bean packaging cartridge when the coffee bean packaging cartridge is connected to the coffee brewing apparatus, wherein the coffee beans are transported with the aid of the coffee bean packaging cartridge transportation means towards the at least one coffee bean packaging cartridge exit opening, a grinder for grinding coffee beans which have entered the coffee brewing apparatus via the entrance opening and a brewing device for brewing coffee on the basis of ground coffee obtained by means of the grinder, wherein the coffee beverage system is further provided with a metering chamber for receiving coffee beans which are transported with the aid of the coffee bean packaging cartridge transportation means into the metering chamber wherein the metering chamber comprises a bottom portion which forms a part of the grinder, said bottom portion being arranged in the coffee brewing apparatus for rotating around a first axis extending in a vertical direction wherein the coffee beverage system is arranged such that upon activation of the grinder the bottom portion is rotating around the vertical axis for transporting the coffee beans from the metering chamber into the grinder and for grinding the coffee beans,
  characterized in that the coffee beverage system is further provided with a ground coffee packaging cartridge filled with the ground coffee which is also removably connectable to the coffee brewing apparatus and which is arranged for feeding the ground coffee into the coffee brewing apparatus via the entrance opening via the entrance opening, wherein the ground coffee packaging cartridge filled with the ground coffee comprises a hopper for holding the ground coffee, the hopper having a ground coffee outlet, which is aligned with the entrance opening of the coffee brewing apparatus, when the ground coffee packaging cartridge filled with the ground coffee is connected thereto, wherein the ground coffee packaging cartridge transportation means comprise a closure plate, which in a first position at least to a large extent and entirely closes the ground coffee outlet, thereby hindering passage of the ground coffee towards the entrance opening and in a second position does not obstruct the ground coffee outlet and wherein the ground coffee packaging cartridge transportation means further include manually operable actuation means for actuating the closure plate from the first to the second position and vice versa.

47. A coffee beverage system, including a coffee brewing apparatus and a coffee bean packaging cartridge, wherein the coffee bean packaging cartridge is removably connected to the coffee brewing apparatus, wherein when disconnected from the coffee brewing apparatus the coffee bean packaging cartridge is filled with coffee beans and holds and supplies multiple serving of the coffee beans, the coffee bean packaging cartridge when disconnected from the coffee brewing apparatus including:
- a coffee bean packaging cartridge container comprising a coffee bean packaging cartridge interior volume and at least one coffee bean packaging cartridge exit opening defining a coffee bean outlet, the coffee bean packaging cartridge interior volume holding of the coffee beans;
- coffee bean packaging cartridge transportation means adapted for enabling transportation of the coffee beans from the coffee bean packaging cartridge interior volume towards the at least one coffee bean packaging cartridge exit opening of the coffee bean packaging cartridge;
- wherein the coffee brewing apparatus comprises an entrance opening for receiving of the coffee beans from the coffee bean packaging cartridge when the coffee bean packaging cartridge is connected to the coffee brewing apparatus, wherein the coffee beans are transported with the aid of the coffee bean packaging cartridge transportation means towards the at least one coffee bean packaging cartridge exit opening, a grinder for grinding of the coffee beans which have entered the coffee brewing apparatus via the entrance opening and a brewing device for brewing coffee on the basis of ground coffee obtained by means of the grinder, wherein the coffee beverage system is further provided with a metering chamber for receiving of the coffee beans which are transported with the aid of the coffee bean packaging cartridge transportation means into the metering chamber wherein the metering chamber comprises a bottom portion which forms a part of the grinder, said bottom portion being arranged in the coffee brewing apparatus for rotating around a first axis extending in a vertical direction wherein the coffee beverage system is arranged such that upon activation of the grinder the bottom portion is rotating around the vertical axis for transporting the coffee beans from the metering chamber into the grinder and for grinding the coffee beans,
- characterized in that the coffee beverage system is further provided with a ground coffee packaging cartridge filled with the ground coffee which is also removably connectable to the coffee brewing apparatus and which is arranged for feeding the ground coffee into the coffee brewing apparatus via the entrance opening via the entrance opening, wherein the ground coffee packaging cartridge filled with the ground coffee comprises a hopper for holding the ground coffee, the hopper having a ground coffee outlet, which is aligned with the entrance opening of the coffee brewing apparatus, when the ground coffee packaging cartridge filled with the ground coffee is connected thereto, wherein the ground coffee packaging cartridge transportation means comprise a closure plate, which in a first position at least to a large extent and entirely closes the ground coffee outlet, thereby hindering passage of the ground coffee towards the entrance opening and in a second position does not obstruct the ground coffee outlet and wherein the ground coffee packaging cartridge transportation means further include manually operable actuation means for actuating the closure plate from the first to the second position and vice versa.

* * * * *